(12) United States Patent
Gao et al.

(10) Patent No.: US 9,589,595 B2
(45) Date of Patent: Mar. 7, 2017

(54) SELECTION AND TRACKING OF OBJECTS FOR DISPLAY PARTITIONING AND CLUSTERING OF VIDEO FRAMES

(71) Applicant: QUALCOMM Incorporated, San Diego, CA (US)

(72) Inventors: Dashan Gao, San Diego, CA (US); Xin Zhong, San Diego, CA (US); Ananthapadmanabhan Arasanipalai Kandhadai, San Diego, CA (US); Scott Beith, Carlsbad, CA (US); Steven Douglas Laver, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 14/575,945

(22) Filed: Dec. 18, 2014

(65) Prior Publication Data

US 2015/0179219 A1    Jun. 25, 2015

Related U.S. Application Data

(60) Provisional application No. 61/919,627, filed on Dec. 20, 2013.

(51) Int. Cl.
G11B 27/00 (2006.01)
H04N 5/93 (2006.01)
(Continued)

(52) U.S. Cl.
CPC .......... *G11B 27/031* (2013.01); *G06F 3/0484* (2013.01); *G06K 9/00664* (2013.01);
(Continued)

(58) Field of Classification Search
USPC ........ 386/280, 278, 283, 239, 248; 348/169, 348/142, 25, 208.14
See application file for complete search history.

(56) References Cited

U.S. PATENT DOCUMENTS 6,512,793 B1 * 1/2003 Maeda ................... H04N 19/70
                                                            348/585
6,542,621 B1   4/2003 Brill et al.
(Continued)

FOREIGN PATENT DOCUMENTS

CN       103179405 A    6/2013
EP         0967584 A2   12/1999
(Continued)

OTHER PUBLICATIONS

Makris, D., et al., "Finding Paths in Video Sequences," Proceedings of the British Machine Vision Conference 2001, Sep. 2001, University of Manchester, Manchester U.K., pp. 263-271.
(Continued)

*Primary Examiner* — Daquan Zhao
(74) *Attorney, Agent, or Firm* — Toler Law Group, PC

(57) ABSTRACT

A method includes selecting at least two objects within a primary video stream, generating a first video stream from the primary video stream that includes a first of the selected objects, and generating a second video stream from the primary video stream that includes a second of the selected objects. The primary video stream has a primary field of view, and the first and second video streams have respective first and second fields of view that are more narrow than the primary field of view. The first field of view includes a portion of the primary field of view that is not within the second field of view, and the second field of view includes a portion of the primary field of view that is not within the first field of view.

30 Claims, 44 Drawing Sheets

(51) Int. Cl.
*H04N 9/80* (2006.01)
*G11B 27/031* (2006.01)
*G06K 9/00* (2006.01)
*H04N 9/87* (2006.01)
*G06F 3/0484* (2013.01)
*G08B 13/19* (2006.01)
*G06T 7/00* (2006.01)
*G06T 7/20* (2006.01)
*G06K 9/32* (2006.01)
*H04N 5/14* (2006.01)
*H04N 5/225* (2006.01)
*H04N 5/228* (2006.01)
*H04N 7/18* (2006.01)

(52) U.S. Cl.
CPC .............. *G06K 9/32* (2013.01); *G06T 7/0046* (2013.01); *G06T 7/20* (2013.01); *G06T 7/2053* (2013.01); *G06T 7/2066* (2013.01); *G08B 13/19* (2013.01); *H04N 7/18* (2013.01); *H04N 9/87* (2013.01); *G06T 2207/20076* (2013.01); *H04N 7/188* (2013.01)

(56) References Cited

U.S. PATENT DOCUMENTS

| | | |
|---|---|---|
| 7,495,699 B2 | 2/2009 | Nayar et al. |
| 7,512,250 B2 | 3/2009 | Lim et al. |
| 8,024,768 B2 | 9/2011 | Berger et al. |
| 8,320,644 B2 | 11/2012 | Singer et al. |
| 8,345,749 B2 | 1/2013 | Quast et al. |
| 8,559,671 B2 | 10/2013 | Milanfar et al. |
| 8,605,945 B2 | 12/2013 | El-Maleh et al. |
| 8,620,026 B2 | 12/2013 | Datta et al. |
| 8,773,499 B2 | 7/2014 | Watson et al. |
| 8,854,453 B2 | 10/2014 | Chen et al. |
| 8,896,686 B2 | 11/2014 | Chen et al. |
| 8,942,468 B1 | 1/2015 | Toshev et al. |
| 8,965,050 B2 | 2/2015 | Yoshimitsu et al. |
| 9,258,550 B1* | 2/2016 | Sieracki ............ H04N 13/0282 |
| 2002/0018523 A1 | 2/2002 | Jayant et al. |
| 2004/0113933 A1 | 6/2004 | Guler |
| 2004/0258152 A1 | 12/2004 | Herz |
| 2005/0053260 A1 | 3/2005 | Worthington et al. |
| 2005/0193120 A1 | 9/2005 | Taylor |
| 2005/0220361 A1 | 10/2005 | Yamasaki |
| 2006/0062478 A1 | 3/2006 | Cetin et al. |
| 2006/0064384 A1 | 3/2006 | Mehrotra et al. |
| 2006/0251382 A1 | 11/2006 | Vronay et al. |
| 2007/0126868 A1 | 6/2007 | Kiyohara et al. |
| 2007/0146372 A1 | 6/2007 | Gee et al. |
| 2007/0242856 A1 | 10/2007 | Suzuki et al. |
| 2007/0248244 A1 | 10/2007 | Sato et al. |
| 2007/0268369 A1 | 11/2007 | Amano et al. |
| 2007/0274563 A1 | 11/2007 | Jung et al. |
| 2007/0296817 A1 | 12/2007 | Ebrahimi et al. |
| 2008/0031325 A1 | 2/2008 | Qi |
| 2008/0129844 A1 | 6/2008 | Cusack et al. |
| 2009/0002489 A1 | 1/2009 | Yang et al. |
| 2009/0080698 A1 | 3/2009 | Mihara et al. |
| 2009/0080702 A1 | 3/2009 | Ma et al. |
| 2009/0141941 A1 | 6/2009 | Wagg |
| 2009/0144772 A1 | 6/2009 | Fink et al. |
| 2009/0208106 A1 | 8/2009 | Dunlop et al. |
| 2009/0219387 A1 | 9/2009 | Marman et al. |
| 2009/0322671 A1 | 12/2009 | Scott et al. |
| 2009/0324010 A1* | 12/2009 | Hou .................... G06K 9/00771 382/103 |
| 2010/0030350 A1 | 2/2010 | House et al. |
| 2010/0082585 A1 | 4/2010 | Barsook et al. |
| 2010/0141772 A1 | 6/2010 | Inaguma et al. |
| 2010/0157049 A1 | 6/2010 | Dvir et al. |
| 2010/0166260 A1 | 7/2010 | Huang et al. |
| 2011/0013836 A1 | 1/2011 | Gefen et al. |
| 2011/0085017 A1 | 4/2011 | Robinson et al. |
| 2011/0135149 A1 | 6/2011 | Gefen |
| 2011/0150272 A1 | 6/2011 | Gunasekaranbabu et al. |
| 2011/0199372 A1 | 8/2011 | Porter et al. |
| 2011/0206124 A1 | 8/2011 | Morphet et al. |
| 2012/0026277 A1 | 2/2012 | Malzbender et al. |
| 2012/0078899 A1 | 3/2012 | Fontana et al. |
| 2012/0126973 A1 | 5/2012 | Deangelis et al. |
| 2012/0127297 A1 | 5/2012 | Baxi et al. |
| 2012/0224748 A1 | 9/2012 | Kim et al. |
| 2013/0155229 A1 | 6/2013 | Thornton et al. |
| 2013/0182905 A1 | 7/2013 | Myers et al. |
| 2013/0208124 A1 | 8/2013 | Boghossian et al. |
| 2013/0342482 A1 | 12/2013 | Kim et al. |
| 2014/0056519 A1 | 2/2014 | Gupta |
| 2014/0085501 A1 | 3/2014 | Tran |
| 2014/0098221 A1* | 4/2014 | Brown ............... G06K 9/00771 348/135 |
| 2014/0146084 A1 | 5/2014 | Polo et al. |
| 2014/0211993 A1 | 7/2014 | Ishii |
| 2014/0270363 A1 | 9/2014 | Chakraborty et al. |
| 2014/0270483 A1 | 9/2014 | Lucey et al. |
| 2014/0285717 A1 | 9/2014 | Cai |
| 2014/0369555 A1 | 12/2014 | Zhong et al. |
| 2014/0376775 A1 | 12/2014 | Datta et al. |
| 2015/0178320 A1 | 6/2015 | Gao et al. |
| 2015/0178930 A1 | 6/2015 | Gao et al. |
| 2015/0178931 A1 | 6/2015 | Gao et al. |
| 2015/0178953 A1 | 6/2015 | Gao et al. |
| 2015/0356354 A1 | 12/2015 | Dunlop et al. |

FOREIGN PATENT DOCUMENTS

| | | |
|---|---|---|
| WO | 2013072401 A2 | 5/2013 |
| WO | 2013171746 A1 | 11/2013 |

OTHER PUBLICATIONS

Abbott, J.J., et al., "Effects of Position Quantization and Sampling Rate on Virtual-Wall Passivity," IEEE Transactions on Robotics, Oct. 2005, vol. 21, No. 5, IEEE, Piscataway, NJ, pp. 952-964.

Temel, D., et al., "Efficient Streaming of Stereoscopic Depth-Based 3D Videos," Proceedings of SPIE—The International Society for Optical Engineering, Feb. 2013, SPIE, Bellingham, Washington, 10 pages.

Ahanger G., et al., "Video Query Formulation," Proceedings of SPIE, SPIE—International Society for Optical Engineering, US, vol. 2420, Feb. 9, 1995 (Feb. 9, 1995), pp. 280-291, XP000571790, ISSN: 0277-786X, DOI: 10.1117/12.205295 ISBN: 978-1-62841-213-0.

Black J., et al., "Hierarchical Database for a Multi-Camera Surveillance System," Pattern Analysis and Applications, Springer, New York, NY, US, vol. 7, No. 4, Jun. 1, 2005 (Jun. 1, 2005), pp. 430-446, XP001233299, ISSN: 1433-7541, DOI: 10.1007/S10044-005-0243-8.

Burge, et al., "Qualitative Spatial Relations using Arrangements for Complex Images," 1996.

Ge W., et al., "Vision-Based Analysis of Small Groups in Pedestrian Crowds", IEEE Transactions on Pattern Analysis and Machine Intelligence, IEEE Computer Society, USA, vol. 34, No. 5, May 1, 2012 (May 1, 2012), pp. 1003-1016, XP011490668, ISSN: 0162-8828, DOI: 10.1109/TPAMI.2011.176.

Guo J., et al., "Chapter 4: User Interactive Segmentation", In: "Semantic Video Object Segmentation for Content-Based Multimedia Applications", Sep. 30, 2001 (Sep. 30, 2001), Kluwer Academic Publishers, Boston [u.a.], XP055230246, ISBN: 978-0-7923-7513-5, pp. 20-24, DOI: 9780792375135.

Ibanez J., et al., "Storytelling in virtual environments from a virtual guide perspective", Virtual Reality, vol. 7, No. 1, Dec. 1, 2003 (Dec. 1, 2003), pp. 20-24, XP055179410, ISSN: 1359-4338, DOI: 10.1007/s10055-003-0112-y.

International Search Report and Written Opinion—PCT/US2014/071567—ISA/EPO—Apr. 17, 2015.

(56) References Cited

OTHER PUBLICATIONS

Lipson, et al., "Configuration Based Scene Classification and Image Indexing," 1997.

Papagiannakis G., et al., "LIFEPLUS: Revival of life in ancient Pompeii", Proceeding of Virtual Systems and Multimedia 2002 (VSMM02), Sep. 1, 2002 (Sep. 1, 2002), XP055178462, Retrieved from the Internet: URL:http://george.papagiannakis.org/wp-content/uploads/ 2011/10/Proc.-of-Virtual-Systems-and-Multimedia-VSMM02-Gyeongju-2002-Papagiannakis.pdf [retrieved on Mar. 23, 2015].

Papagiannakis G., et al., "Mixing virtual and real scenes in the site of ancient Pompeii", Computer Animation and Virtual Worlds, vol. 16, No. 1, Feb. 1, 2005 (Feb. 1, 2005), pp. 1-31, XP055178172, ISSN: 1546-4261, DOI: 10.1002/cav.53.

\* cited by examiner

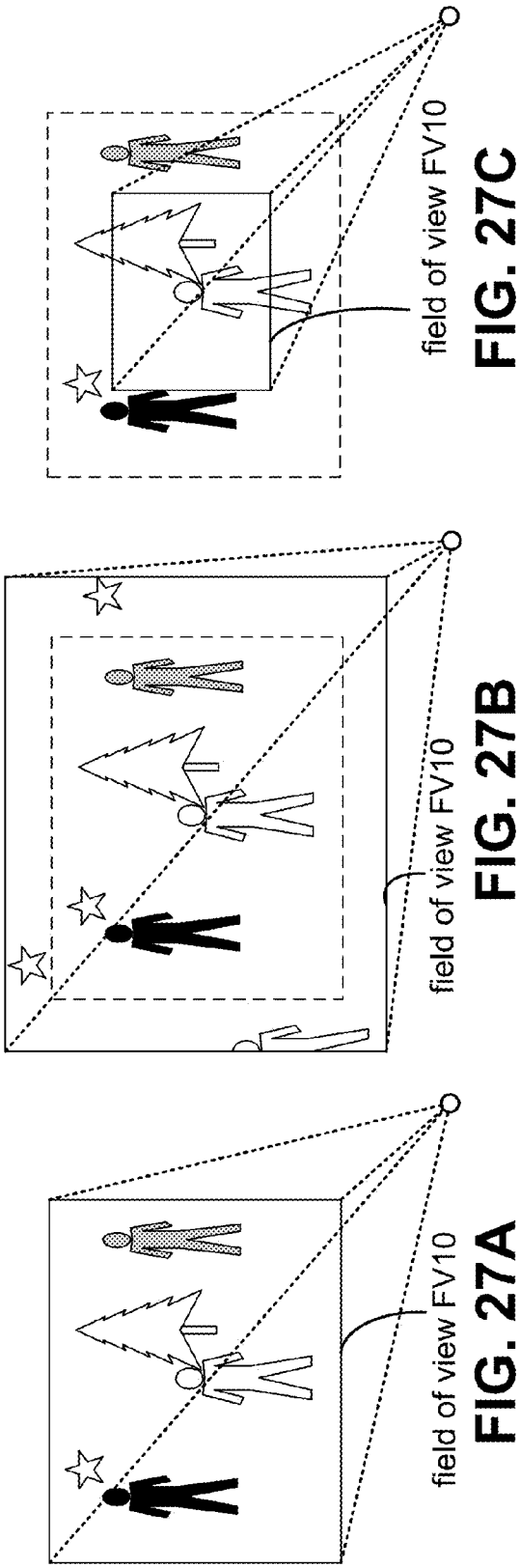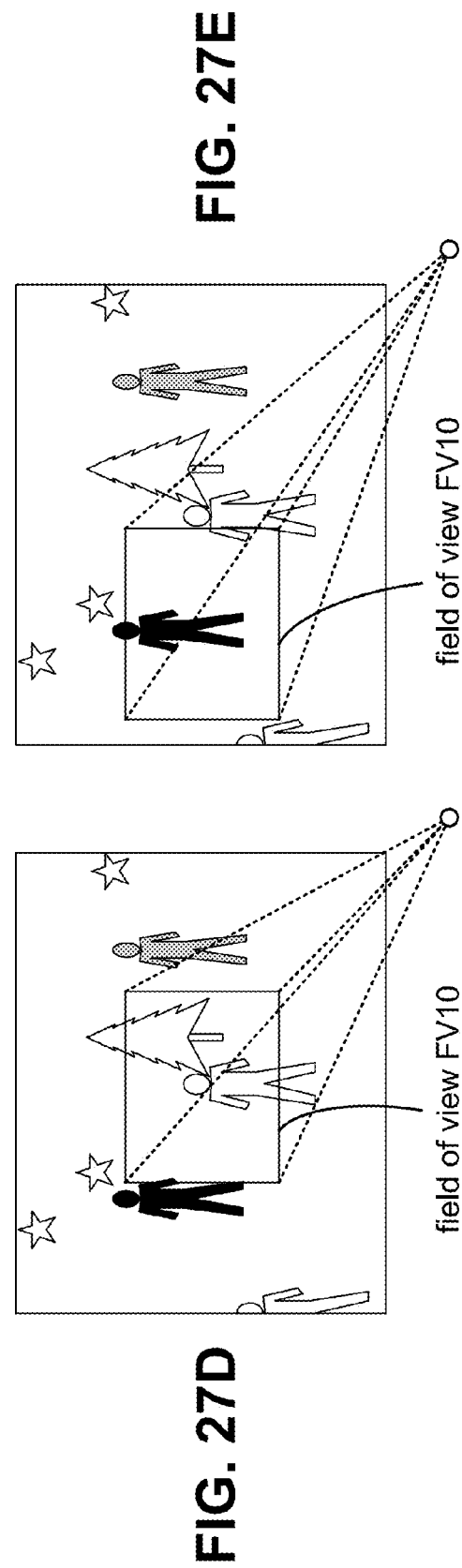

frame PF10 of primary
video stream PS10 frame DF10 of display
video stream DS10

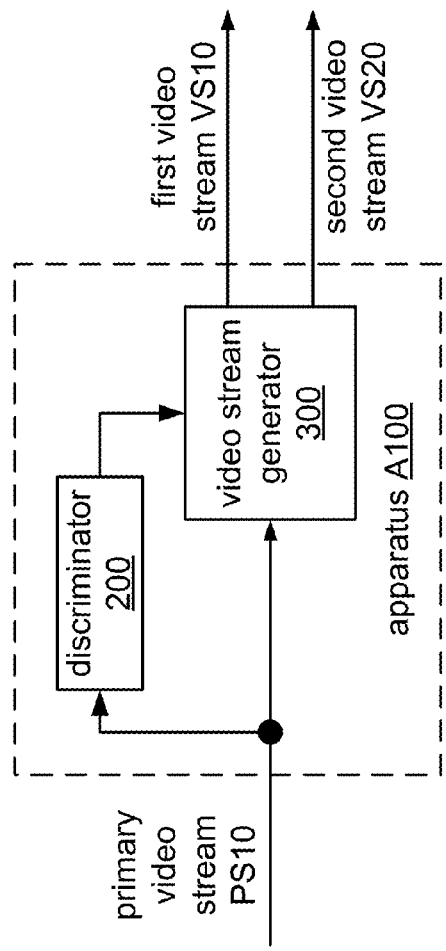
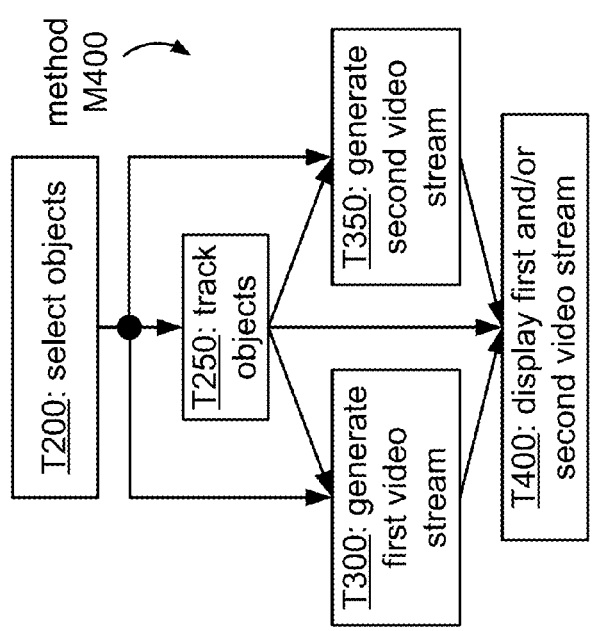
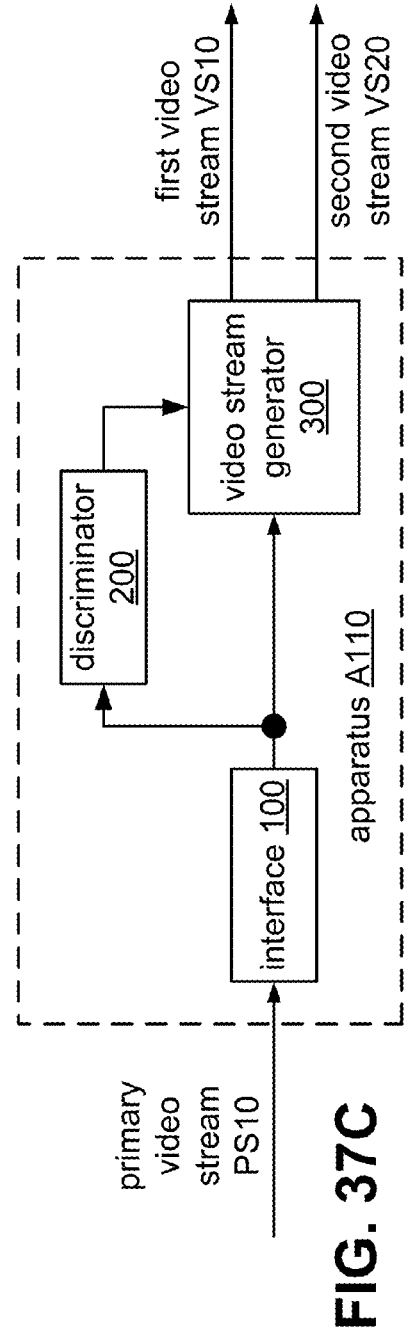

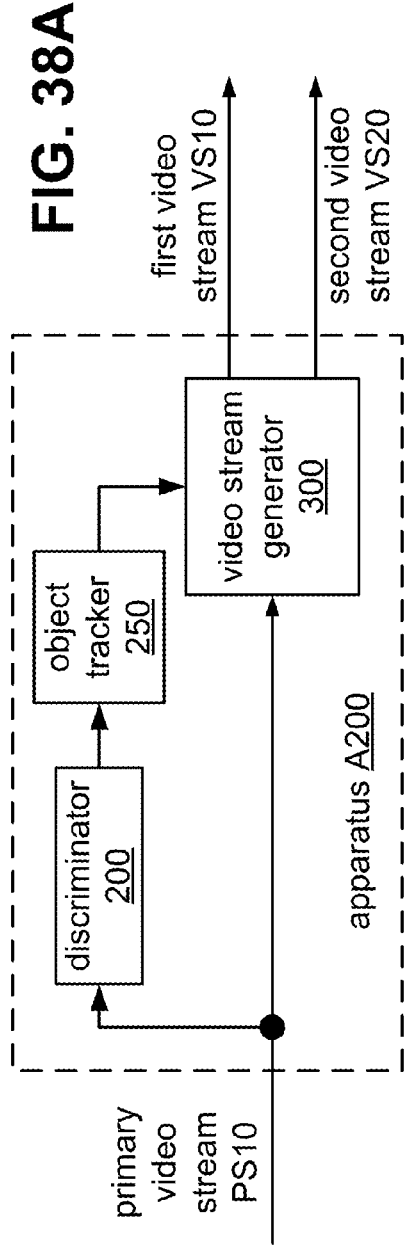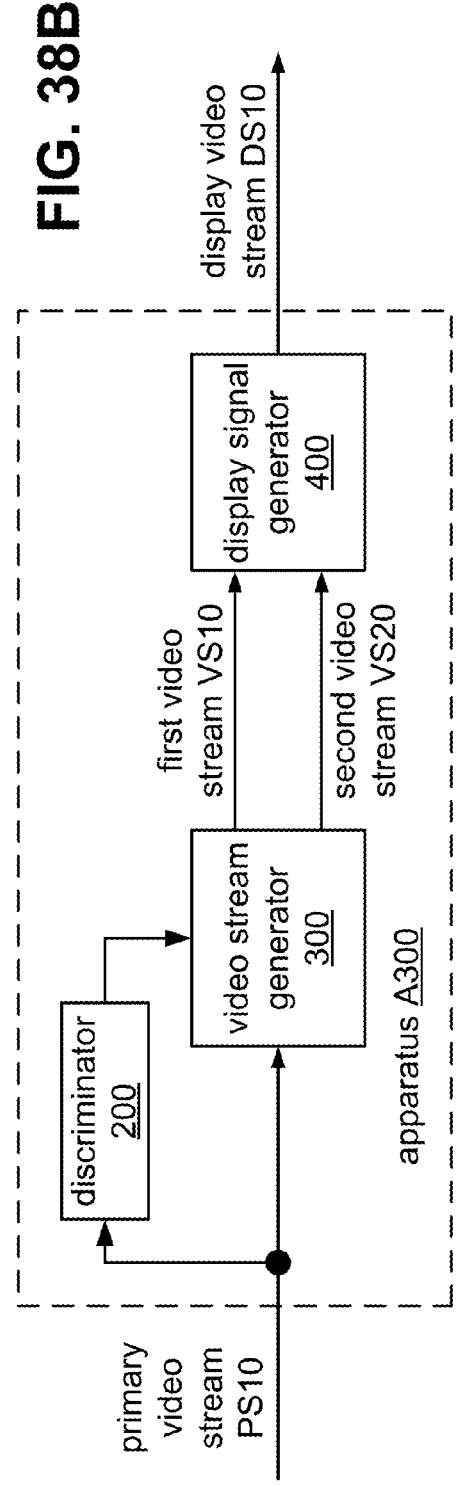

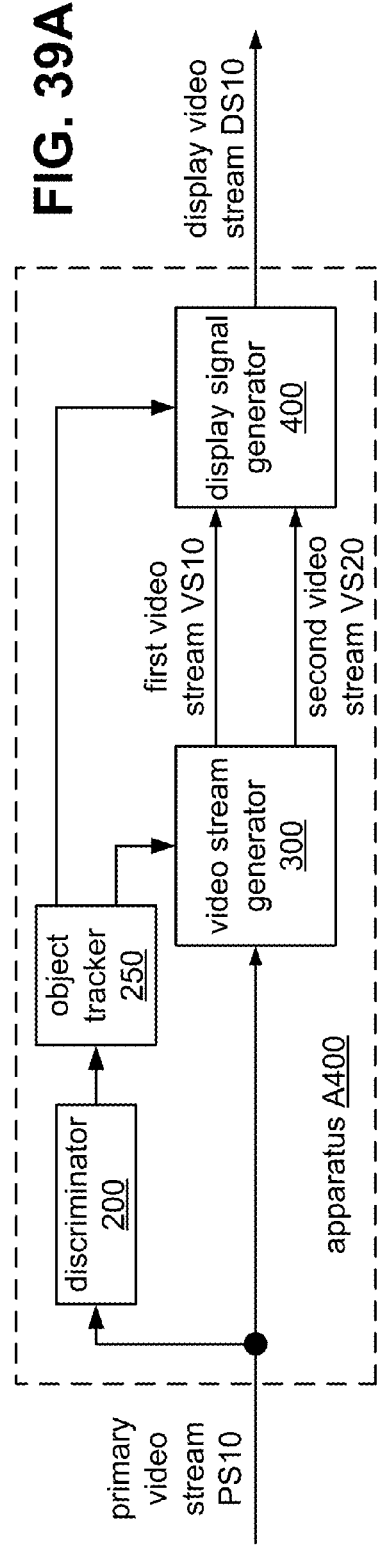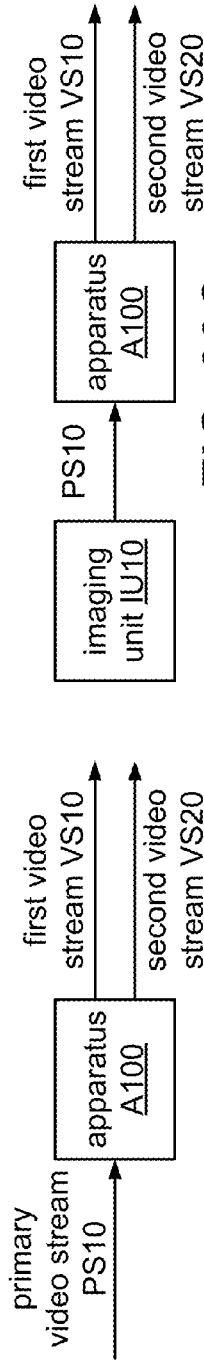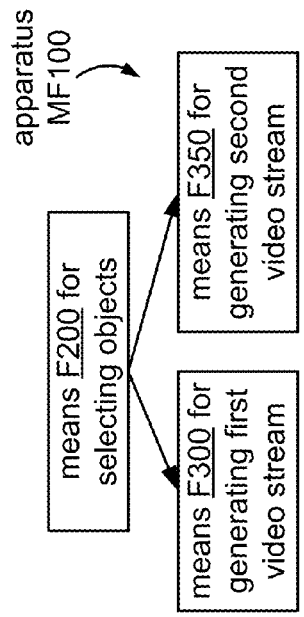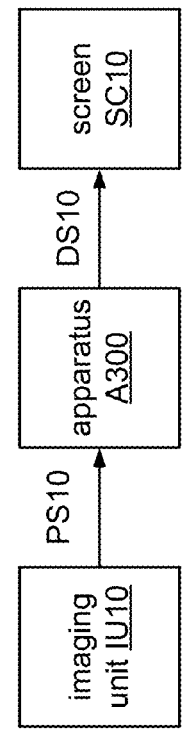
FIG. 39A
FIG. 39B
FIG. 39C
FIG. 39D
FIG. 39E

SELECTION AND TRACKING OF OBJECTS FOR DISPLAY PARTITIONING AND CLUSTERING OF VIDEO FRAMES

I. CLAIM OF PRIORITY

This application claims priority from U.S. Provisional Patent Application No. 61/919,627, filed on Dec. 20, 2013, the contents of which are incorporated herein in their entirety.

II. FIELD

The present disclosure is generally related to object tracking.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

IV. SUMMARY

In a particular embodiment, a method includes receiving, at a mobile device, a selection of a first object in a scene and a second object in the scene. The scene corresponds to a video stream captured and displayed on a screen of the mobile device. The method also includes partitioning the screen into at least a first window and a second window. The method further includes displaying a first portion of the scene that includes the first object in the first window. The first portion of the scene is determined based on a location of the first object. The method also includes displaying a second portion of the scene that includes the second object in the second window. The second portion of the scene is determined based on a location of the second object.

In another particular embodiment, a mobile device includes a memory and a processor coupled to the memory. The processor is configured to receive a selection of a first object in a scene and a second object in the scene. The scene corresponds to a video stream captured and displayed on a screen of the mobile device. The processor is further configured to partition the screen into at least a first window and a second window. The processor is also configured to display a first portion of the scene that includes the first object in the first window. The first portion of the scene is determined based on a location of the first object. The processor is further configured to display a second portion of the scene that includes the second object in the second window. The second portion of the scene is determined based on a location of the second object.

In another particular embodiment, a method includes receiving, at a mobile device, a selection of a first object in a scene and a second object in the scene. The scene corresponds to a video stream captured and displayed on a screen of the mobile device. The method also includes partitioning the screen into a first window and a second window. The method further includes initially displaying a first portion of the scene that includes the first object in the first window. The first portion of the scene is determined based on a location of the first object. The method also includes initially displaying a second portion of the scene that includes the second object in the second window. The second portion of the scene is determined based on a location of the second object. The method also includes controlling in which window the first object and the second object are displayed, based on when a portion of the first object overlaps a portion of the second object by a threshold amount.

In another particular embodiment, a mobile device includes a memory and a processor coupled to the memory. The processor is configured to receive a selection of a first object in a scene and a second object in the scene. The scene corresponds to a video stream captured and displayed on a screen of the mobile device. The processor is also configured to partition the screen into a first window and a second window. The processor is further configured to initially display a first portion of the scene that includes the first object in the first window. The first portion of the scene is determined based on a location of the first object. The processor also is configured to initially display a second portion of the scene that includes the second object in the second window. The second portion of the scene is determined based on a location of the second object. The processor is also configured to control in which window the first object and the second object are displayed, based on when a portion of the first object overlaps a portion of the second object by a threshold amount.

In another particular embodiment, a method includes receiving, at a mobile device, a selection of a first object in a scene and a second object in the scene. The scene corresponds to a video stream captured and displayed on a screen of the mobile device. The method also includes partitioning the screen into a first window and a second window. If the first object was selected prior to selection of the second object, the method includes displaying a first portion of the scene that includes the first object in the first window and displaying a second portion of the scene that includes the second object in the second window. The first portion of the scene is determined based on a location of the first object. The second portion of the scene is determined based on a location of the second object. If the second object was selected prior to selection of the first object, the method includes displaying the first portion of the scene in the second window and displaying the second portion of the scene in the first window.

In another particular embodiment, a mobile device includes a memory and a processor coupled to the memory. The processor is configured to receive a selection of a first object in a scene and a second object in the scene. The scene corresponds to a video stream captured and displayed on a screen of the mobile device. The processor is also configured to partition the screen into a first window and a second window. If the first object was selected prior to selection of the second object, the processor is configured to display a first portion of the scene that includes the first object in the first window and display a second portion of the scene that includes the second object in the second window. The first portion of the scene is determined based on a location of the first object. The second portion of the scene is determined based on a location of the second object. If the second object was selected prior to selection of the first object, the processor is configured to display the first portion of the scene in the second window and display the second portion of the scene in the first window.

In another particular embodiment, a method includes receiving, at a mobile device, a selection of multiple objects in a scene. The scene corresponds to a video stream captured and displayed on a screen of the mobile device. The method also includes tracking a geometry between each object. The method further includes displaying an indication of the geometry on the screen.

In another particular embodiment, a mobile device includes a memory and a processor coupled to the memory. The processor is configured to receive a selection of multiple objects in a scene. The scene corresponds to a video stream captured and displayed on a screen of the mobile device. The processor is also configured to track a geometry between each object. The processor is also configured to display an indication of the geometry on the screen.

In another particular embodiment, a method includes receiving, at a mobile device, a selection of multiple objects in a scene. The scene corresponds to a video stream captured and displayed on a screen of the mobile device. The method also includes tracking a geometry between each object. The method further includes clustering frames of the video stream based on at least one parameter associated with the geometry.

In another particular embodiment, a mobile device includes a memory and a processor coupled to the memory. The processor is configured to receive a selection of multiple objects in a scene. The scene corresponds to a video stream captured and displayed on a screen of the mobile device. The processor is also configured to track a geometry between each object. The processor is further configured to cluster frames of the video stream based on at least one parameter associated with the geometry.

In another particular embodiment, a method includes receiving, at a mobile device, a selection of a first object in a scene and a second object in the scene. The scene corresponds to a video stream captured and displayed on a screen of the mobile device. If a size of the first object with respect to a size of the screen is greater than a size of the second object with respect to the size of the screen, the method includes displaying a first portion of the scene that includes the first object in a first window and displaying a second portion of the scene that includes the second object in a second window. The first portion of the scene is determined based on a location of the first object. The second portion of the scene is determined based on a location of the second object. The first window is larger than the second window. If the size of the first object with respect to the size of the screen is not greater than the size of the second object with respect to the size of the screen, the method includes displaying the first portion of the scene in the second window and displaying the second portion of the scene in the first window.

In another particular embodiment, a mobile device includes a memory and a processor coupled to the memory. The processor is configured to receive a selection of a first object in a scene and a second object in the scene. The scene corresponds to a video stream captured and displayed on a screen of the mobile device. If a size of the first object with respect to a size of the screen is greater than a size of the second object with respect to the size of the screen, the processor is configured to display a first portion of the scene that includes the first object in a first window and to display a second portion of the scene that includes the second object in a second window. The first portion of the scene is determined based on a location of the first object. The second portion of the scene is determined based on a location of the second object. The first window is larger than the second window. If the size of the first object with respect to the size of the screen is not greater than the size of the second object with respect to the size of the screen, the processor is configured to display the first portion of the scene in the second window and to display the second portion of the scene in the first window.

In another particular embodiment, a method includes tracking, at a robot, a geometry between multiple objects. The method also includes performing a processing function based on the geometry.

In another particular embodiment, a method includes receiving, at a mobile device, a selection of a first object in a scene, a second object in the scene, and a third object in the scene. The scene corresponds to a video stream captured and displayed on a screen of the mobile device. The method also includes partitioning the screen into at a first window, a second window, a third window, and a fourth window. The method further includes displaying a first portion of the scene that includes the first object in the first window. The first portion of the scene is determined based on a location of the first object. The method also includes displaying a second portion of the scene that includes the second object in the second window. The second portion of the scene is determined based on a location of the second object. The method further includes displaying a third portion of the scene that includes the third object in the third window. The third portion of the scene is determined based on a location of the third object. The method also includes displaying an indication of a geometry between each object in the fourth window.

In another particular embodiment, a mobile device includes a memory and a processor coupled to the memory. The processor is configured to receive a selection of a first object in a scene, a second object in the scene, and a third object in the scene. The scene corresponds to a video stream captured and displayed on a screen of the mobile device. The processor is also configured to partition the screen into at a first window, a second window, a third window, and a fourth window. The processor is further configured to display a first portion of the scene that includes the first object in the first window. The first portion of the scene is determined based on a location of the first object. The processor is also configured to display a second portion of the scene that includes the second object in the second window. The second portion of the scene is determined based on a location of the second object. The processor is further configured to display a third portion of the scene that includes the third object in the third window. The third portion of the scene is determined based on a location of the third object. The processor is also configured to display an indication of a geometry between each object in the fourth window.

In another particular embodiment, a method includes receiving, at a mobile device, an indication of a particular geometry of selected objects in a video stream. The method also includes retrieving frames of the video stream based on the particular geometry. The method further includes displaying the retrieved frames on a screen of the mobile device.

In another particular embodiment, a mobile device includes a memory and a processor coupled to the memory. The processor is configured to receive indication of a particular geometry of selected objects in a video stream. The processor is also configured to retrieve frames of the video stream based on the particular geometry. The processor is also configured to display the retrieved frames on a screen of the mobile device.

A method of video processing according to a general configuration includes selecting at least two objects within a primary video stream that has a primary field of view; in response to said selecting, generating, from the primary video stream, a first video stream including a first of the selected objects and having a first field of view that is narrower than the primary field of view; and subsequent to said selecting, generating, from the primary video stream, a second video stream including a second of the selected objects and having a second field of view that is narrower than the primary field of view. In this method, after said generating the first video stream and said generating the second video stream begin, the first field of view includes a portion of the primary field of view that is not within the second field of view and the second field of view includes a portion of the primary field of view that is not within the first field of view. Computer-readable storage media (e.g., non-transitory media) having instructions that cause a machine executing the instructions to perform such a method are also disclosed.

An apparatus for video processing according to a general configuration includes means for selecting at least two objects within a primary video stream that has a primary field of view; means for generating from the primary video stream, in response to said selecting, a first video stream including a first of the selected objects and having a first field of view that is narrower than the primary field of view; and means for generating from the primary video stream, subsequent to said selecting, a second video stream including a second of the selected objects and having a second field of view that is narrower than the primary field of view. In this apparatus, after said generating the first video stream and said generating the second video stream begin, the first field of view includes a portion of the primary field of view that is not within the second field of view and the second field of view includes a portion of the primary field of view that is not within the first field of view.

An apparatus for video processing according to another general configuration includes a discriminator configured to select at least two objects within a primary video stream that has a primary field of view; and a video stream generator configured to generate from the primary video stream, in response to said selecting, a first video stream including a first of the selected objects and having a first field of view that is narrower than the primary field of view, and to generate from the primary video stream, subsequent to said selecting, a second video stream including a second of the selected objects and having a second field of view that is narrower than the primary field of view. In this apparatus, after said generating the first video stream and said generating the second video stream begin, the first field of view includes a portion of the primary field of view that is not within the second field of view and the second field of view includes a portion of the primary field of view that is not within the first field of view.

One particular advantage provided by at least one of the disclosed embodiments is an improved visual display of image tracking on mobile devices. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIGS. 27A-27E shows a field of view FV10 and results of various operations on it.

Figure 34A:
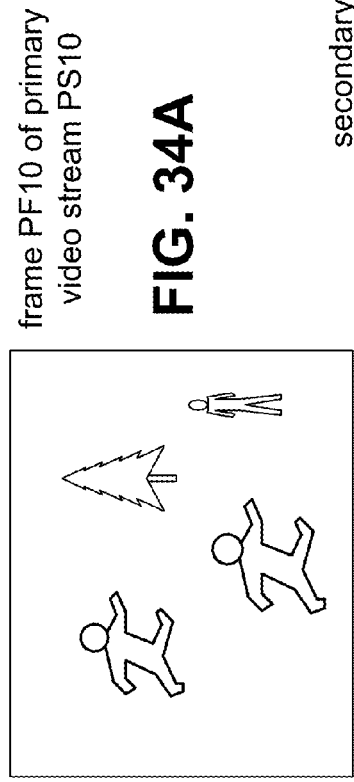
Figure 34B:
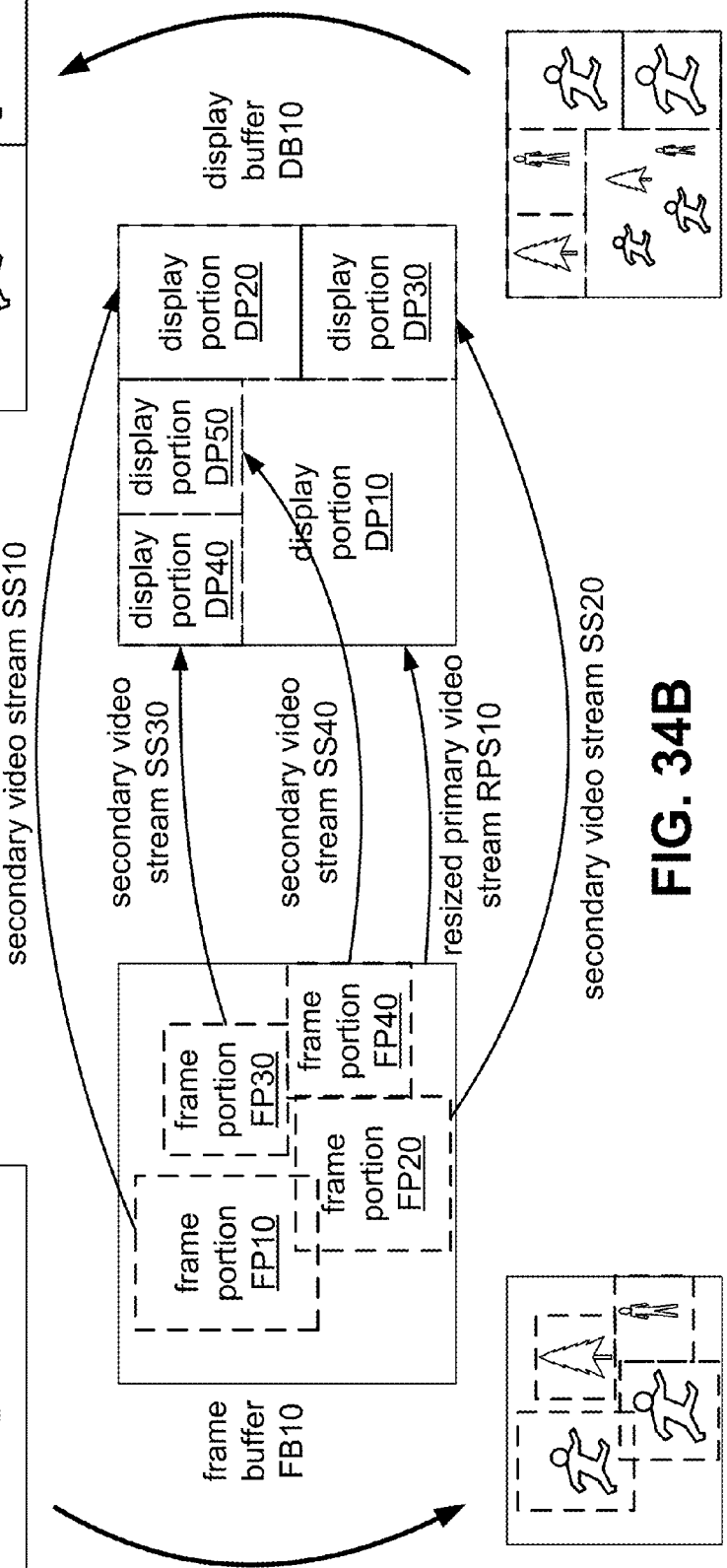
Figure 34C:
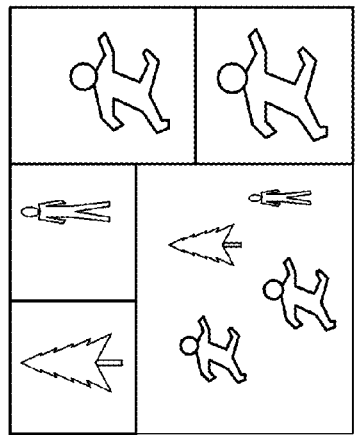

FIGS. 34A-C show an application of method M300.

Figure 35:
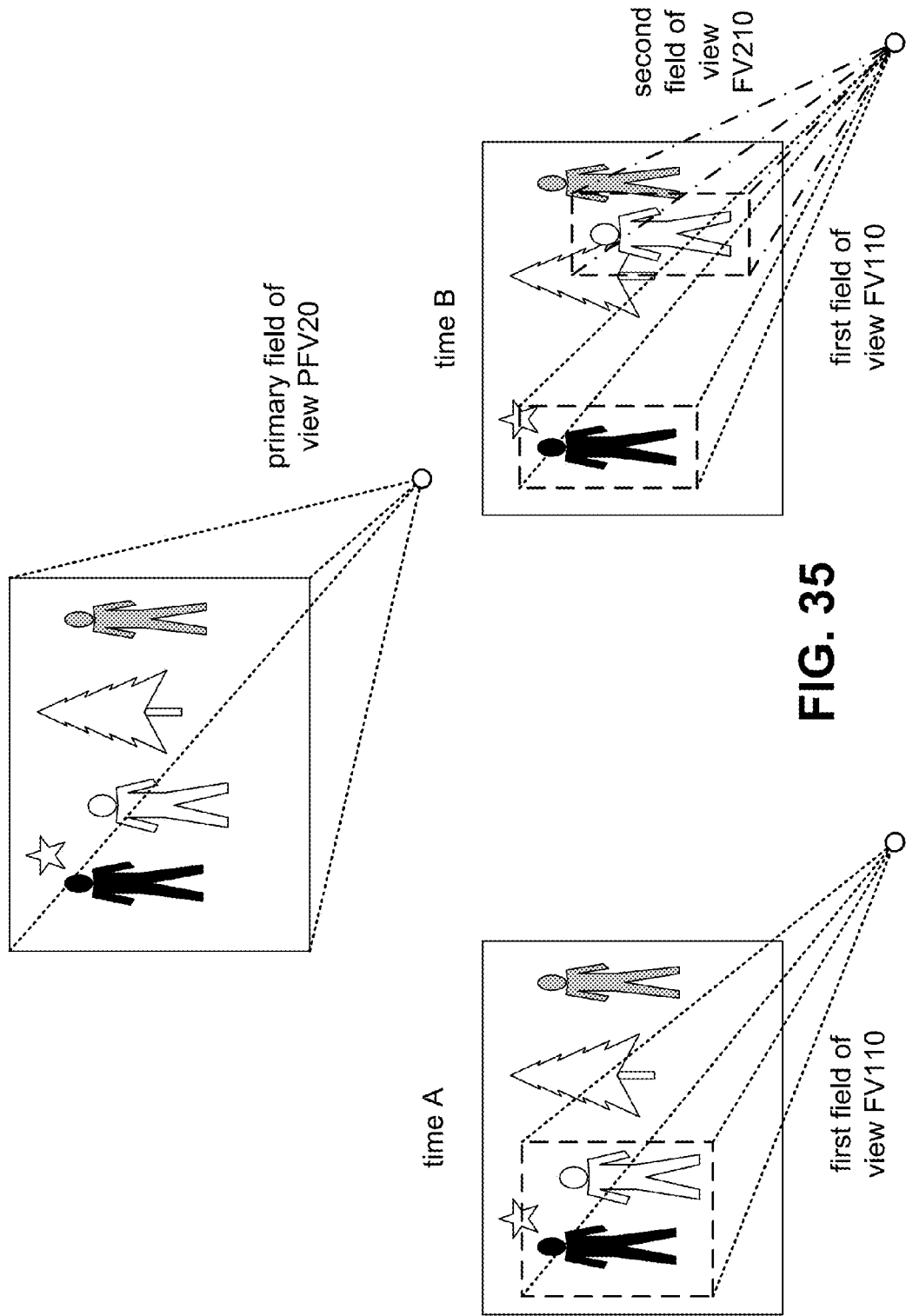

FIG. 35 shows an example of an application of method M100.

FIGS. 36A-F show examples of default arrangements of display windows.

FIG. 37A shows a flowchart of an implementation M400 of methods M200 and M300.

FIG. 37B shows a block diagram of an apparatus A100 according to a general configuration.

FIG. 37C shows a block diagram of an implementation A110 of apparatus A100.

FIG. 38A shows a block diagram of an implementation A200 of apparatus A100.

FIG. 38B shows a block diagram of an implementation A300 of apparatus A100.

FIG. 39A shows a block diagram of an implementation A400 of apparatus A200 and A300.

FIGS. 39B and 39C show block diagrams of applications of apparatus A100.

FIG. 39D shows a block diagram of an application of apparatus A300.

FIG. 39E shows a block diagram of an apparatus MF100 according to a general configuration.

Figure 40A:
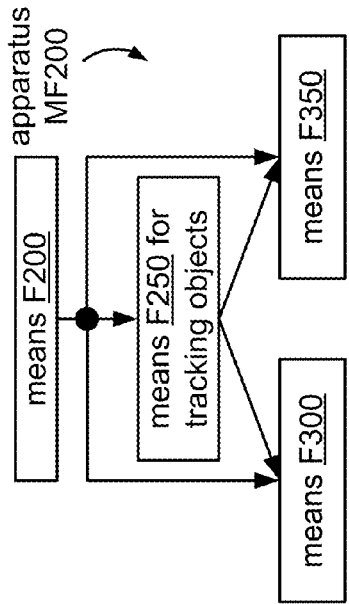

FIG. 40A shows a block diagram of an implementation MF110 of apparatus MF100.

Figure 40B:
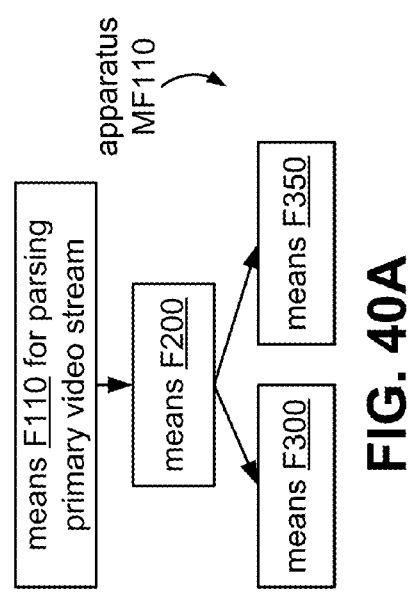

FIG. 40B shows a block diagram of an implementation MF200 of apparatus MF100.

Figure 40C:
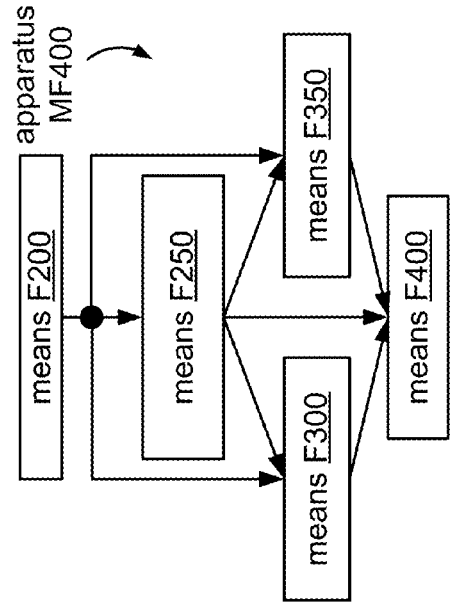

FIG. 40C shows a block diagram of an implementation MF300 of apparatus MF100.

Figure 40D:
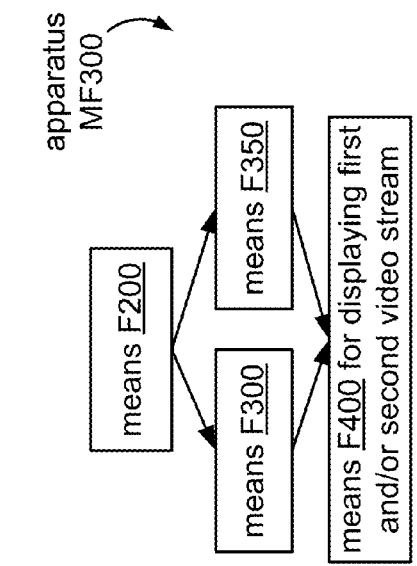

FIG. 40D shows a block diagram of an implementation MF400 of apparatus MF200 and MF300.

Figure 41B:
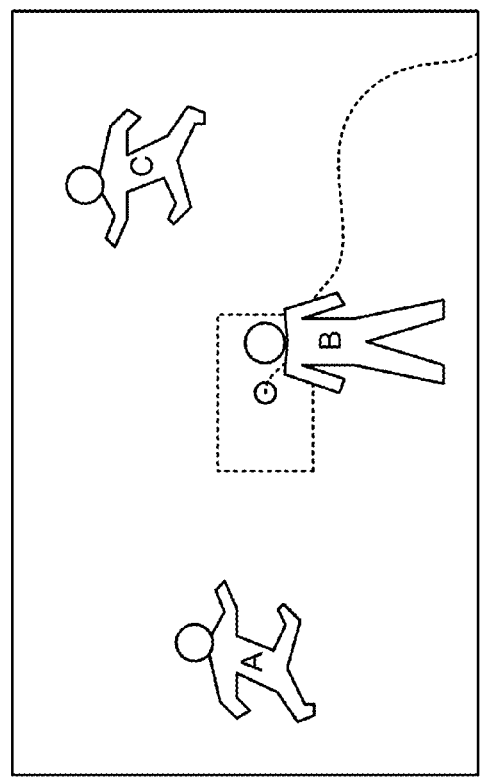
Figure 41A:
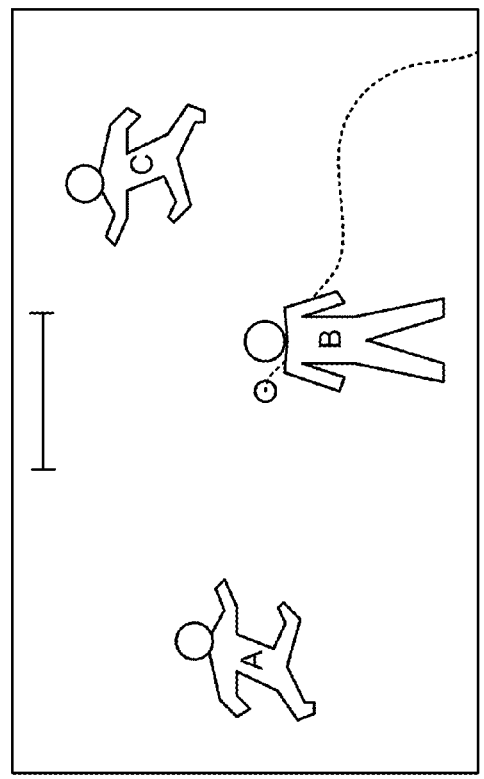

FIGS. 41A and 41B show two examples of displays of a portion of the field of view of the primary video stream that includes the selected objects.

Figure 42:
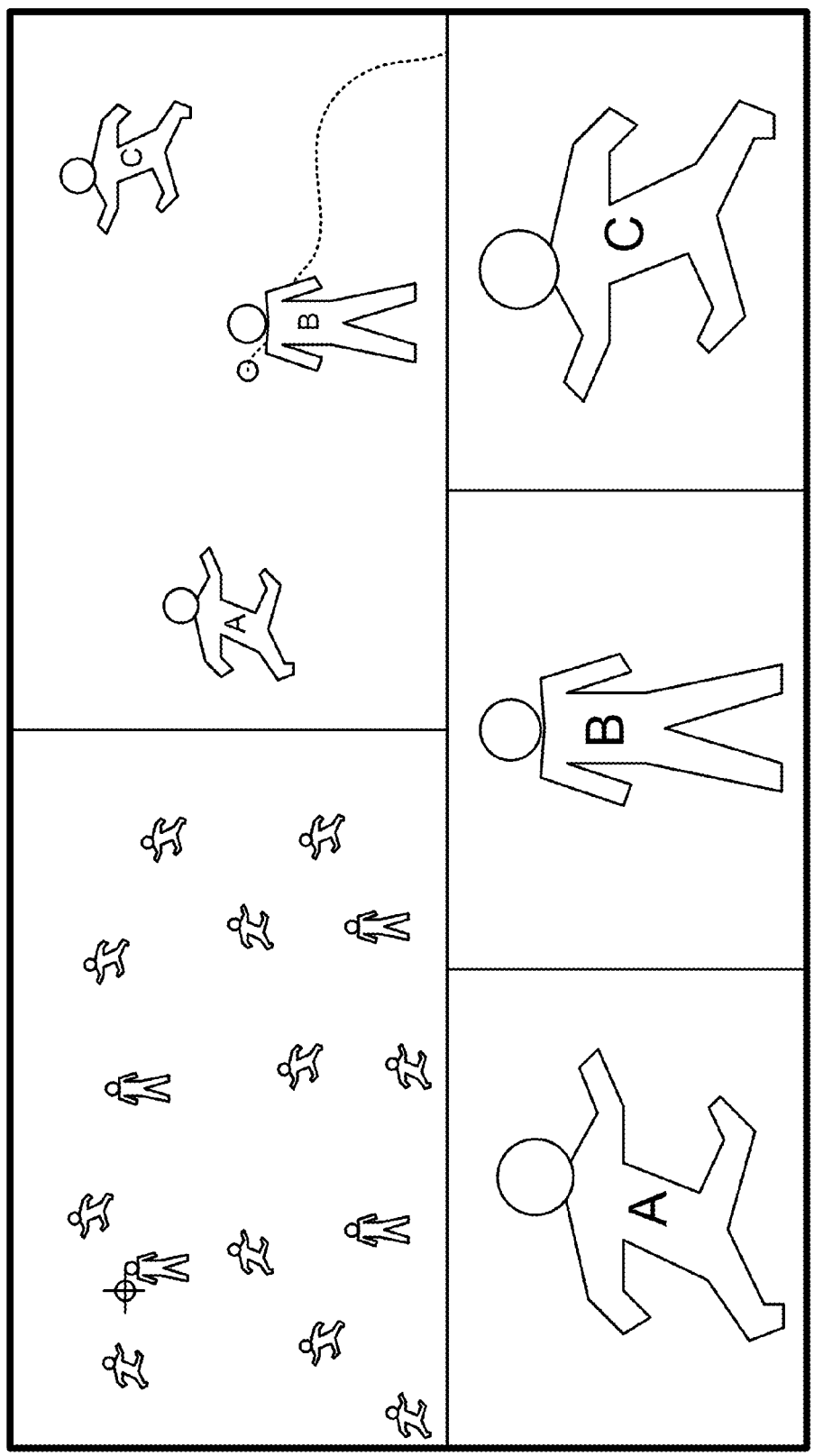

FIG. 42 shows an example of a frame of a display video stream.

Figure 43A:
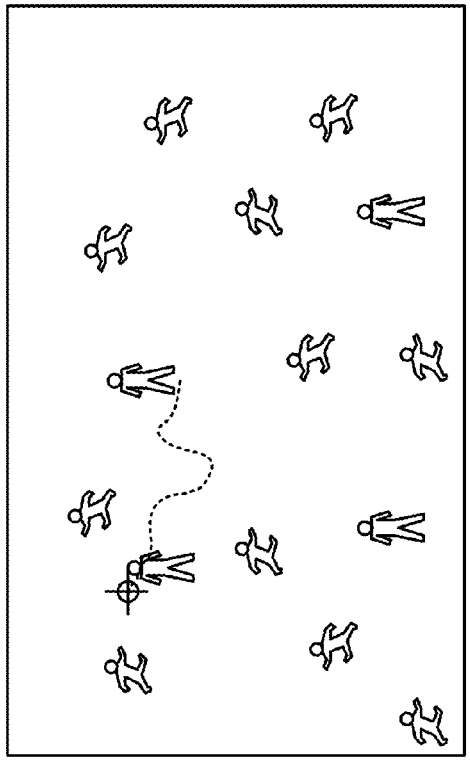
Figure 43B:
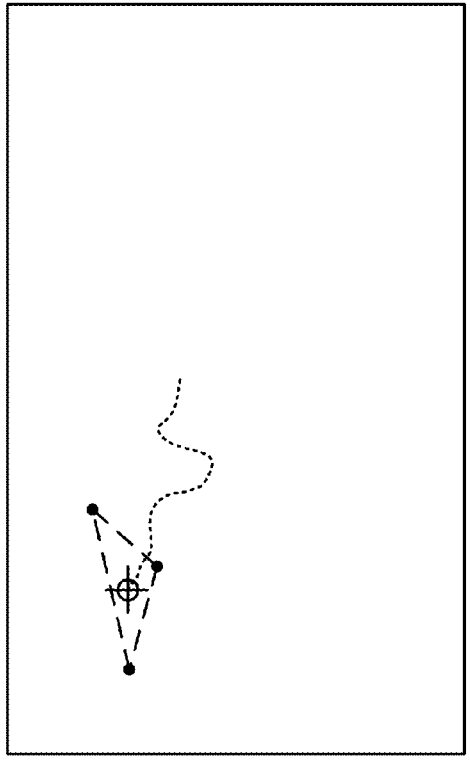
Figure 43C:
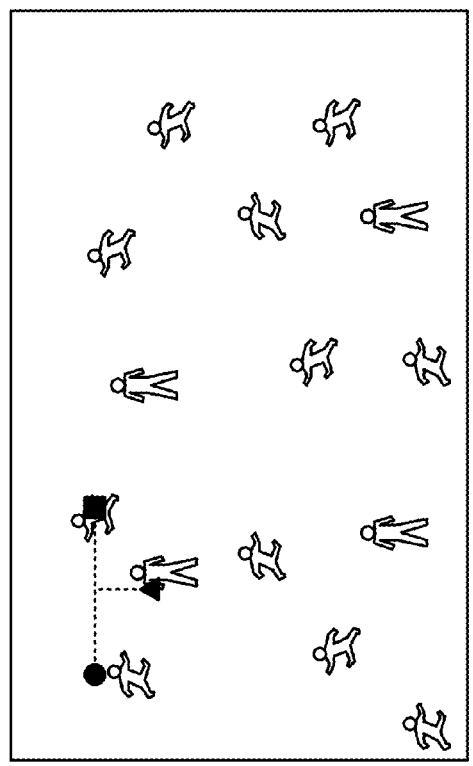

FIGS. 43A and 43C show windows displaying frames of the primary video stream, and FIG. 43B shows an example of a graphic that indicates a composite geometry of the selected objects.

VI. DETAILED DESCRIPTION

A wireless telephone or other mobile device may capture video streams with a camera and/or receive video streams from another device and/or via a network. New and/or improved features for tracking objects within the video streams may be desired.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Unless otherwise indicated, the term "series" is used to indicate a sequence of two or more items. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

Figure 1:
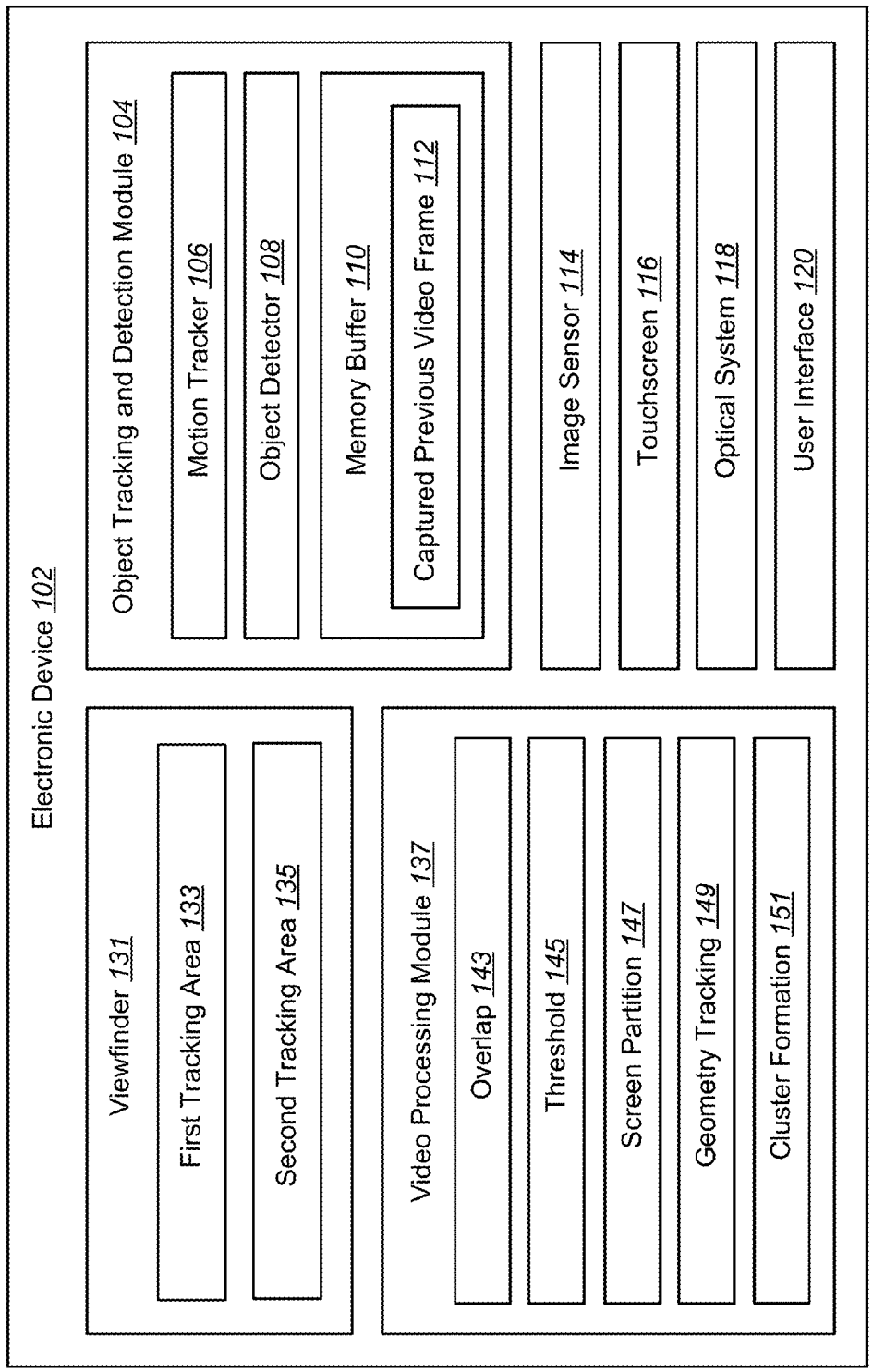
FIG. 1 is a block diagram that depicts an electronic device.

Referring to FIG. 1, a block diagram illustrating an electronic device 102 is shown. The electronic device 102 may also be referred to as a wireless communication device, a mobile device, a mobile station, a subscriber station, a client, a client station, a user equipment (UE), a remote station, an access terminal, a mobile terminal, a terminal, a user terminal, a subscriber unit, etc. Examples of electronic devices include laptop or desktop computers, cellular phones, smart phones, wireless modems, e-readers, tablet devices, gaming systems, etc. Some of these devices may operate in accordance with one or more industry standards.

The electronic device 102, such as a smartphone or tablet computer, may include a camera. The camera may include an image sensor 114 and an optical system 118 (e.g., lenses) that focuses images of objects that are located within the field of view of the optical system 118 onto the image sensor 114. The electronic device 102 may also include a camera software application and a display screen. When the camera application is running, images of objects that are located within the field of view of the optical system 118 may be recorded by the image sensor 114. The images that are being recorded by the image sensor 114 may be displayed on the display screen. These images may be displayed in rapid succession at a relatively high frame rate so that, at any given moment in time, the objects that are located within the field of view of the optical system 118 are displayed on the display screen. Although the embodiments are described in terms of captured frames (e.g., video frames), the techniques discussed herein may be used on any digital image. Therefore, the terms "frame" and "digital image" may be used interchangeably herein.

A user interface 120 of the camera application may permit one or more objects that are being displayed on the display screen to be tracked. The user of the electronic device 102 may be permitted to select the object(s) that is/are to be tracked. Further, the selected object(s) may be used as a reference for later detecting the object.

In one configuration, the display screen is a touchscreen 116 that receives input from physical touch, e.g., by a finger, stylus or other tool. The touchscreen 116 may receive touch input defining a target object to be tracked. For example, if the electronic device 102 is capturing a nature scene that includes an animal of interest, a user may draw a bounding box around the animal indicating a desire that the animal be tracked, or detected, if necessary. Target objects may be selected in any suitable way. For example, facial recognition, pedestrian recognition, etc., may be used to select a target object that is to be tracked, detected, or both. In one configuration, multiple objects may be tracked. A user interface 120 may allow a user to interact with an object tracking and detection module 104, e.g., to select (i.e., define) one or more target objects. The touchscreen 116 may include a viewfinder 131. The viewfinder 131 may refer to the portion of the touchscreen 116 that displays a video stream or a live feed. For example, the viewfinder 131 may display the view obtained by a camera on the electronic device 102.

The electronic device 102 may include an object tracking and detection module 104 for tracking a selected object and/or detecting the object in a video frame. The object tracking and detection module 104 may include a motion tracker 106 for tracking one or more objects. The motion tracker 106 may be motion-based for tracking a motion of points on an image (e.g., a video frame) from frame to frame to estimate the location and/or change of location of a target object between a previous video frame and a current video frame.

The object tracking and detection module may also include an object detector 108 for detecting an object in a video frame. The object detector 108 may use an object model, rather than a motion-based model, to detect an object by comparing all or a portion of a current video frame to a selected object or portion of a captured previous video frame 112 (e.g., in a sequence of video frames). The object detector 108 may be used for detecting multiple objects within a video frame.

The object tracking and detection module 104 may also include a memory buffer 110. The memory buffer 110 may store one or more captured frames and data associated with the captured video frames. In one example, the memory buffer 110 may store a previous captured video frame 112. The object tracking and detection module 104 may use data provided from the memory buffer 110 about a captured previous video frame 112 in performing motion-based tracking and/or object detection. Data may be provided to the motion tracker 106 or object detector 108 via feedback from the memory buffer 110 in order to tailor motion-based tracking and object detection to more accurately track and/or detect a target object. For example, the memory buffer 110 may provide location and window size data to the motion tracker 106 and the object detector 108 to provide the motion tracker 106 and object detector 108 with one or more parameters that may be used to more accurately pinpoint a location and size of an object when tracking or detecting the object.

As stated above, the electronic device 102 may perform motion-based tracking. Motion-based tracking may be performed using a variety of methods. In one example, tracking is performed by a median flow method in which the motion tracker 106 accepts a pair of images $I_t$, $I_{t+1}$ (e.g., video frames) and a bounding box $\beta_t$ and outputs a bounding box $\beta_{t+1}$. A set of points may be initialized on a rectangular grid within the bounding box $\beta_t$ and the points may be tracked to generate a sparse motion flow between $I_t$ and $I_{t+1}$. A quality of the point prediction may be estimated and each point assigned an error. A portion (e.g., 50%) of the worst predictions may be filtered out while the remaining predictions are used to estimate the displacement of the whole bounding box. The motion tracker 106 may perform motion-based tracking on each video frame captured by the electronic device 102. In a similar method, motion-based tracking may be performed by calculating one or more gradients (e.g., x and y gradients) and using the difference between a pair of frames to calculate a time gradient and using the multiple gradient values to accurately track a target object within a current video frame. Further details regarding motion-based tracking are provided below.

When performing motion-based tracking, the motion tracker 106 may determine a tracking confidence value based on a calculated or estimated accuracy of the motion-tracking method. In some configurations, the tracking confidence value may be a real number between 0 and 1 corresponding to a likelihood or probability that a target object falls within a current video frame or a defined window of the video frame. The tracking confidence value may be compared to a tracking threshold. If the tracking confidence value is greater than the tracking threshold, the likelihood may be high that the target object is found within the current video frame. Alternatively, if the tracking confidence value is less than or equal to a tracking threshold, the likelihood may be low or uncertain whether the target object is found within the current video frame. Various methods for determining a tracking confidence value may be used. In one configuration, the tracking confidence value is determined by calculating a normalized cross correlation (NCC) between a tracked window (e.g., a tracking patch window) in a current video frame and previously stored image patches from previously captured video frames. Further details regarding determining a tracking confidence value are provided below.

The electronic device 102 may also perform object detection. Object detection may be performed using a variety of methods. In one configuration, object detection is performed using a sliding window method in which the content of multiple subsets of windows within a video frame are viewed to determine whether a target object is found in a current video frame or within a particular window or subset of windows of the current video frame. All or a subset of all possible window locations and sizes may be searched in a video frame. For example, each window may correspond to pixels of data and the object detector 108 may perform one or more computations using the pixels of data to determine a level of confidence (e.g., a binary indicator) that the target object is within a particular window or sub-window. Based on the level of confidence associated with one or more windows, a detector confidence value may be obtained for a current video frame. Further, additional techniques may be used for increasing the accuracy or efficiency of the object detection. Some of these techniques are explained below.

In some configurations, the motion tracker 106 and object detector 108 may operate sequentially rather than in parallel. For example, the electronic device 102 may perform motion-based tracking of a selected object (e.g., target object) and sequentially perform object detection of the selected object based on a tracked parameter. In one configuration, the electronic device 102 may perform motion-based tracking on a current video frame. The electronic device 102 may then perform object detection on the current frame based on a tracked parameter. In one configuration, the tracked parameter may be based on a comparison between a confidence value and a threshold. For example, if a tracking confidence value is below a tracking threshold, the electronic device 102 may perform object detection. Alternatively, if a tracking confidence value is above a tracking threshold, the electronic device 102 may skip object detection for a current video frame and continue performing motion-based tracking on a next video frame based on the motion tracking results of the current video frame. In other words, object detection may be performed only when the motion-based tracking is not very good, e.g., tracking confidence value is below a tracking threshold. Other tracked parameters may be used when considering whether and/or how object detection is performed. Examples of tracked parameters may include a region of a target object, a window location, a window size, a scale level, a target size, a tracking and/or detection confidence value or other parameter that may be used to facilitate efficient tracking and/or detection of a target object.

Sequentially performing motion-based tracking and object detection based on a tracked parameter may enable the electronic device 102 to track and/or detect a target object within a video frame without performing extensive computations. Specifically, because motion-based tracking may be less computationally intensive than object detection, an electronic device 102 may skip performing object detection where motion-based tracking may be used to accurately track a target object within a current video frame. For example, if an electronic device 102 determines that a tracking confidence value exceeds a specific target threshold, the electronic device 102 may determine that object detection is not needed on a current video frame to accurately determine the location or presence of a target object within the current video frame. Further, because object detection may be beneficial in many cases, the electronic device 102 may determine cases in which object detection may be used to more accurately detect a target object or to perform object detection in cases where motion-based tracking is inadequate based on a comparison to a tracking threshold value.

In some configurations, rather than skipping object detection on a current video frame, the results of the motion-based tracking and/or additional information provided by the memory buffer 110 may be used to narrow or tailor the process of performing object detection. For example, where a target object cannot be accurately tracked using a motion-based tracking method, the electronic device 102 may still estimate or obtain information about the location, window scale or other tracked parameter associated with a target object that may be used during object detection to more accurately detect an object using less computational power than without the parameters provided via motion-based tracking. Therefore, even in cases where the motion-based tracking does not provide a tracking confidence value exceeding a tracking threshold, the results of the motion-based tracking may be used when subsequently performing object detection.

The viewfinder 131 on the electronic device 102 may include a first tracking area 133 and a second tracking area 135. Both the first tracking area 133 and the second tracking area 135 may be specified by a user using the touchscreen 116. For example, a user may drag a focus ring on the touchscreen 116 to the desired locations of the first tracking area 133 and the second tracking area 135. Although not required, one of the tracking areas may be stationary. For example, the first tracking area 133 may track an object (e.g., a person walking) and the second tracking area 135 may cover a stationary tree. In one configuration, the second tracking area 135 may cover the entire touchscreen 116 on the electronic device 102.

The electronic device 102 may include a video processing module 137. The picture processing module 137 may include an overlap 143. The overlap 143 may reflect the amount of overlap between the first tracking area 133 and the second tracking area 135. For example, the overlap 143 may be 0% if the first tracking area 133 and the second tracking area 135 do not overlap each other at all. Likewise, the overlap 143 may be 100% if the first tracking area 133 completely overlaps the second tracking area 135 (or if the second tracking area 135 completely overlaps the first tracking area 133, depending on which tracking area is larger). The video processing module 137 may include a threshold 145. The overlap 143 may be compared with the threshold 145 to determine whether video processing should be performed, as described with respect to FIG. 13.

The video processing module 137 may also include a screen partition 147 function. For example, the screen partition 147 may partition the viewfinder 132 into multiple windows to display individual video streams associated with the first tracking area 133 and the second tracking area 135, as described with respect to FIGS. 11, 13, 15, and 21. The video processing module 137 may also include a geometry tracking 149 function. For example, the geometry tracking 149 function may track a geometry between the first tracking area 133 and the second tracking area 135, as described with respect to FIGS. 17 and 18. The geometry may be displayed on the viewfinder 131. The video processing module 137 may also include a cluster formation 151 function. The cluster formation 151 function may generate clusters based on at least one parameter (e.g., a center of mass) associated with the geometry. For example, each cluster may include video frames that have a substantially similar geometry between the first tracking area 133 and the second tracking area 135, as describe with respect to FIGS. 17 and 18.

Figure 2A:
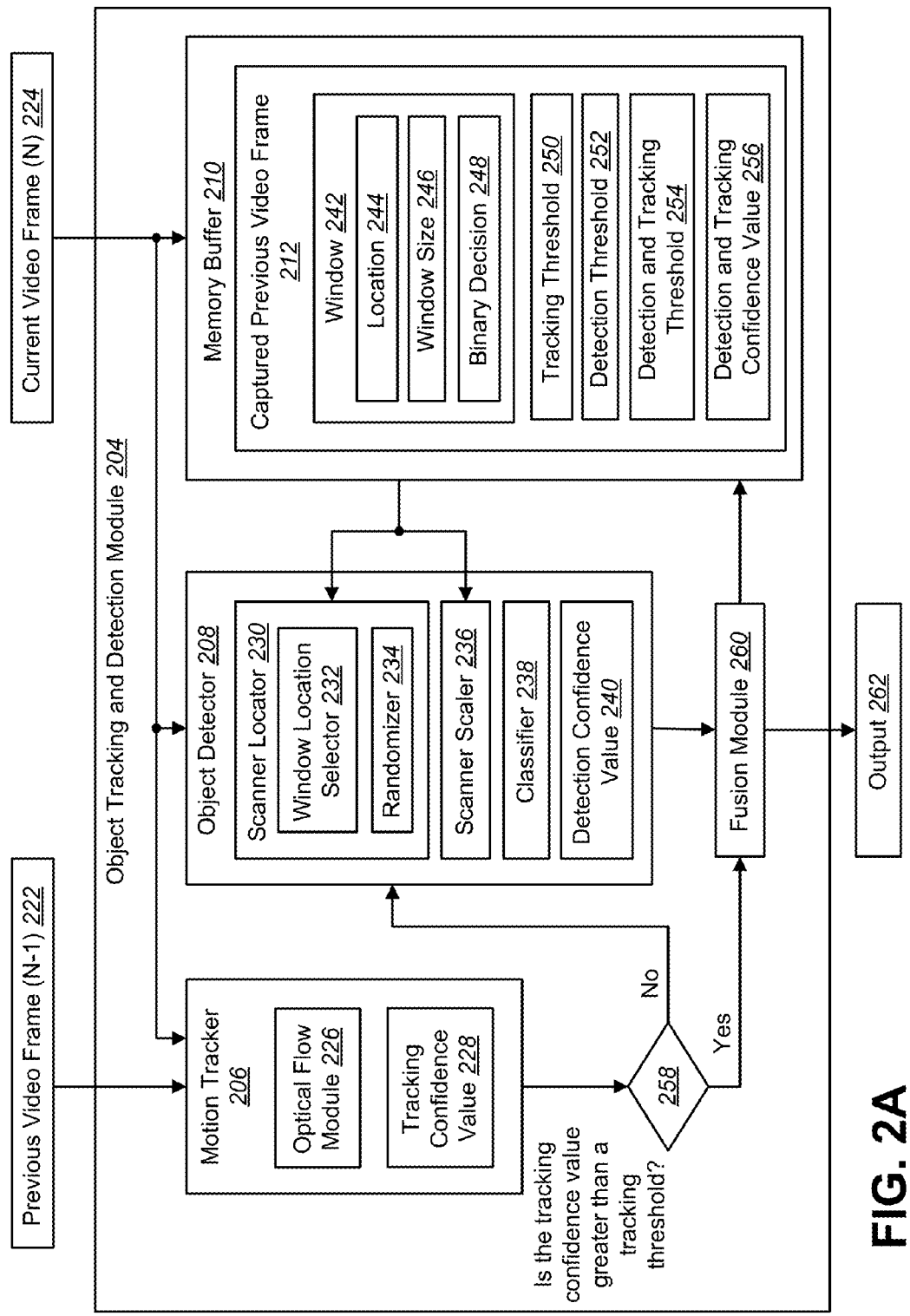
FIG. 2A is a block diagram that depicts a particular illustrative embodiment of an object and detection module.

Referring to FIG. 2A, a block diagram illustrating an object tracking and detection module 204 is shown. The object tracking and detection module 204 may be implemented within an electronic or wireless device. The object tracking and detection module 204 may include a motion tracker 206 having an optical flow module 226 and a tracking confidence value 228. The object tracking and detection module 204 may also include an object detector 208 having a scanner locator 230, scanner scaler 236, classifier 238 and a detection confidence value 240. The memory buffer 210 may store data associated with a captured previous video frame 212 that may be provided to the motion tracker 206 and object detector 208. The object tracking and detection module 204, motion tracker 206, object detector 208 and memory buffer 210 may be configurations of the object tracking and detection module 104, motion tracker 106, object detector 108 and memory buffer 110 described above in connection with FIG. 1.

The motion tracker 206 may be used to perform motion-based tracking on a current video frame (N) 224. For example, a previous video frame (N−1) 222 and a current video frame (N) 224 may be received (e.g., by the electronic device 102). The previous video frame (N−1) 222 may immediately precede a current video frame (N) 224 in a sequence of video frames. Additional video frames may be obtained and processed by the object tracking and detection module 204. The previous video frame (N−1) 222 may be provided to a motion tracker 206. Further, the memory buffer 210 may store data associated with the previous video frame (N−1) 222, referred to herein as a captured previous video frame 212. In some configurations, the memory buffer 210 may obtain information about the previous video frame (N−1) 222 directly from the electronic device 102 (e.g., from the camera). The memory buffer 210 may also obtain tracking results about the previous video frame (N−1) 222 from the fusion module 260 which may specify where an object was tracked and/or detected in the previous video frame (N−1) 222. This information about the previous video frame (N−1) 222 or other previously captured video frames may be stored in the memory buffer 210.

The motion tracker 206 may subsequently receive a current video frame (N) 224 in a sequence of video frames. The motion tracker 206 may compare the current video frame (N) 224 to the previous video frame (N−1) 222 (e.g., using information provided from the memory buffer 210). The motion tracker 206 may track motion of an object on the current video frame (N) 224 using an optical flow module 226. The optical flow module 226 may include hardware and/or software for performing motion-based tracking of an object on a current video frame (N) 224. By comparing the previous video frame (N−1) 222 and the current video frame (N) 224, the motion tracker 206 may determine a tracking confidence value 228 associated with the likelihood that a target object is in the current video frame (N) 224. In one example, the tracking confidence value 228 is a real number (e.g., between 0 and 1) based on a percentage of certainty that the target object is within the current video frame (N) 224 or a window within the current video frame (N) 224.

The object detector 208 may be used to detect an object on a current video frame (N) 224. For example, the object detector 208 may receive a current video frame (N) 224 in a sequence of video frames. The object detector 208 may perform object detection on the current video frame (N) 224 based on a tracked parameter. The tracked parameter may include a tracking confidence value 228 corresponding to a likelihood that a target object is being accurately tracked. More specifically, a tracked parameter may include a comparison of the tracking confidence value 228 to a tracking threshold 250. The tracked parameter may also include information provided from the memory buffer 210. Some examples of tracked parameters that may be used when detecting an object include a region, a window location, a window size, or other information that may be used by the object detector 208 as a parameter when performing object detection.

The object detector 208 may include a scanner locator 230. The scanner locator 230 may include a window location selector 232 and a randomizer 234. The window location selector 232 may select multiple windows within a video frame. For example, a video frame may include multiple windows, each with an associated location and size. In one configuration, each video frame is divided into multiple (e.g., approximately 10,000) overlapping windows, each including a fraction of the total pixels in the video frame. Alternatively, there may be any suitable number of windows and they may not overlap. The window location selector 232 within the scanner locator 230 may select the location of a window in which to attempt to identify a target object. The randomizer 234 may randomly select windows of varying sizes and locations for detecting an object. In some configurations, the randomizer 234 randomly selects windows within a video frame. Alternatively, the randomizer 234 may more precisely select windows based on one or more factors. For example, the randomizer 234 may limit the selection of windows based on a region, size or general location of where an object is most likely located. This information may be obtained via the memory buffer 210 or may be obtained via the motion-based tracking that, while not accurate enough to be relied on entirely, may provide information that is helpful when performing object detection. Therefore, while the randomizer 234 may randomly select multiple windows to search, the selection of windows may be narrowed, and therefore not completely random, based on information provided to the object detector 208.

The object detector 208 may also include a scanner scaler 236, which may be used to draw or select a window of a certain size. The window size may be used by the scanner locator 230 to narrow the sizes of windows when detecting an object or comparing a selection of windows to an original image to detect whether an image is within a specific window. The scanner scaler 236 may select one or more windows of certain sizes or scale levels initially when defining an object or, alternatively, draw one or more windows of certain sizes or scale levels based on information provided from the memory buffer 210.

The classifier 238 may be used to determine whether some or all of a target object is found in a specific window. In some configurations, the classifier 238 may produce a binary value for each window to indicate whether a target object is detected within a specific window or sub-window. This classification (e.g., binary classification) may be performed for each window searched by the object detector 208. Specifically, the classifier 238 may generate a binary 1 for each window in which the object is detected and a binary 0 for each window in which the object is not detected. Based on the number or a combination of 1s and 0s, the object detector 208 may determine a detection confidence value 240 indicating a likelihood that the target object is present within a current video frame (N) 224. In some configurations, the detection confidence value 240 is a real number between 0 and 1 indicating a percentage or probability that an object has been accurately detected.

The object detector 208 may perform object detection according to a variety of tracked parameters, including a region, target size, window size, scale level, window location and one or more confidence values. Once the windows of a video frame or a subset of windows are searched and the object detector 208 obtains a binary value for each searched window, the object detector 208 may determine window size as well as a location or region on the current video frame that has the highest confidence. This location and window size may be used in subsequent tracking and detecting to more accurately track and/or detect a target object.

Various techniques may be used by the object detector 208 in detecting a target object. In one configuration, detecting a target object may include performing a binary classification for windows at every possible window location and every possible window size. However, searching every possible window is resource intensive. Thus, in another configuration, the object detector may search a subset of window locations and sizes, rather than all possible windows in a video frame. For example, the object detector 208 may search 1% of all possible windows. Then, if detection is unsuccessful (e.g., the detection confidence value 240 is less than a detection threshold 252), a higher percentage of window locations may be searched in a subsequent captured frame, e.g., 2%. The step in percentage of window locations searched may be uniform, non-uniform, slow or fast, i.e., consecutive frames may have 1%, 2%, 3%, 4% or 1%, 2%, 4%, 8%. In one configuration, the percentage of searched frames may be set very high (e.g., 80%, 90%, 100%) in response to a high detection confidence value, i.e., to ensure that the target object is in a next video frame. For example, the percentage of searched frames may jump to at least 80% in response to a detection and tracking confidence value that exceeds a detection and tracking threshold value 256. Alternatively, the percentage may jump to 60%, 70%, 90%, etc. Additionally, any suitable value for the detection and tracking threshold value may be used, e.g., 0.6, 0.65, 0.7, 0.75, 0.8, 0.85, etc. Furthermore, the percentage of windows searched may be determined randomly, based on a randomizer 234 (random number generator), e.g., a random percentage of windows between 1% and 15% may be searched in a captured frame. By searching a subset of all the window locations, the object detection may use fewer resources in the electronic device 102.

The techniques described herein may search a subset of window sizes for each location. Each window size may be referred to herein as a scale level, each scale level corresponding to a specific window size. For example, there may be 20 possible scale levels. Rather than searching all 20 scale levels, a subset of scale levels or window sizes may be searched at each window location.

The techniques described herein may also use feedback from the memory buffer 210 to tailor the window locations and sizes searched. In other words, the location and size of the last captured video frame in which the target object was successfully detected and/or tracked may be used as a starting point for searching a current video frame (N) 224. For example, if the target object was detected and tracked in a recent video frame (i.e., the detection and tracking confidence value 256 for a recent captured video frame is above a detection and tracking threshold), the scanner locator may start searching a current captured frame at the location and size associated with the recent frame. For example, where a target object moves out of the field of view of an optical system or disappears at a distance, the target object may be more likely to reappear at the same size as when the target object left the field of view of the optical system or disappeared at a distance. Thus, a size or range of sizes may be predicted for detecting the target object in subsequent video frames when performing object detection.

The search range of window locations and window sizes searched in the captured video frame (N) 224 may be limited to those similar to the window location and window size associated with the target object in a recent video frame (e.g., the previous video frame (N−1) 222). As used herein, the term "search range" refers to the set of candidate window locations or candidate window sizes (or both) that may be utilized when detecting and/or tracking a target object in a video frame. For example, the subset of the window locations searched may be selected from within a portion of the current video frame (N) 224 based on where the target object was found in a recent video frame, e.g., one of the quadrants or halves of the current video frame (N) 224. In other words, the search space may be limited to nearby where the target object was last tracked or detected. Similarly, the sizes of frames searched for each window location may be limited based on the size of the window in which the targeted object was found in a recent video frame. For example, if the object was detected in a recent frame using a window with a scale level of 8, the scanner scaler 236 may select only window scale levels for the current video frame (N) 224 of 8, plus or minus 3, i.e., scale levels 5-11. This may further eliminate low probability searching and increase the efficiency of object detection. Alternatively, if a recent (non-current) video frame did not detect the target object (i.e., the detection and tracking confidence value 256 for the recent video frame is below a detection and tracking threshold), the object detector 208 may expand the search space (window locations) that is searched, e.g., a wider range of an image or the whole image may be subject to search.

The object tracking and detection module 204 may include a fusion module 260 to merge multiple windows to form a single window. There are initially two confidence values: a detection confidence value 240 from the object detector 208 and a tracking confidence value 225 from the motion tracker 206. The fusion module 260 may combine the two confidence values (e.g., pick the one that is larger) into a detection and tracking confidence value 256. The detection and tracking confidence value 256 may indicate whether the target object was identified on a video frame. In one configuration, the detection and tracking confidence value 256 may be a real number between 0 and 1, where 0 indicates the lowest possible confidence that the target object was identified in a particular video frame and 1 indicates the highest possible confidence that the target object was identified in a particular video frame. In other words, the detection and tracking confidence value 256 may serve as an overall indication of the likelihood that a target object was found. Further, the detection and tracking confidence value 256 may be a parameter used for determining a window location, window size or percentage of windows to search in a next video frame. The fusion module 260 may be used to provide information about a current video frame (N) 224 to the memory buffer 210. In one example, the fusion module 260 may provide information about the tracked window 242 (e.g., window location 244, window size 246, etc.) and a detection and tracking confidence value 256 to the memory buffer 210. The fusion module 260 may use the tracking results (e.g., bounding boxes) from the motion tracker 206 and object detector 208 to form a combined tracking result (e.g., bounding box) and calculate the detection and tracking confidence value 256.

The memory buffer 210 may store one or more values associated with the previous video frame (N−1) 222, the current video frame (N) 224 or other captured video frames. In one configuration, the memory buffer 210 stores a captured previous video frame 212, which may include information corresponding to the previous video frame (N−1) 222. The captured previous video frame 212 may include information about one or more windows 242, including the location 244, window size 246 and a binary decision 248 (e.g., from the classifier 238) for each window 242. The captured previous video frame 212 may also include a tracking threshold 250, detection threshold 252 and a detection and tracking threshold 254. The tracking threshold 250 may be provided to the motion tracker 206 or circuitry on the object tracking and detection module 204 (e.g., confidence level comparator) to determine 258 whether the tracking confidence level is greater than the tracking threshold 250. The detection threshold 252 may be provided to the object detector 208 or other circuitry on the object tracking and detection module 204 to determine whether the detection confidence value 240 is greater than the detection threshold 252. The detection and tracking threshold 254 may be a combined value based on the tracking threshold 250 and the detection threshold 252. The detection and tracking threshold 254 may be compared to a detection and tracking confidence value 256 to determine a combined confidence value for the motion-based tracking and the object detection. Each of the thresholds may be based on a likelihood that a target object is located within a video frame. The object tracking and detection module 204 may perform motion-based tracking and/or detection on a current video frame (N) 224 until a specific detection and tracking confidence value 256 is obtained. Further, the motion-based tracking and object detection may be performed on each video frame in a sequence of multiple video frames.

Performing motion-based tracking and object detection may include sequentially performing motion-based tracking followed by object detection based on a tracked parameter. In particular, the present systems and methods may implement a two-step tracking and detection approach. Since motion-based tracking is based on the relative motion of a scene, rather than actual object identification as used object detection, the motion-based tracking may be less resource-intensive in an electronic device than performing object detection. Accordingly, it may be more efficient to use the motion tracker 206 instead of the object detector 208, where a target object may be accurately tracked without also performing object detection.

Therefore, rather than using the motion tracker 206 in parallel with the object detector 208, the object tracking and detection module 204 only uses the object detector 208 where the motion tracker 206 is insufficient, i.e., the motion tracking and object detection (if performed at all) are performed sequentially instead of in parallel. For each video frame on which tracking is performed, the motion tracker 206 may produce a tracking confidence value 228, which may be a real number between 0 and 1 indicating a likelihood that the target object is in a current video frame (N) 224.

In one configuration of the two-step tracking and detection approach, the motion tracker 206 may first perform motion-based tracking on a current video frame (N) 224. The motion tracker 206 may determine a tracking confidence value 228 based on the motion-based tracking process. Using the tracking confidence value 228 and a tracking threshold 250 provided by the memory buffer 210, circuitry within the object tracking and detection module 204 (e.g., a confidence level comparator) may determine 258 whether the tracking confidence value 228 exceeds a tracking threshold 250. If the tracking confidence value 228 is greater than the tracking threshold 250, the object tracking and detection module 204 may skip performing object detection and provide the tracking result to a fusion module 260 to produce an output 262. The output 262 may include an indication that a target object is within a current video frame (N) 224. Further, the output 262 may include additional information about the target object.

If the tracking confidence value 228 does not exceed the tracking threshold 250, the object detector 208 may subsequently perform object detection on the current video frame (N) 224. The object detection may be performed on all or a subset of windows within the current video frame (N) 224. The object detector 208 may also select a subset of windows, window sizes or other detection criteria based on results of the motion-based tracking and/or information provided from the memory buffer 210. The object detection may be performed using a more or less robust process based on one or more tracked parameters provided to the object detector 208. The object detector 208 may determine a detection confidence value 240 and compare the detection confidence value 240 to a detection threshold 252. If the detection confidence value 240 is above a detection threshold 252, the object detector 208 may provide the detection result to the fusion module 260 to produce an output 262. The output 262 may include an indication that a target object is within a current video frame (N) 224 and/or include additional information about the detected object.

Alternatively, if the detection confidence value 240 is less than or equal to a detection threshold 252, the object detector 208 may perform object detection again using a more robust method, such as searching a greater number of windows within the current video frame (N) 224. The object detector 208 may repeat the process of object detection until a satisfactory detection confidence value 240 is obtained. Once a satisfactory detection confidence value 240 is obtained such that a target object within the current video frame is identified, the object tracking and detection module 204 may be used to perform tracking and detection on a next video frame.

Figure 2B:
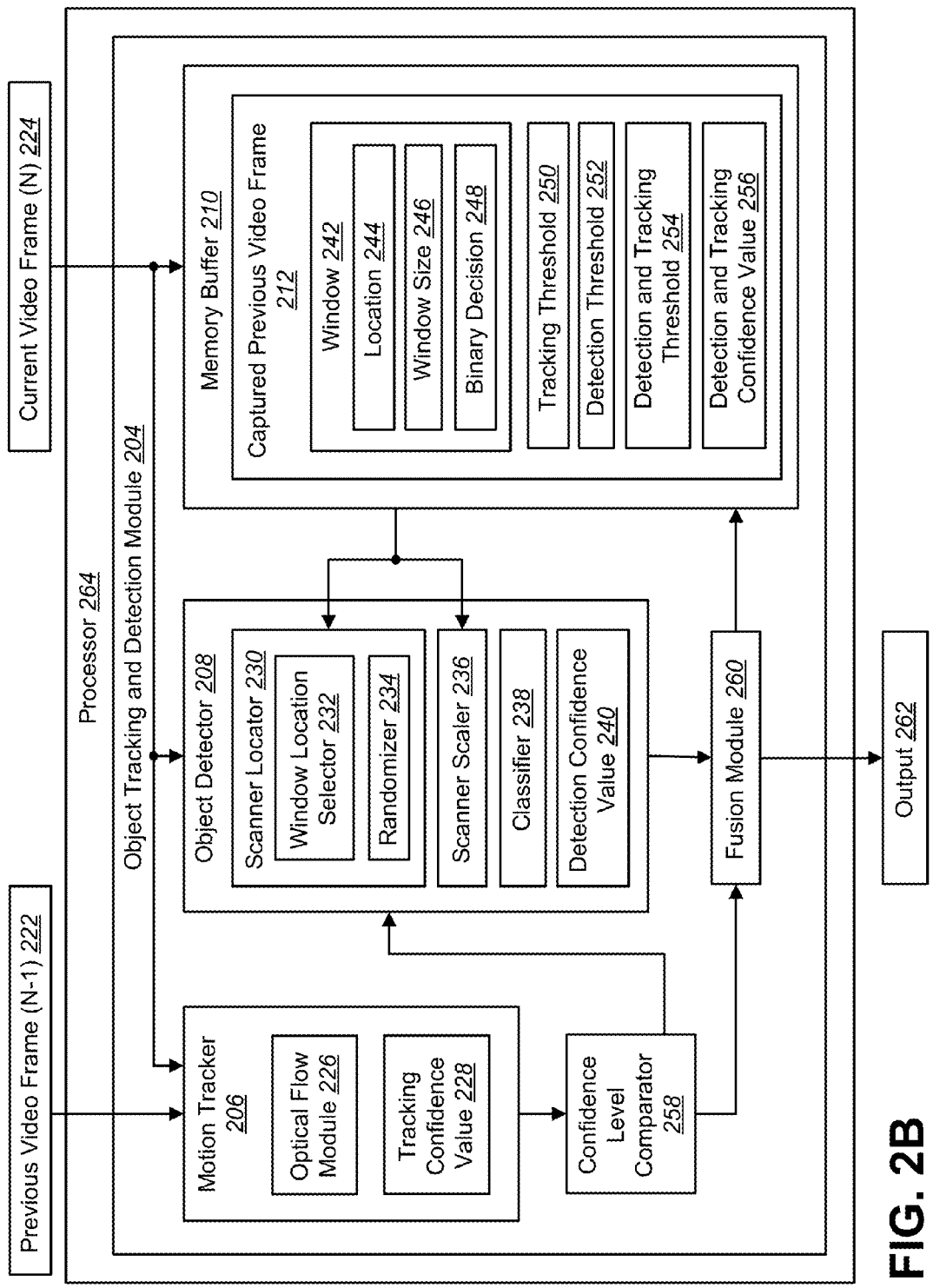
FIG. 2B is a block diagram that depicts a particular illustrative embodiment of a processor implement components within the object and detection module of FIG. 2.

Referring to FIG. 2B, a particular illustrative embodiment of a processor 264 implementing components within the object tracking and detection module 204 is shown. As shown in FIG. 2A, the object tracking and detection module 204 may be implemented by a processor 264. Different processors may be used to implement different components (e.g., one processor may implement the motion tracker 206, another processor may be used to implement the object detector 208 and yet another processor may be used to implement the memory buffer 210).

Figure 3:
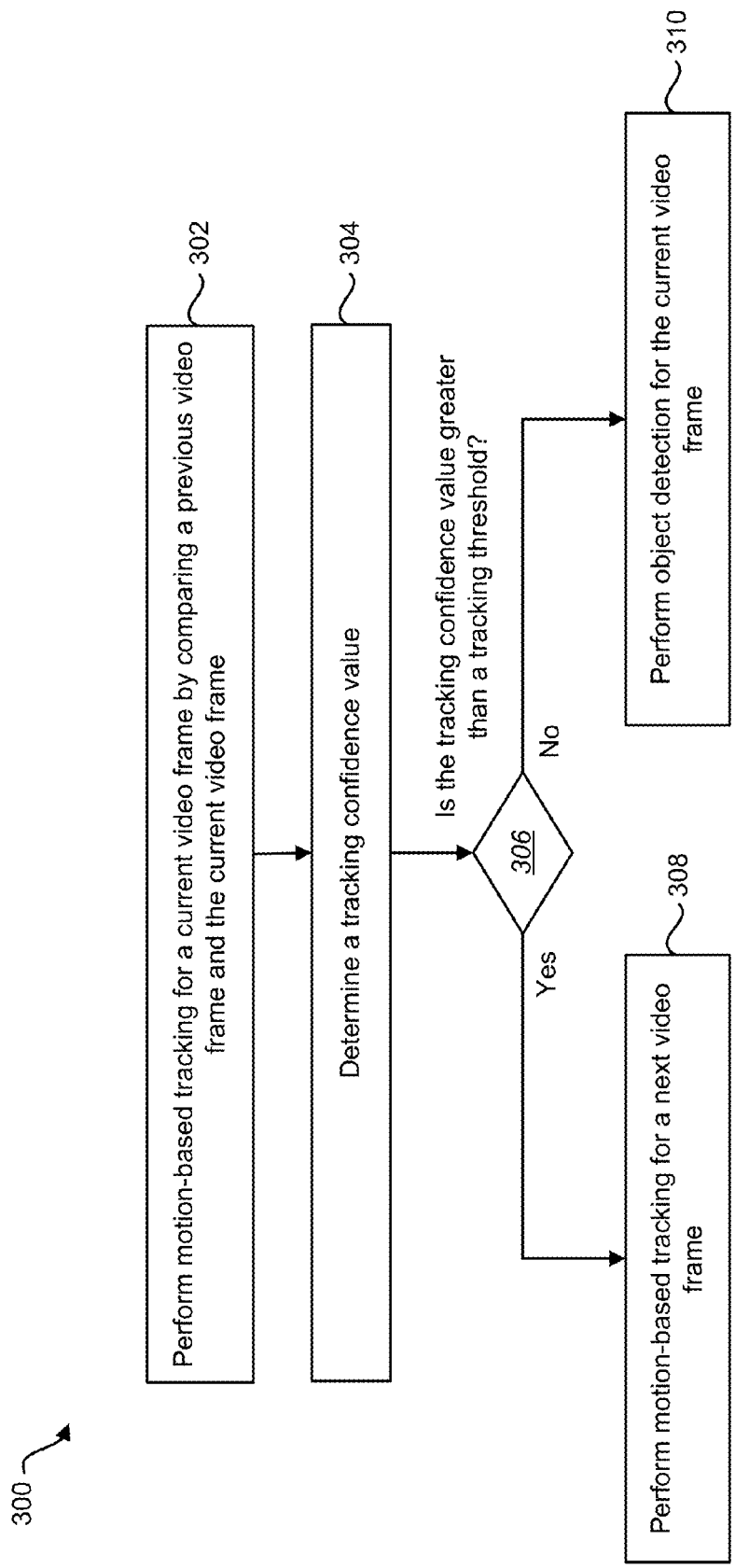
FIG. 3 is a flowchart of a particular illustrative embodiment of a method for performing motion-based tracking and object detection.

Referring to FIG. 3, a flowchart of a particular illustrative embodiment of a method 300 for performing motion-based tracking and object detection is shown. The method 300 may be implemented by an electronic device 102, e.g., an object tracking and detection module 104. The electronic device 102 may perform 302 motion-based tracking for a current video frame (N) 224 by comparing a previous video frame (N−1) 222 and the current video frame (N) 224. Tracking an object may be performed using a median flow method by tracking points between pairs of images. Other methods of motion-based tracking may also be used. Additionally, the motion-based tracking may be performed for a current video frame (N) 224 using information about a captured previous video frame 112 provided via a memory buffer 110.

The electronic device 102 may determine 304 a tracking confidence value 228. The tracking confidence value 228 may indicate a likelihood or certainty that a target object has been accurately tracked. The electronic device 102 may determine 306 whether the tracking confidence value 228 is greater than a tracking threshold 250. If the tracking confidence value 228 is greater than the tracking threshold 250, the electronic device 102 may perform 308 motion-based tracking for a next video frame. Further, the electronic device 102 may skip performing object detection on the current video frame (N) 224 based on the result of the motion-based tracking. In other words, object detection may be performed for the current video frame (N) 224 only when the motion tracking is not very good, i.e., if the tracking confidence value 228 is not greater than a tracking threshold 250. If, however, the tracking confidence value 228 is not greater than the tracking threshold 250, the electronic device 102 may perform 310 object detection for the current video frame (N) 224. The electronic device 102 may perform the object detection in sequence to the motion-based tracking. In some configurations, the object detection may be performed multiple times with varying robustness to obtain a higher detection confidence value 240.

Figure 4:
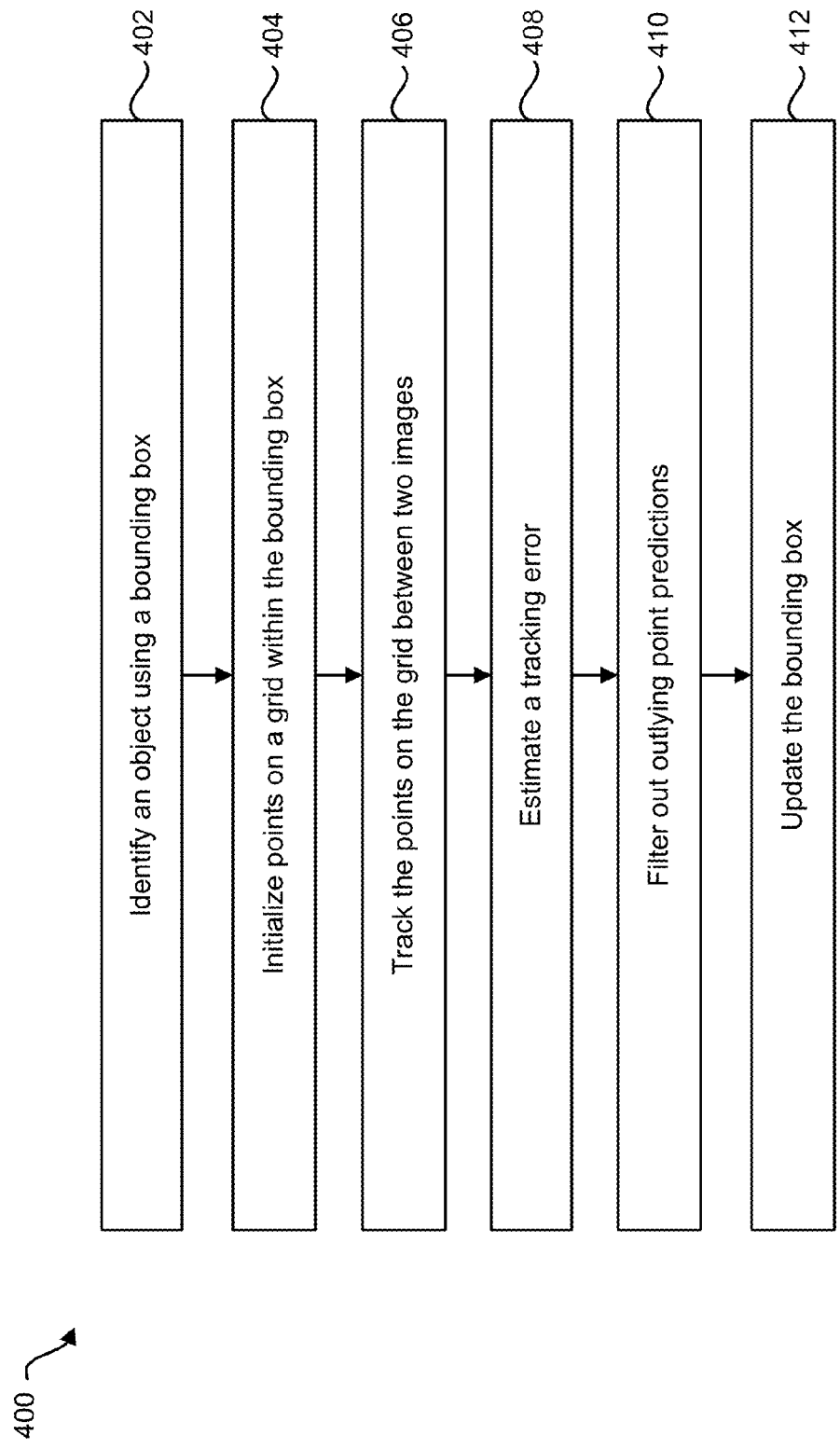
FIG. 4 is a flowchart of a particular illustrative embodiment of a method for performing motion-based tracking.

Referring to FIG. 4, a flowchart of a particular illustrative embodiment of a method 400 for performing motion-based tracking is shown. The method 400 may be implemented by an electronic device 102, e.g., an object tracking and detection module 104. The electronic device 102 may identify 402 a target object using a bounding box. Identifying 402 an object may be performed manually using a touchscreen 116 or other input method in which an object of interest is selected. Multiple objects may be identified in a similar way. Further, other input methods may be used to identify an object to be tracked. In one example, an object is identified by manually drawing a bounding box around the target object.

The electronic device 102 may initialize 404 points on a grid within the bounding box. The points on the grid may be uniformly spaced throughout the bounding box. Further, the points may be tracked 406 on the grid between two images (e.g., previous video frame (N−1) 222 and current video frame (N) 224). In one example, the points are tracked by a Lucas-Kanade tracker that generates a sparse motion flow between images. The electronic device 102 may estimate 408 a tracking error between the two images (e.g., a previous video frame (N−1) 222 and a current video frame (N) 224). Estimating 408 a tracking error may include assigning each point of the tracked points an error value. Further, estimating 408 a tracking error may be performed using a variety of methods, including forward-backward error, normalized cross correlation (NCC) and sum-of-square differences, for example. The estimated tracking error may be used to obtain a tracking confidence value 228 and ultimately determining a likelihood that a target object is in a current video frame (N) 224. In one configuration, the tracking confidence value 228 may be obtained by calculating a normalized cross correlation (NCC) between a tracked window in a current video frame (N) 224 and a previous video frame (N−1) 222. The tracking error may also be estimated using additional techniques, including a forward-backward error estimation described in more detail below in connection with FIG. 5. Further, the electronic device 102 may filter 410 out outlying point predictions. For example, the electronic device may filter out 50% of the worst predictions. The remaining predictions may be used to estimate the displacement of the bounding box.

The electronic device 102 may update 412 the bounding box. Updating 412 the bounding box may be performed such that the updated bounding box becomes the new bounding box for the next video frame. The motion-based tracking process may then be repeated for a next video frame or, if a tracking confidence value 228 is less than or equal to a tracking threshold 250, the motion-based tracking process may be discontinued for a next video frame until a target object may be accurately tracked. In some configurations, where the motion-based tracking for a current video frame (N) 224 does not provide a satisfactory result, the electronic device 102 may perform object detection on the current video frame (N) 224 to obtain a higher level of confidence in locating a target object. In some configurations, where motion-based tracking cannot produce satisfactory results (e.g., when a target object moves out of range of a video frame), object detection may be performed on any subsequent video frames until a target object is detected.

Figure 5:
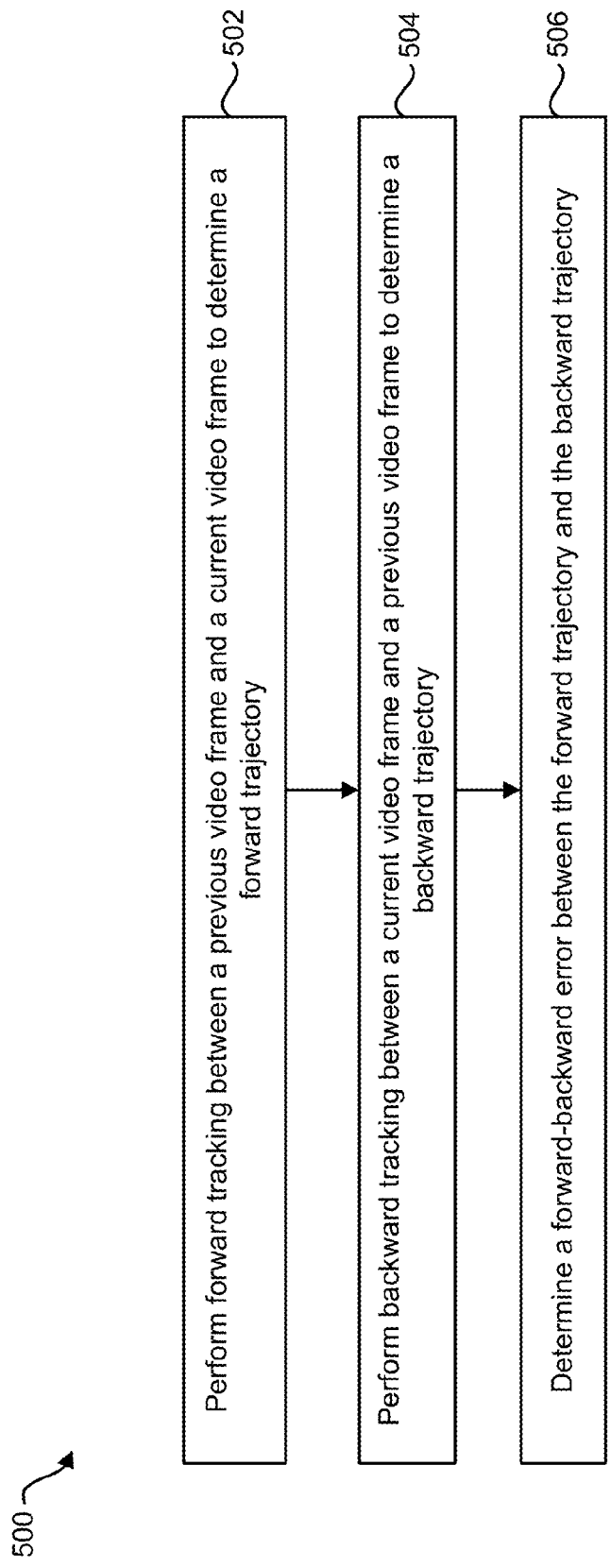
FIG. 5 is a flowchart of a particular illustrative embodiment of a method for estimating a tracking error in motion-based tracking based on forward-backward error.

Referring to FIG. 5, a flowchart of a particular illustrative embodiment of a method 500 for estimating a tracking error in motion-based tracking based on forward-backward error is shown. The method 500 may be implemented by an electronic device 102 (e.g., an object tracking and detection module 104). In some configurations, the electronic device 102 may calculate a normalized cross correlation (NCC) between tracked windows. The normalized cross correlation (NCC) may be used to determine a tracking confidence value 228. The electronic device 102 may also use various tracking error estimation techniques complementary to normalized cross correlation (NCC) (e.g., forward-backward error, sum-of-square difference). In an example using forward-backward error estimation, an electronic device 102 may perform 502 forward tracking between a previous video frame (N−1) 222 and a current video frame (N) 224 to determine a forward trajectory. Forward tracking may include tracking an image forward for k steps. The resulting forward trajectory may be equal to $(x_t, x_{t+1}, \ldots, x_{t+k})$, where $x_t$ is a point location in time and k indicates a length of a sequence of images. The electronic device 102 may perform 504 backward tracking between a current video frame (N) 224 and a previous video frame (N−1) 222 to determine a backward trajectory. The resulting backward trajectory may be equal to $(\hat{x}_t, \hat{x}_{t+1}, \ldots, \hat{x}_{t+k})$, where $\hat{x}_{t+k}=x_{t+k}$.

The electronic device 102 may determine 506 a forward-backward error between the forward trajectory and the backward trajectory. The forward-backward error may be defined as the distance between the forward trajectory and the backward trajectory. Further, various distances may be defined for the trajectory comparison. In one configuration, the Euclidean distance between the initial point and the end point of the validation trajectory may be used when determining the forward-backward error. In one configuration, the forward-backward error may be used as the tracking error, which may be used to determine a tracking confidence value 228.

Figure 6:
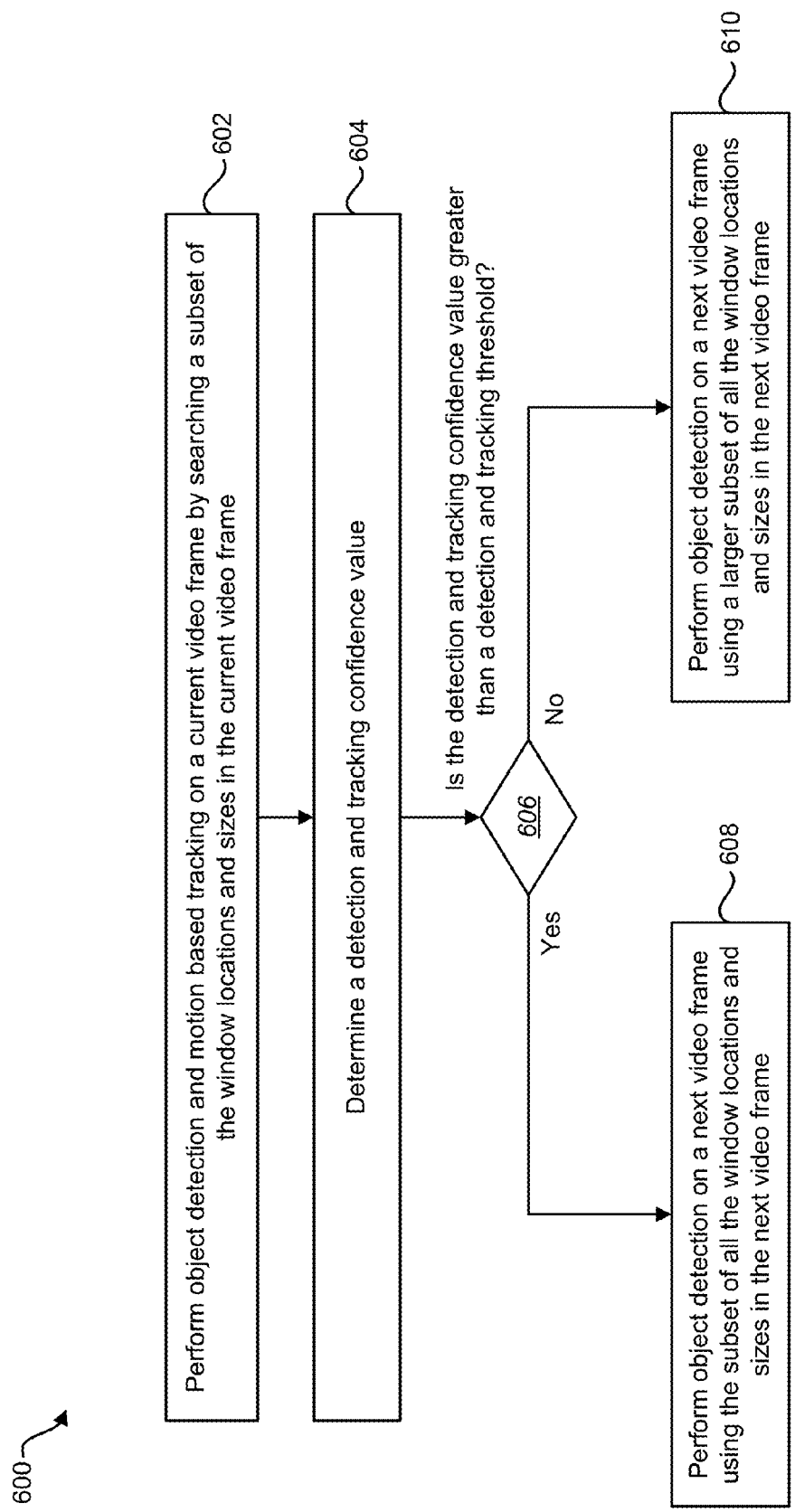
FIG. 6 is a flowchart of a particular illustrative embodiment of a method for performing object detection.

Referring to FIG. 6, a flowchart of a particular illustrative embodiment of a method 600 for performing object detection is shown. The method 600 may be implemented by an electronic device 102 (e.g., an object tracking and detection module 104). The electronic device 102 may perform 602 object detection and motion-based tracking on a current video frame (N) 224 by searching a subset of the window locations and sizes in the current video frame (N) 224.

The electronic device 102 may determine 604 a detection and tracking confidence value 256. The detection and tracking confidence value 256 may provide a level of confidence of whether the target object is found in a current video frame (N) 224 or within a particular window. The electronic device 102 may also determine 606 whether the detection and confidence value 256 is greater than a detection and tracking threshold 254. If the detection and confidence value 256 is greater than a detection and tracking threshold 254, the electronic device 102 may perform 608 object detection on a next video frame using the subset (e.g., the same subset) of windows and sizes in the next video frame. Alternatively, if the detection and confidence value 256 is less than a detection and tracking threshold 254, the electronic device 102 may perform 610 object detection on a next video frame using a larger subset of the window locations and sizes in the next video frame. In some configurations, where the confidence value 256 is less than a detection and tracking threshold 254, the electronic device 102 may perform 610 object detection on a next video frame using the entire search space and/or all windows of the next video frame.

Figure 7:
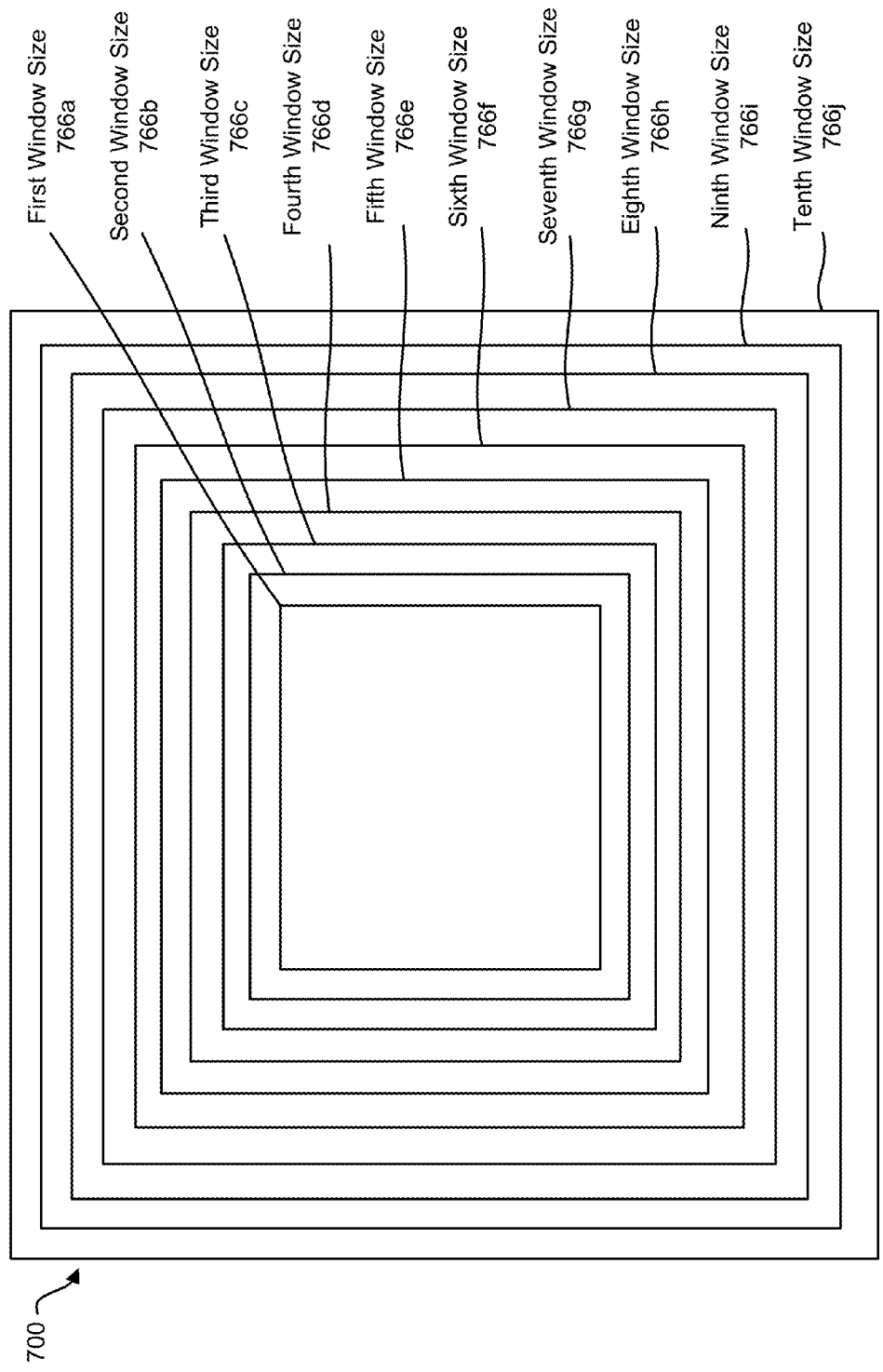
FIG. 7 is a particular illustrative embodiment of an image window having different window sizes.

Referring to FIG. 7, a particular embodiment of an image window 700 having different window sizes 766 is shown. Specifically, FIG. 7 illustrates a set of ten possible window sizes 766a-j. Each window size 766 may correspond to a scale level (e.g., 1-10). Although shown herein as rectangular, the windows that are searched may be any shape, e.g., square, rectangular, circular, elliptical, user-defined, etc. Furthermore, any number of window sizes 766 or scale levels may be available, e.g., 5, 15, 20, 30, etc.

The search range may be denoted by a subset of window sizes used for a particular location, e.g., the window sizes that are searched in the current video frame (N) 224 may be limited to those similar to the window location and window size associated with the target object in the recent frame. For example, without feedback, the object detector 208 may search all ten window sizes 766a-j for each selected window location. However, if the object was detected in a recent (non-current) video frame using a window with the fifth window size 766e, the scanner scaler 236 may select only window sizes for the current captured frame of 5, plus or minus 3, i.e., window sizes 2-8. In other words, the windows with the first window size 766a, ninth window size 766i and tenth window size 766j may not be searched based on feedback from a recent or previous video frame (N−1) 222. This may further eliminate low probability searching and increase the efficiency of object detection. In other words, using feedback from a recent video frame may help reduce computations performed. Alternatively, if a recent video frame did not detect the target object (i.e., the detection and tracking confidence value 256 for the recent captured frame is less than a detection and tracking threshold 254), the object detector 208 may not limit the search range by using a subset of size levels.

Figure 8:
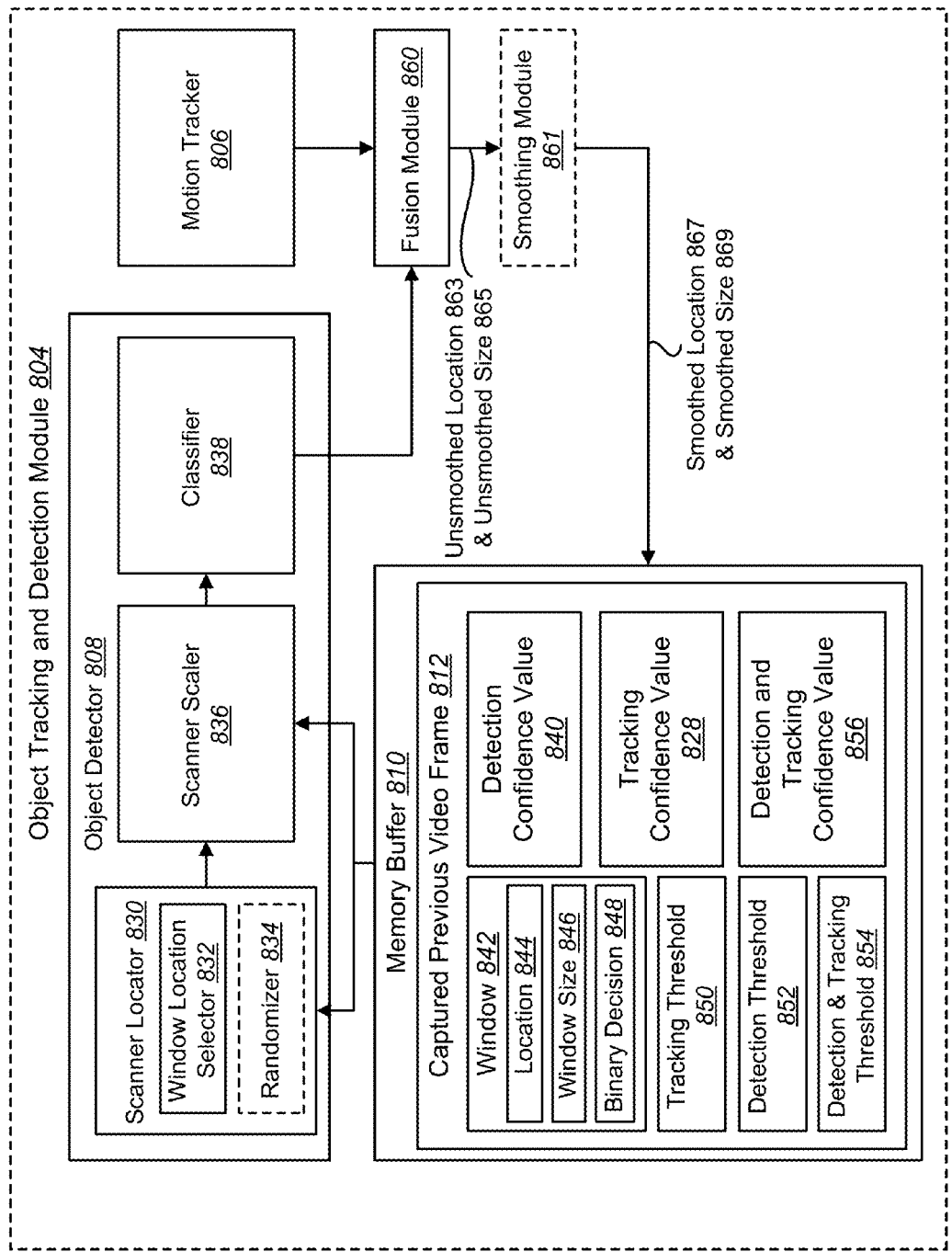
FIG. 8 is a block diagram that depicts a particular illustrative embodiment of an object tracking and detection module.

Referring to FIG. 8, a particular illustrative embodiment of an object tracking and detection module 804 is shown. The object tracking and detection module 804 illustrated in FIG. 8 may include similar modules and perform similar functionality to the object tracking and detection module 204 illustrated in FIG. 2. Specifically, the object detector 808, motion tracker 806, scanner locator 830, window location selector 832, randomizer 834, scanner scaler 836, classifier 838, fusion module 860, memory buffer 810, captured previous video frame 812, window 842, location 844, size 846, binary decision 848, tracking threshold 850, detection threshold 852, detection and tracking threshold 854, detection confidence value 840, tracking confidence value 828 and detection and tracking confidence value 856 illustrated in FIG. 8 may correspond and have similar functionality to the object detector 208, motion tracker 206, scanner locator 230, window location selector 232, randomizer 234, scanner scaler 236, classifier 238, fusion module 260, memory buffer 210, captured previous video frame 212, window 242, location 244, size 246, binary decision 248, tracking threshold 250, detection threshold 252, detection and tracking threshold 254, detection confidence value 240, tracking confidence value 228 and detection and tracking confidence value 256 illustrated in FIG. 2.

The object tracking and detection module 804 may include a smoothing module 861 that is used to reduce the jittering effect due to target motion and tracking error. In other words, the smoothing module 861 smooth the tracking results, causing a search window to have a smoother trajectory in both location (x, y) 844 and size (width, height) 846. The smoothing module 861 can be simple moving average (MA) filters or auto regression (AR) filters. The smoothing degree for the location 844 and size 846 can be different. Predictive filters, such as a Kalman filter may also be suitable for location 844 smoothing. Therefore, the smoothing module 861 may receive an unsmoothed location 863 and an unsmoothed size 865 as input and output a smoothed location 867 and a smoothed size 869.

Figure 9:
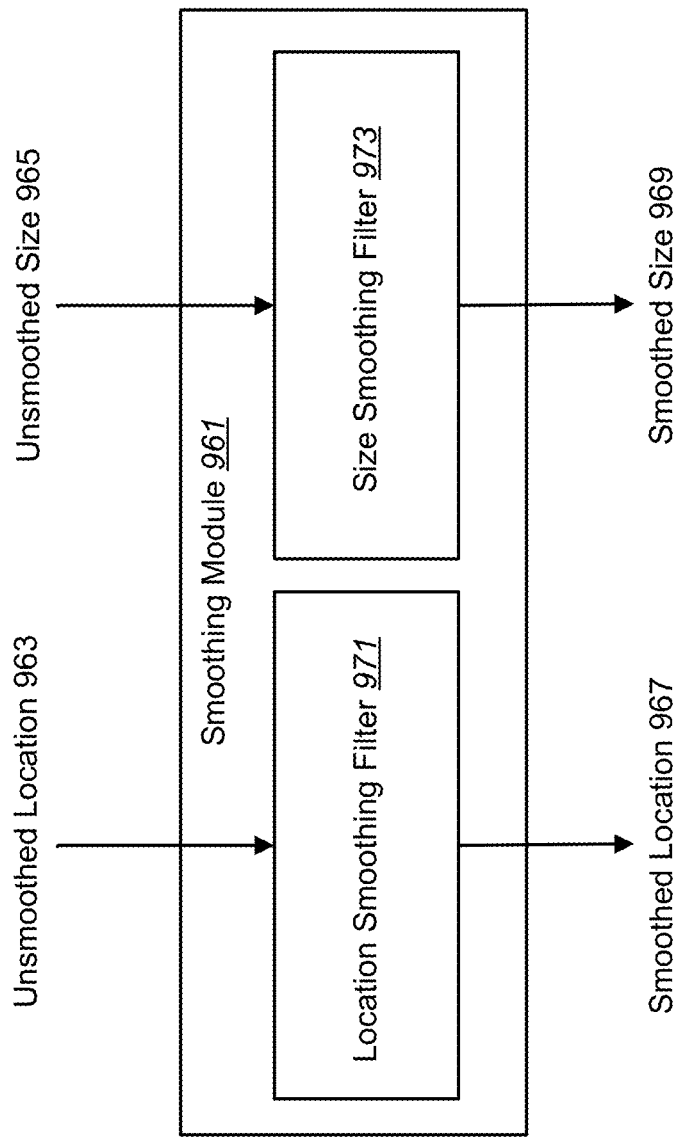
FIG. 9 is a block diagram that depicts a particular illustrative embodiment of a smoothing module.

Referring to FIG. 9, a particular illustrative embodiment of a smoothing module 961 is shown. The smoothing module 961 may be used to reduce the jittering effect due to target motion and tracking error, i.e., so the tracking results (bounding box) have a smoother trajectory in both location (x, y) and size (width, height). In one configuration, the location smoothing filter 971 and the size smoothing filter 973 are implemented using an auto regression (AR) model to receive an unsmoothed location 963 and an unsmoothed size 965 as input and output a smoothed location 967 and a smoothed size 969.

In an auto regression (AR) model, assume X is the variable to be smoothed, either the location or the size. Furthermore, let X' be the output of X by the object tracker. In this configuration, the smoothed filtering of X at time t, $X_t$, can be described according to Equation (1):

$$X_t = W * X'_t + (1-W) * X_{t-1} \quad (1)$$

where $X'_t$ is the tracker output of X at time t, $X_{t-1}$ is the smoothed result of X at time t−1, and W ($0<=W<=1$) is a smoothing weight that controls the smoothing effect. For example, $X'_t$ may be a window location or window size selected for a current video frame (N) 224 and $X_{t-1}$ may be a window location or window size used for a previous video frame (N−1) 222.

A different smoothing weight, W, can be used for the location smoothing filter 971 and the size smoothing filter 973. For example, in one implementation, $W_{location}=0.8$ and $W_{size}=0.4$ so that there is less smoothing effect on the window location but stronger smoothing effect on the window size. This selection of smoothing weights will produce both less tracking delay and less jittering.

The selection of smoothing weight may also be reduced when the detection and tracking confidence value 856 falls below a certain threshold (e.g., the detection and tracking threshold 854). This may cause stronger filtering when potential tracking or detection errors are high. For example, in response to low tracking confidence (e.g., the detection and tracking confidence value 856 is below the detection and tracking threshold 854), the smoothing weights for location and size may be set to $W_{location}=0.65$ and $W_{size}=0.2$, respectively. In other words, one or both of the weights may be decreased, which may cause the window location and size selection to lean more heavily on window locations and sizes of previous video frames than those of a current video frame.

The weighting may be based on a tracking confidence value 828 or a detection confidence value 840 rather than a detection and tracking confidence value 856. For example, the smoothing weights, $W_{location}$ and $W_{size}$, may be decreased in response to a tracking confidence value 828 falling below a tracking threshold 850, i.e., stronger filtering may be used in response to poor motion tracking. Alternatively, the smoothing weights may be decreased in response to a detection confidence value 840 falling below a detection threshold 852, i.e., stronger filtering may be used in response to poor object detection.

In another configuration, Kalman filtering may be used to smooth the window location. In such a configuration, the filtering may be defined according to Equations (2)-(7):

$$x_k = F_k x_{k-1} + w_k \quad (2)$$

$$z_k = H x_{k-1} + v_k \quad (3)$$

where $x_{k-1}$ is the previous state at time k−1, $x_k$ is the current state defined by $x_k = [x, y, \dot{x}, \dot{y}]$, where (x,y) are the bounding box center location, $(\dot{x}, \dot{y})$ are the velocity in each direction. Furthermore, the state transition model, $F_k$, and the observation model, H, may defined by Equations (4)-(5), respectively:

$$F_k = \begin{bmatrix} 1, & 0, & \Delta t, & 0 \\ 0, & 1, & 0, & \Delta t \\ 0, & 0, & 1, & 0 \\ 0, & 0, & 0, & 1 \end{bmatrix} \quad (4)$$

$$H = \begin{bmatrix} 1, & 0, & 0, & 0 \\ 0, & 1, & 0, & 0 \end{bmatrix} \quad (5)$$

where Δt is a tunable parameter. Additionally, $w_k$ is process noise that is assumed to be drawn from a zero mean multivariate normal distribution with covariance Q (i.e., $w_k \sim N(0,Q)$) according to Equation (6):

$$Q = \begin{bmatrix} 1, & 0, & 0, & 0 \\ 0, & 1, & 0, & 0 \\ 0, & 0, & 1, & 0 \\ 0, & 0, & 0, & 1 \end{bmatrix} * \sigma_1^2 \quad (6)$$

where $\sigma_1$ is a tunable parameter. Similarly, $v_k$ is observation noise that is assumed to be zero mean Gaussian white noise with covariance R (i.e., $v_k \sim N(0,R)$) according to Equation (7):

$$R = \begin{bmatrix} 1, & 0, & 0, & 0 \\ 0, & 1, & 0, & 0 \\ 0, & 0, & 1, & 0 \\ 0, & 0, & 0, & 1 \end{bmatrix} * \sigma_2^2 \quad (7)$$

where $\sigma_2$ is a tunable parameter.

Figure 10:
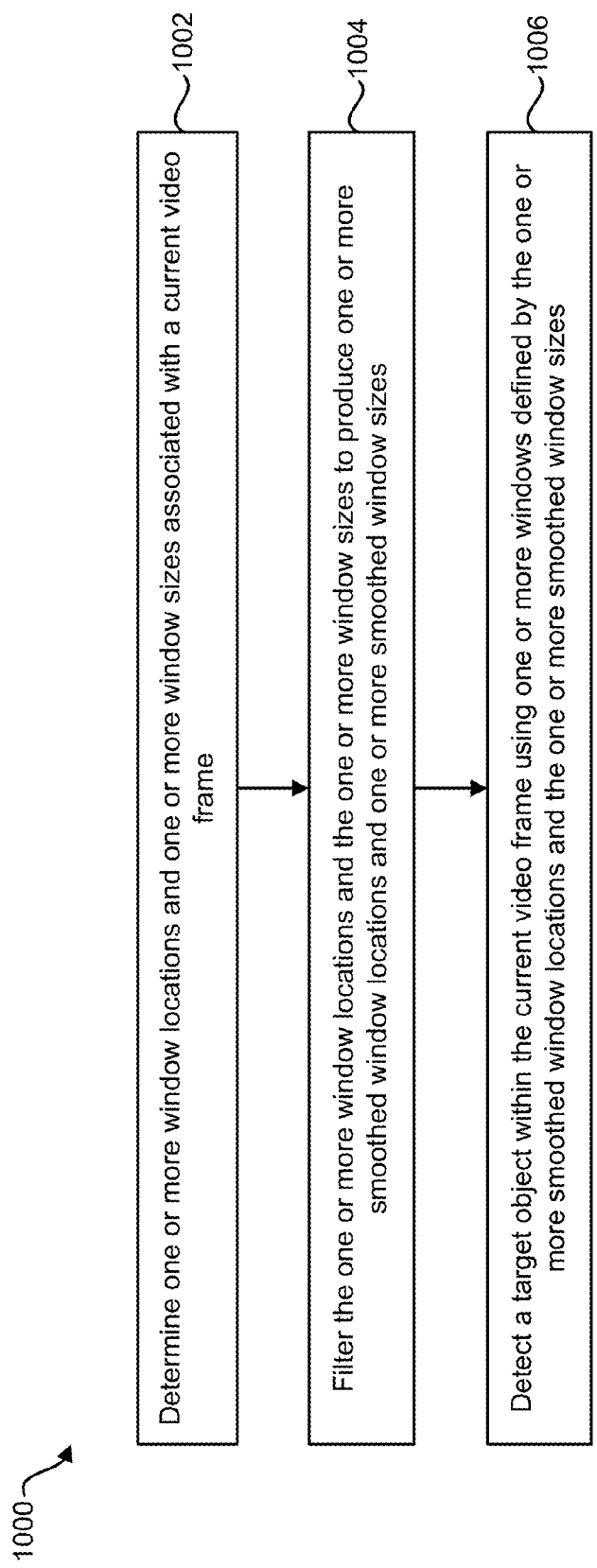
FIG. 10 is a flowchart of a particular illustrative embodiment of a method for smoothing jitter in motion tracking.

Referring to FIG. 10, a flowchart of a particular illustrative embodiment of a method 1000 for smoothing jitter in motion tracking results is shown. The method 1000 may be performed by an electronic device 102, e.g., an object tracking and detection module 804 in an electronic device 102. The electronic device 102 may determine 1002 one or more window locations and one or more window sizes associated with a current video frame 224, e.g., an unsmoothed location 863 and unsmoothed size 865. The electronic device 102 may also filter 1004 the one or more window locations and the one or more window sizes to produce one or more smoothed window locations 867 and one or more smoothed window sizes 869. For example, this may include using a moving average filter, an auto regression filter or a Kalman filter. In one configuration, in response to low tracking confidence (e.g., the detection and tracking confidence value 856 is below the detection and tracking threshold 854), the smoothing weights for location and size may be reduced. Alternatively, the smoothing weights may be reduced based on the detection confidence value 840 or the tracking confidence value 828. The electronic device may also detect 1006 a target object within the current video frame 224 using one or more windows defined by the one or more smoothed window locations 867 and the one or more smoothed sizes 869.

In the context of a scene being imaged, the term "object" refers to a physical object within the scene. In the context of a video stream, the term "object" refers to a representation, within the video stream, of an object (e.g., images of the object in frames of the video stream). The term "mobile device" as used herein includes devices in any of the following form factors: holdables (e.g., smartphones), drivables (e.g., vehicles or robots), wearables (e.g., clothing or accessories), and flyables (e.g., drones). A mobile device may include one or more screens (e.g., a touchscreen) and/or one or more image-capturing devices (e.g., a camera).

It may be desirable to obtain, from a single optical field of view, multiple different fields of view. Such capability may be used to obtain a multi-camera effect with one camera. For example, such capability may be applied to support simultaneously zooming into two different parts of a scene (possibly at different respective zoom rates) with only one camera. Such capability may also be applied to support secondary fields of view that move (e.g., translate) independently of one another within a larger primary field of view.

Systems, methods, and apparatus as described herein may be implemented to operate on an input video stream, also called the "primary video stream." The primary video stream describes a series of frames, where each frame represents an image in a pixel coordinate space. The primary video stream typically includes other information that may be used to recover the frames from the stream (e.g., a corresponding frame start code or packet and frame end code or packet for each frame). A video stream may also include embedded data (e.g., metadata), which may be associated with a particular frame. The video stream may be produced by a camera or other imaging device (which may be sensitive to visible and/or other wavelengths), streamed from another device, or produced by a decoder (e.g., from information stored on a magnetic or optical medium), and may be in compressed or uncompressed form. The primary video stream may include depth information, such as a video stream based on images captured by a structured light imager or other depth camera (e.g., Microsoft Kinect). Such a video stream may be displayed on a touchscreen by, for example, mapping the depth value of each pixel to a corresponding color. The stream may be live, delayed, or retrieved from storage (e.g., pre-recorded).

The primary video stream has a field of view, which may be expressed as an angle of view relative to a point of view (e.g., a lens of the camera or other image capturing device). The angular width of the field of view may change over time as a result of an optical and/or digital zooming operation. FIG. 27A shows an example of a field of view FV10 in the context of a scene being imaged. In this figure, field of view FV10 is indicated by the dotted lines, the point of view is indicated by the small circle, and the portion of the scene that is imaged is indicated by a solid rectangle. FIG. 27B shows a result of performing a zoom-out operation on field of view FV10 as shown in FIG. 27A, which causes it to widen. FIG. 27C shows a result of performing a zoom-in operation on field of view FV10 as shown in FIG. 27A, which causes it to narrow. In FIGS. 27B and 27C, the dashed rectangle and the solid rectangle show the portion of the scene that is imaged before and after the zoom operations, respectively. In all of FIGS. 27A, 27B, and 27C, field of view FOV10 is relative to the same point of view.

A video stream depicts a scene that may include one or more objects. Typically the objects are physical and tangible objects (e.g., people). In FIG. 27A, for example, the objects in the scene include three people, a star, and a tree. However, it is also contemplated that the objects may be virtual or otherwise artificial, as in a stream of drawn and/or computer-generated content (e.g., avatars).

The direction of the field of view may be defined as the direction of a central ray of the field of view (e.g., the direction of the central axis of the view cone). This direction may change over time as a result, for example, of movement of the image capturing device and/or a digital translation operation of a selected window within a larger captured image. FIG. 27E shows a result of changing a direction of field of view FV10 (as indicated by the dotted lines) relative to the direction of field of view FV10 in FIG. 27D. Such a change may be accomplished by, for example, rotating the image capturing device at the point of view and/or applying a digital translation operation to a selected window within the captured image. In both of FIGS. 27D and 27E, field of view FOV10 is relative to the same point of view.

Figure 28C:
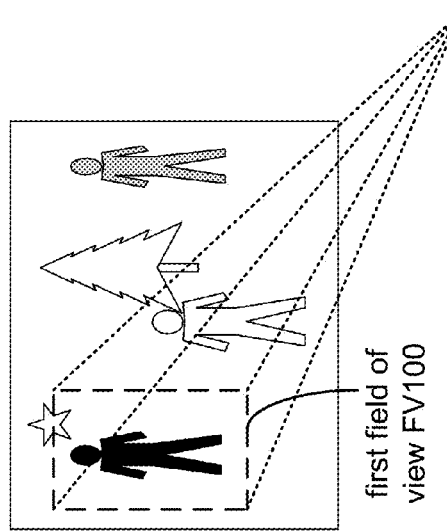
FIGS. 28C and 28D show examples of a first field of view FV100 and a second field of view FV200.
Figure 28D:
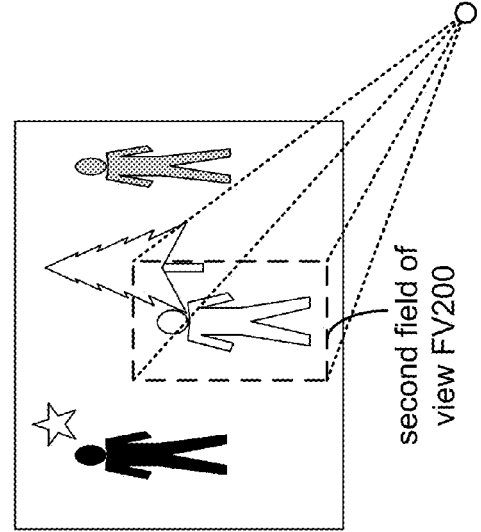
Figure 28A:
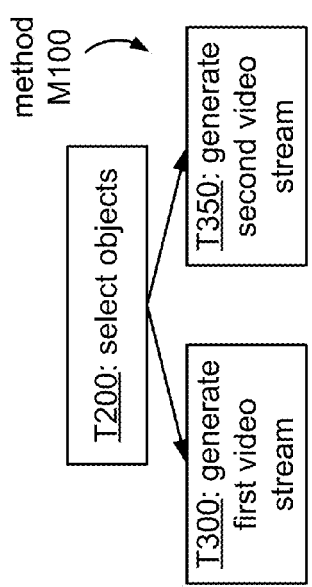
FIG. 28A shows a flowchart of a method M100 of video processing according to a general configuration.

FIG. 28A shows a flowchart of a method M100 of video processing according to a configuration that includes tasks T200, T300, and T350. Task T200 selects at least two objects within a primary video stream that has a primary field of view. In response to the selecting in task T200, task T300 generates a first video stream from the primary video stream that includes a first of the selected objects. The first video stream has a first field of view that is more narrow than the primary field of view.

Subsequent to the selecting in task T200, task T350 generates a second video stream from the primary video stream that includes a second of the selected objects. The second video stream has a second field of view that is also more narrow than the primary field of view. The first field of view includes a portion of the primary field of view that is not within the second field of view, and the second field of view includes a portion of the primary field of view that is not within the first field of view. Tasks T200, T300, and T350 may be performed, for example, by the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

Task T200 selects at least two objects within the primary video stream. The selection may be performed in response to a direct action by a user. In such a case, a screen may be used to display the primary video stream to the user, and the user may enter an indication to select the particular desired objects among the objects that appear in the display. If the display is performed on a touchscreen, the user may indicate a selection by touching the screen to select a point within a desired object.

Figure 29:
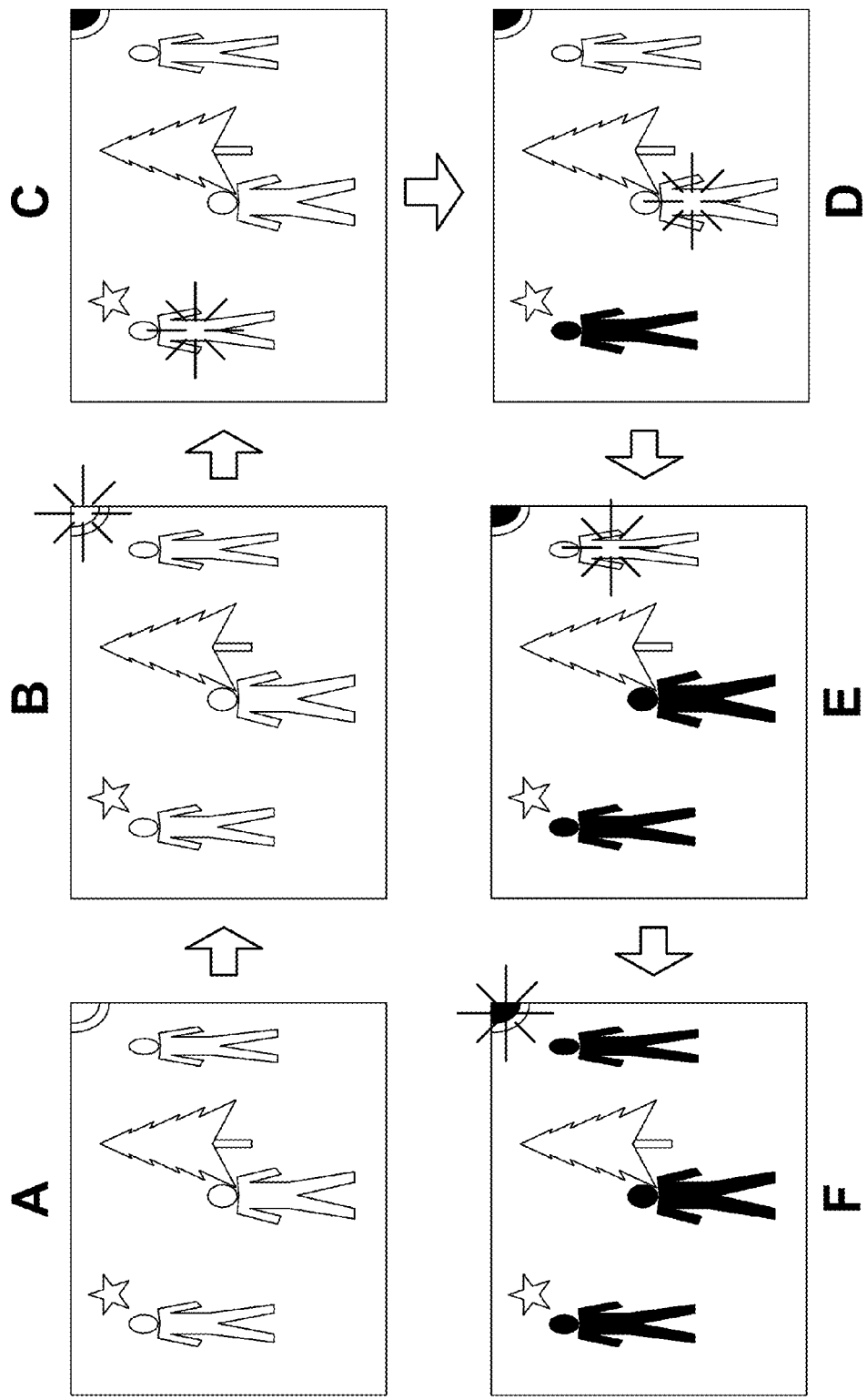
FIG. 29 shows an example of a sequence of user actions to select three objects.

FIG. 29 shows an example of a sequence of user actions to select three objects. Panel A shows a scene as displayed on a touchscreen of a device. The device may be manipulated by the user to initiate a selection mode. For example, the touchscreen may be configured to enter the selection mode when the user touches an appropriate icon. Panel A shows an example of a selection tool icon in the upper right corner of the frame. In panel B, the user touches the selection tool icon to initiate the selection mode. In panel C, the tool icon is highlighted in response to the touch action to indicate that the device is in the selection mode, and the user touches the first object to select it. In panel D, the first object is highlighted (e.g., silhouetted as shown, or outlined) in response to the touch action to indicate that the object is selected, and the user touches the second object to select it. In panel E, the second object is highlighted in response to the touch action to indicate that the object is selected, and the user touches the third object to select it. In panel F, the third object is highlighted in response to the touch action to indicate that the object is selected, and the user touches the selection tool icon again to terminate the selection mode. The device may be configured to de-select a selected object if the user touches it again in the selection mode.

Figure 30:
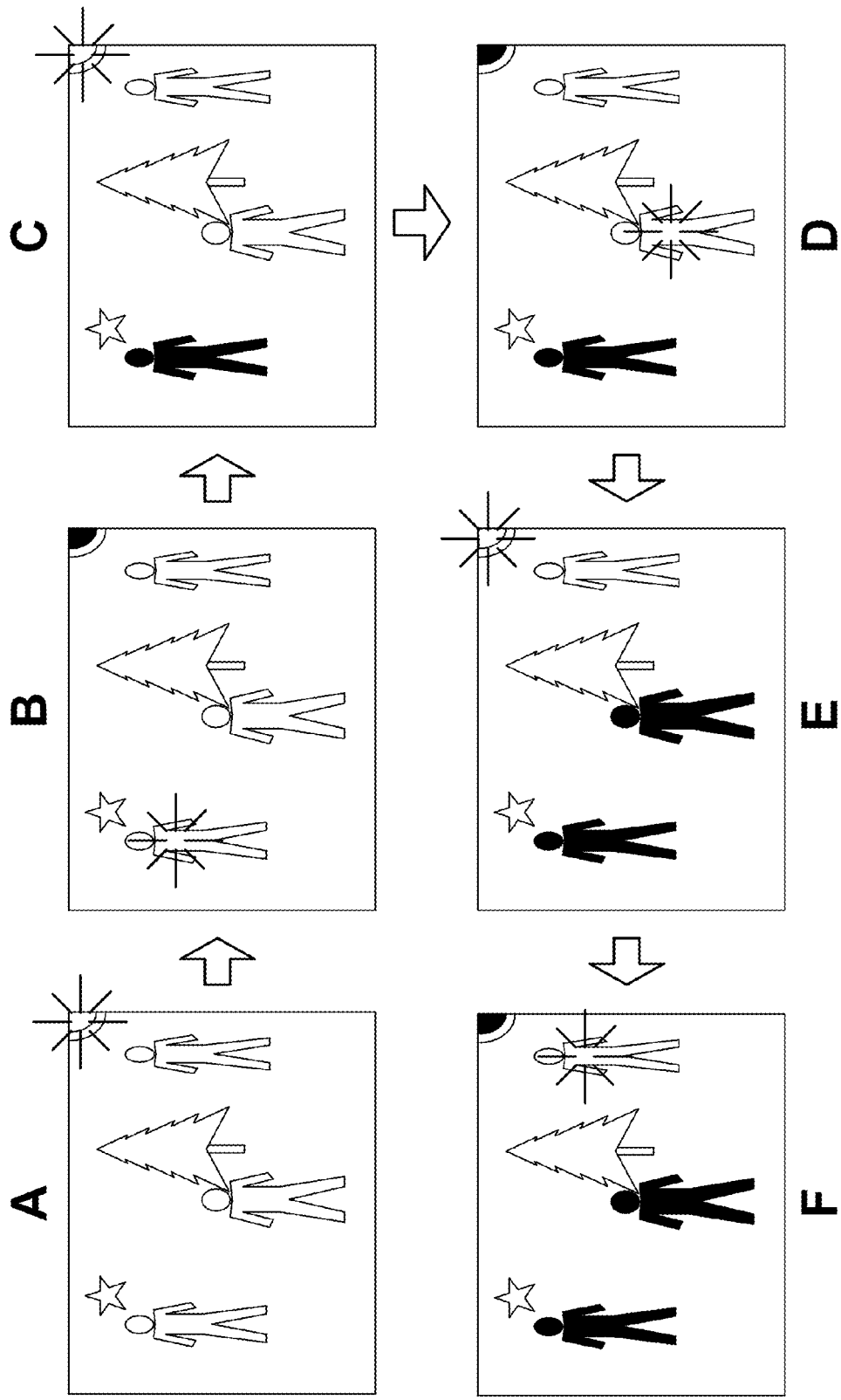
FIG. 30 shows another example of a sequence of user actions to select three objects.

FIG. 30 shows another example of a sequence of user actions to select three objects. In this case, the device operates differently in the selection mode than as shown in FIG. 29. In panel A, the user touches the selection tool icon to initiate the selection mode. In panel B, the tool icon is highlighted in response to the touch action to indicate that the device is in the selection mode, and the user touches the first object to select it. In panel C, the first object is highlighted in response to the touch action to indicate that the object is selected, and in response to the selection, the selection mode is terminated and the highlighting is removed from the tool icon. The user touches the selection tool icon again to initiate the selection mode, and in panel D, the tool icon is highlighted in response to the touch action to indicate that the device is in the selection mode, and the user touches the second object to select it. In panel E, the second object is highlighted in response to the touch action to indicate that the object is selected, and in response to the selection, the selection mode is terminated and the highlighting is removed from the tool icon. The user touches the selection tool icon again to initiate the selection mode, and in panel F, the tool icon is highlighted in response to the touch action to indicate that the device is in the selection mode, and the user touches the third object to select it.

In another example, the touchscreen may be configured to enter the selection mode in response to a two-action selection: a first action selects a menu mode (e.g., the user touches a designated area of the screen to display a menu) and a second action selects a selection mode from the menu. In a further example, the touchscreen may be configured such that the user selects an object by touching and holding a selection tool icon, dragging the icon to the desired point on the screen, and then releasing the icon to select the point. Alternatively, the user may manipulate the touchscreen to indicate a selection by selecting an area of the image that includes at least a portion of the desired object (e.g., a bounding box or ellipse or a lasso). In such case, the user may select the desired objects individually and/or as a group.

It may be desirable to allow the user to manipulate a field of view being displayed during selection mode (e.g., to perform a pinch action to narrow the field of view, and a zoom action to widen the field of view). Besides manipulation of a touchscreen, other possible modalities for direct user selection include actuating one or more buttons or other switches and/or gesture recognition. As an alternative to such direct action by a user, task T200 may perform the selection automatically by applying one or more predetermined criteria to information from the primary video stream. Such criteria may include, for example, recognition of a player's jersey number, face recognition, and/or velocity detection (e.g., to identify a fast-moving object, such as a ball in an athletic event).

Figure 33B:
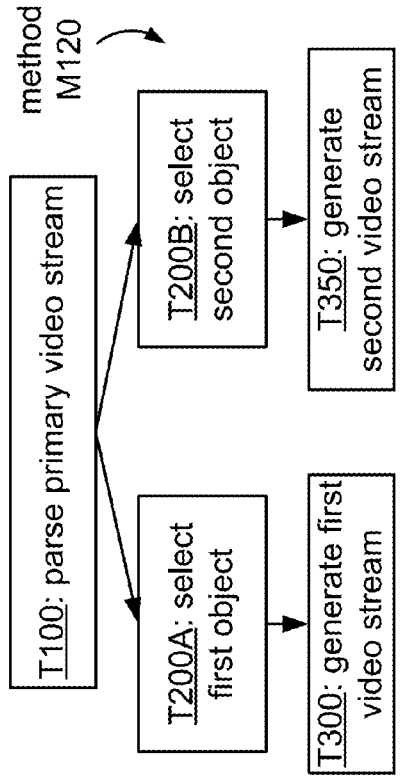
FIG. 33B shows a flowchart of an implementation M120 of methods M100 and M110.

Method M100 may be implemented to track an object in response to its selection in task T200. FIG. 33C shows a flowchart of an implementation M200 of method M100 which includes a task T250 that tracks the selected objects (e.g., as described above with reference to object tracking and detection module 204 and/or object tracking and detection module 804). Alternatively, object tracking may begin prior to task T200. In such case, task T200 may be implemented for selection from among a set of tracked objects. For example, the user may select from among a display of tracked objects. Examples of algorithms that may be used for such object tracking (e.g., by task T250) include the Lucas-Kanade method (and variants, such as the Kanade-Lucas-Tomasi tracker) and mean-shift tracking. Tracking of an object may include segmenting the object from the rest of a frame of the primary video stream, although object tracking may also be performed in the absence of such segmentation.

Segmentation of an object from the rest of a frame of the primary video stream may be used to support enhanced display of the object relative to the rest of the frame (e.g., silhouetting or outlining). Segmentation may be performed (e.g., by task T250 or by task T400 of method M300 as described below) in response to selection of an object in task T200. Such segmentation may be used to provide visual feedback to a user by confirming the object's selection. Segmentation may also be performed before selection begins. In such case, selection in task T200 may be made from among a set of objects that are already segmented (e.g., a display in which the segmented objects are enhanced).

Figure 31:
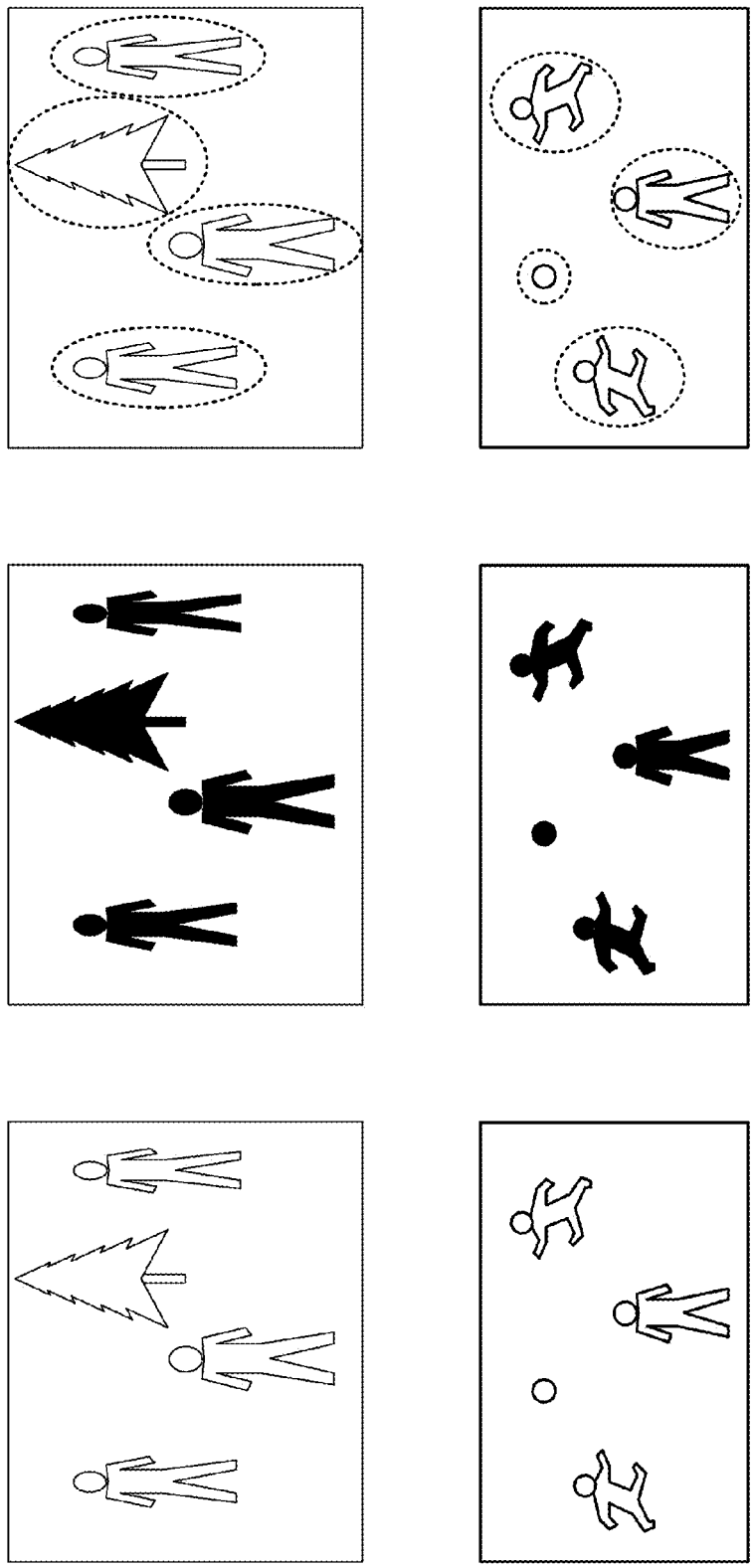
FIG. 31 shows examples of objects within frames and enhanced display of the objects.

The left-hand panels in FIG. 31 show two examples of frames from video streams that depict scenes which include objects. Enhanced display of an object may be performed before selection in task T200 or in response to such selection (e.g., by task T250 or by task T400 of method M300 as described below). One example of enhanced display is a silhouette of the object, which may be displayed in a color that contrasts with the background (e.g., black or yellow, as shown in the center panels of FIG. 31). This contrasting color may be the same for all objects or may differ between objects (e.g., in order to contrast with the local background of each object). Other examples of enhanced display (which may likewise be done in a contrasting color) include outlining of the object and displaying a graphical element at, within, or around the object (e.g., a triangle at the apex or centroid of the object, an ellipse around the object as shown in the right-hand panels of FIG. 31, etc.).

Using a display of the primary video stream as a context for direct selection of objects by a user may be appropriate for slow-moving objects. Such an arrangement may be frustrating for a user, however, if any of the desired objects are moving quickly within the display. In cases of such quick movement, it may be desirable instead to display a single frame of the primary video stream as a context for direct selection of objects by a user. As described above, selection may be made from a display in which the objects in the frame are segmented and enhanced. If stream-display selection and frame-display selection are both supported, selection among these display modes may be performed by a user and/or automatically. For automatic selection, a degree of motion in the stream may be quantified using a measure such as, e.g., optical flow, motion vectors, pixel differences between frames, etc. In such case, a frame-display mode may be selected when the value of the measure is above a threshold, and a stream-display mode may be selected when the value of the measure is below the threshold.

In response to the selecting in task T200, task T300 generates a first video stream from the primary video stream that includes a first of the selected objects. The first video stream has a first field of view that is more narrow than the primary field of view. Subsequent to the selecting in task T200, task T350 generates a second video stream from the primary video stream that includes a second of the selected objects. The second video stream has a second field of view that is also more narrow than the primary field of view.

Figure 28B:
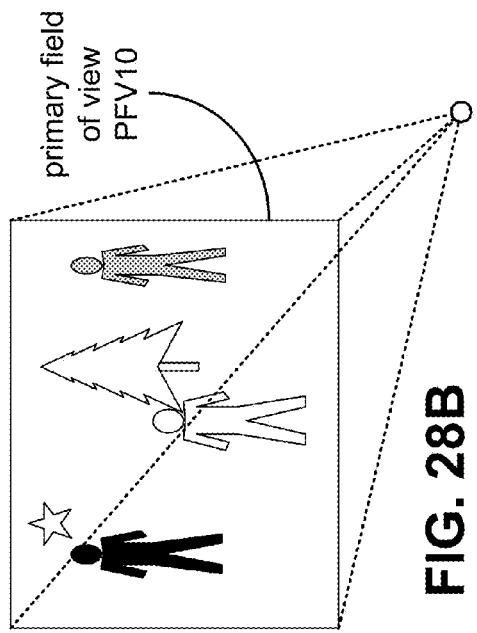
FIG. 28B shows an example of a primary field of view PFV10.

The first field of view includes a portion of the primary field of view that is not within the second field of view, and the second field of view includes a portion of the primary field of view that is not within the first field of view. FIG. 28B shows an example of a primary field of view PFV10, and FIGS. 28B and 28C show examples of a first field of view FV100 and a second field of view FV200, respectively, that are more narrow than primary field of view PFV10 and each of which include a portion of primary field of view PFV10 that is not within the other field of view. The width and/or direction of the first field of view within the primary field of view may change over time. Likewise, the width and/or direction of the second field of view within the primary field of view may change over time.

A video stream is a time sequence of digital images ("frames"). In one example, the sequence of images is captured at a particular frame rate (e.g., for presentation at the same frame rate). A video stream may include information that indicates the beginning and end of each frame. In one example, the video stream includes a frame start code before the first pixel of each frame and a frame end code after the last pixel of each frame. In another example, the video stream includes one or more data signals, which carry the pixel information of the frames of the video stream, and one or more synchronization signals, which indicate the start and end of each frame of the video stream. Depending on the particular format of the primary video stream, the primary video stream may include additional information (e.g., headers, metadata).

It is also possible for the primary video stream to include data other than the frame data (i.e., the pixel values) between the frame start and end codes. Such other data may include, for example, sensor configuration details and/or image statistics values.

Parsing of a video stream includes extracting frames of the video stream (e.g., using the frame start and end information) and making them available for processing. For example, parsing may include storing each frame to a corresponding specified location, such as a buffer. FIG. 33A shows a flowchart of an implementation M110 of method M100 which includes a task T100 that parses the primary video stream to produce a series of frames of the primary video stream. Alternatively, another process may execute to parse the primary video stream (e.g., for display), such that one or more frames of the primary video stream are available to method M100 (e.g., in a buffer in memory) at any time.

Such a buffer (e.g., memory buffer 110) is typically capable of storing at least one full frame at a time. Parsing of the primary video stream may be configured to alternate between multiple frame buffers. For example, one such frame buffer may store a full frame for processing, while the following frame in the sequence is extracted and stored to another frame buffer. Alternatively, task T100 or the parsing process may be configured to store the parsed frames to a circular buffer, such that the buffer is updated (and old frames are overwritten) as new frames are extracted.

Parsing the primary video stream may include a demultiplexing operation to separate the primary video stream from one or more associated audio streams and/or metadata streams. Alternatively, such an operation may be performed upstream of task T100 or the parsing process (e.g., the primary video stream may be provided by a demultiplexer).

Each of tasks T300 and T350 generates a corresponding secondary video stream from the primary video stream. Such a task may be implemented to produce frames of a secondary video stream by extracting, for each frame of the secondary video stream, a desired portion of one or more corresponding frames of the primary video stream. The desired frame portion may be extracted directly from the stream (e.g., from a stream buffer) or from a parsed frame (e.g., as stored in a frame buffer or circular buffer as described above). It is possible to implement method M100 such that task T300 generates a corresponding secondary video stream in response to selection of the first object and prior to selection of the second object. FIG. 33B shows a flowchart of such an implementation M120 of method M110, which demonstrates that tasks T300 and T350 may respond independently to the two selections T200A and T200B of task T200.

The desired frame portion may be determined by parameters such as, for example, the position of a corresponding object (e.g., the object's center of mass), or of a bounding box of such an object, and the desired width and aspect ratio of the corresponding field of view. The values of such parameters may be used, for example, to determine boundaries of the desired frame portion as pixel coordinates within the pixel coordinate space of the primary video stream (e.g., the coordinates of the upper left and lower right pixels of the desired frame portion).

The values of the width and/or aspect ratio of the desired frame portion may be default values, may be indicated by a user or process, and/or may be based on a size of the object (e.g., a size of a bounding box of the object). For example, the width and/or aspect ratio of the desired frame portion may be indicated by a desired number of windows in a display that includes the secondary video stream. It is expressly noted that the secondary video stream may, but need not, have the same aspect ratio as the primary video stream and that each secondary video stream may, but need not, have a unique aspect ratio.

Figures 32A, 32B:
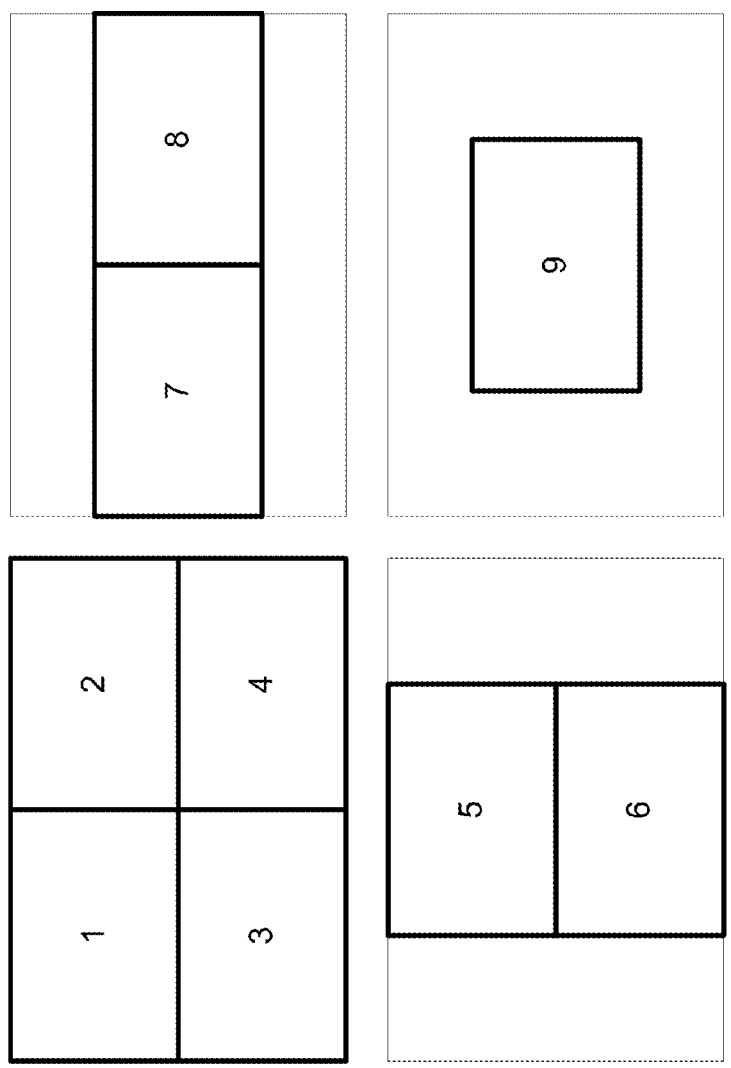
FIG. 32A shows an example set of nine extraction windows.
FIG. 32B shows a correspondence between regions of a frame of a primary video stream and each of the nine windows.

With reference to a frame of the primary video stream as arranged in its pixel coordinate space, the desired frame portion may be considered as an extraction window. In one example, task T300 and/or T350 is implemented to extract a desired frame portion by selecting and applying one of a predetermined set of extraction windows, based on a current position of one or more selected objects. FIG. 32A shows an example set of nine such windows, with reference to a frame of the primary video stream, that each have a fixed size (i.e., one quarter-frame) and a fixed position within the frame. As shown in this example, the windows may overlap, such that the object position may occur within a portion of the frame that is included within more than one of the windows (as indicated by the window correspondence notations in the frame division of FIG. 32B). In such case, the task may be implemented to select one of the indicated windows based on history (e.g., to continue using the most recently selected window if it is also currently indicated for selection) and/or motion (e.g., to select the window whose center most closely coincides with the next expected object position, as indicated by the current position and one or more previous positions of the object within the frame and/or as indicated by movement of the capturing device and/or movement of the primary field of view).

In another example, task T300 and/or T350 is implemented to select one of a predetermined set of extraction window sizes (e.g., based on object size, such as a size of a bounding box of the object). In such case, the task may be implemented to apply an extraction window of the selected size at a desired extraction position within the frame (e.g., having its center aligned with a centroid of one or more objects). In a further example, task T300 and/or T350 is implemented to calculate a size of an extraction window from a size of one or more selected objects (e.g., from the size of the corresponding selected object) and to apply the window at a position (e.g., centroid) of the object. In another further example, task T300 and/or T350 is implemented to apply a current smoothed or unsmoothed search window (e.g., as described herein with reference to FIGS. 7-10) as an extraction window. In any case, it may be desirable to normalize a size of a selected object within each of a plurality of frames of the corresponding secondary video stream. For example, it may be desirable to vary the size of the extracted frame portion (e.g., of the extraction window) in response to a change in the size of a tracked object within the primary video stream (e.g., as the object approaches or moves away from the capturing device and/or as a result of a change in the width of the primary field of view).

It may be desirable to select or calculate the extraction window size and/or position according to one or more presentation constraints. For example, it may be desirable to increase the window size and/or change the window position in response to detecting that the distance between the object and any edge of the desired frame portion is less than a minimum number of pixels (e.g., five, ten, or twenty pixels). Alternatively or additionally, it may be desirable to change the window size in order to maintain a desired relation between the sizes of the object and the desired frame portion (e.g., to normalize a size of the object within the window as described above). For example, it may be desirable to maintain a ratio of an object dimension, such as height and/or width, to a corresponding dimension of the desired frame portion to be not less than a predetermined minimum value (e.g., fifty, sixty, seventy, or eighty percent) and/or not greater than a predetermined maximum value (e.g., eighty, ninety, or ninety-five percent). Such edge-approach detection and/or normalization may also be performed on the primary video stream (e.g., to maintain a desired relation, such as any of the ratios mentioned above, between a dimension of a box bounding the selected objects and a corresponding dimension of a display window within which frames of the primary video stream are displayed).

It may be desirable to implement task T300 and/or task T350 to produce one or more frames of the secondary video stream by performing one or more processing operations on the corresponding extracted desired frame portions. Such processing, which may include resizing, interpolation, normalization, and/or display-related adjustments, may be performed as a desired frame portion is extracted and/or after extraction of the frame portion is completed. For example, producing a frame of the secondary video stream may include normalizing one or more color and/or luminance characteristics of the frame, such as one or more of brightness, contrast, and white balance. Additionally or alternatively, task T300 and/or task T350 may include performing one or more display-related adjustments to pixel information from the primary video stream to produce the second video stream. Examples of such adjustments include transforming the pixel information into a different color space (e.g., YUV to RGB) and performing gamma adjustment.

Task T300 and/or T350 may be implemented to generate the secondary video stream to have a frame-to-frame correspondence with the primary video stream. In such case, the task may generate each frame of the secondary video stream from a corresponding frame of the primary video stream. Task T300 and/or T350 may be alternatively implemented to generate the secondary video stream to have a different frame rate than the primary video stream. In one such example, the task is implemented to generate a secondary video stream to have a lower frame rate than the primary video stream (e.g., by generating each frame of the first video stream from a corresponding n-th frame of the primary video stream, where n is an integer greater than one, and/or interpolating between two or more frames of the primary video stream to obtain a non-integer fraction of the frame rate of the primary video stream). In another example, the task is implemented to generate a secondary video stream to have a higher frame rate than the primary video stream (e.g., by interpolating between two or more frames of the primary video stream to produce a frame of the secondary video stream).

Task T300 and/or T350 may be implemented to produce the corresponding secondary video stream for transmission and/or storage. For example, it may be desirable for such a task to add frame start/end codes to the produced frames and/or to produce one or more synchronization signals that indicate such a division between frames. Other information and/or formatting may be performed to comply with a particular stream format (e.g., such a task may be implemented to packetize the pixel data into a header-plus-payload format). Task T300 and/or T350 may be implemented to provide the secondary video stream to a compressor or other encoder, which may be configured to encode the stream by producing structures such as motion vectors and/or prediction frames. Examples of storage file formats that may be used include any of the following video container formats: AVI, WMV, MOV, MKV, MPG, and MP4.

Task T300 and/or T350 may be implemented to associate metadata with the secondary video stream. Such metadata may be based on information regarding the tracked objects, such as object positions, labels for selected objects (e.g., a person's name), identification of a geometrical arrangement among the selected objects, etc. Additionally or alternatively, the metadata may include information (e.g., camera settings, camera orientation, sensor characteristics, time and/or location of capture) that may be obtained from other elements of the device and/or from metadata in the primary video stream.

Such an implementation of task T300 and/or T350 may encode the metadata into a desired format, such as any among XML (eXtensible Markup Language), KLV (Key-Length-Value), *.srt (SubRip file format), and *.vtt (Web Video Text Track format). In some formats, at least some of the metadata may be included within the secondary video stream (e.g., within a portion of the frame data that is reserved for embedded data). Alternatively, the stream-generating task may be implemented to package the metadata as a metadata stream that is synchronized with the secondary data stream. For example, items of metadata within such a stream may be timestamped to indicate a desired association between such an item and a corresponding frame of the secondary video stream.

Method M100 may also be implemented to combine one or more secondary video streams with other streams. For example, a secondary video stream may be multiplexed with one or more other streams (e.g., one or more audio streams and/or metadata streams). Additionally or alternatively, a secondary video stream may be combined with one or more other video streams (e.g., other secondary video streams) to produce an output stream having frames with multiple windows, each window corresponding to a different one of the video streams. Additionally or alternatively, method M100 may be implemented to include a task that associates metadata (e.g., in any such fashion as described above) with the primary video stream, such as information indicating geometry between selected objects and/or composite geometry (e.g., a geometrical arrangement of the selected objects) as described below with reference to FIGS. 17-20.

Alternatively or in addition to providing the secondary video stream for transmission or storage, task T300 and/or T350 may be implemented to provide the secondary video stream for local display. For example, such a stream-generating task may make the frame data available to a display task, which may be implemented to store the frame data to a display buffer. For example, the display task may be implemented to store the frames of each secondary video stream to a region of the display buffer that corresponds to a corresponding window of the display.

Figure 33D:
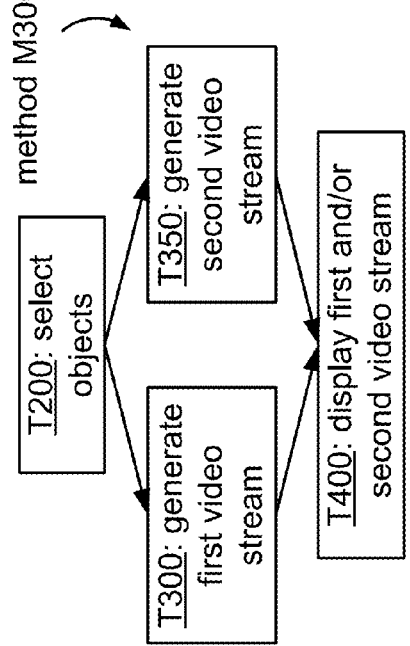
FIG. 33D shows a flowchart of an implementation M300 of method M100.
Figure 33A:
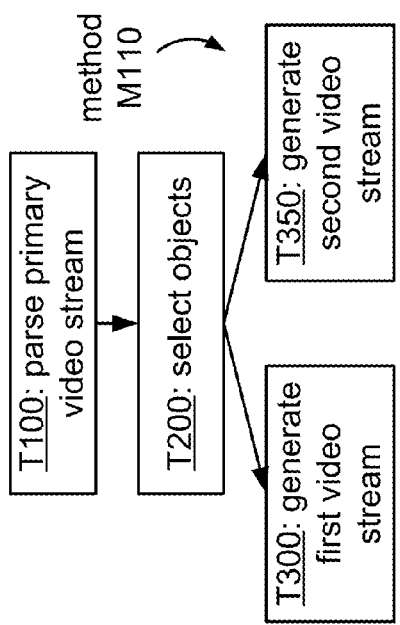
FIG. 33A shows a flowchart of an implementation M110 of method M100.
Figure 33C:
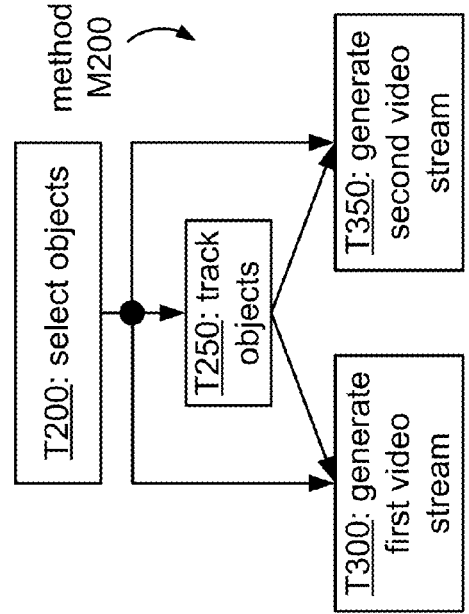
FIG. 33C shows a flowchart of an implementation M200 of method M100.

FIG. 33D shows a flowchart of an implementation M300 of method M100 which includes a display task T400 (e.g., as described above) that displays the first video stream and/or the second video stream. Task T400 may be implemented to display each such stream within a respective window of the display, with display of the primary video stream (e.g., in another window) or without such display. FIG. 37A shows a flowchart of an implementation M400 of methods M200 and M300 in which display task T400 is also responsive to input from tracking task T250.

FIGS. 34A-34C show an example of an application of an implementation of method M300 (e.g., method M400), with FIG. 34A showing a frame PF10 of primary video stream PS10 and FIG. 34C showing a corresponding frame DF10 of a display video stream DS10. The key diagram at the lower left of FIG. 34B shows the association between each selected object in frame PF10 and a corresponding extraction window. The central diagram in FIG. 34B shows the extraction windows defining corresponding desired frame portions FP10-FP40 of the frame, as stored in a frame buffer FB10, and the secondary video streams SS10-SS40 produced by corresponding instances of task T300 and/or T350.

In this example, task T400 is implemented to store each of the secondary video streams to a corresponding one of display portions DP20-DP50 of display buffer DB10 according to a desired arrangement, in display frame DF10, of the windows corresponding to the streams. Also in this example, task T400 is implemented to store a resized version RPS10 of primary video stream PS10 to a display portion DP10 of display buffer DB10 for display in a corresponding window. The key diagram at the lower right of FIG. 34B shows the association between each display portion DP10-DP50 within display buffer DB10 and a corresponding window of display frame DF10.

Tasks T300 and T350 may commence upon selection of each respective object, or upon an indication that the selection operation is completed (e.g., that all desired objects have been selected, that no more selections are currently desired). For a case in which two of the selected objects are in close proximity, generation of one of the secondary video streams may be delayed until a separation between the objects (e.g., as indicated by tracking task T250) reaches or exceeds a threshold distance.

FIG. 35 shows such an example of an application of method M100. Panel A shows the primary field of view PFV20 of the primary video stream. Panel B shows, at a time A, the first field of view FV110 of the first video stream as generated by an instance of task T300. At time A, first field of view FV110 includes both of the first and second objects. Panel C shows, at a time B that is subsequent to time A, first field of view FV110 as generated by the instance of task T300 and the second field of view FV210 of the second video stream as generated by an instance of task T350. At time B, first field of view FV110 includes the first object and no longer includes the second object, and second field of view FV210 includes the second object.

Figure 11:
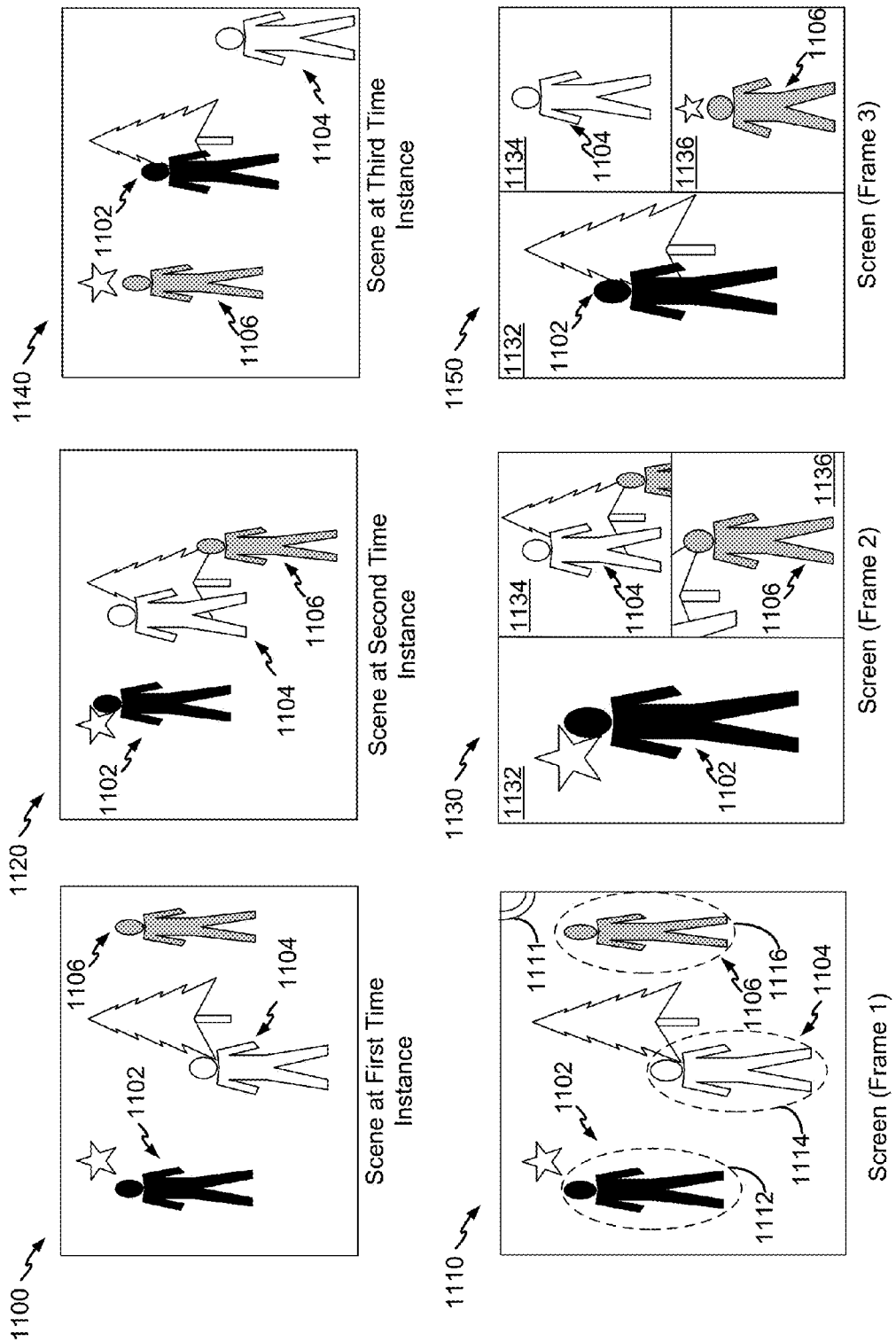
FIG. 11 is a particular embodiment depicting video processing using object tracking.

FIG. 11 shows an example of an application of an implementation of method M100 (e.g., method M110, M200, M300, or M400). The video processing techniques described with respect to the embodiment depicted in FIG. 11 may be performed, for example, by the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

FIG. 11 shows a frame 1100 of a primary video stream that depicts a scene as captured at a first time instance. For example, frame 1100 may correspond to a frame of a video stream to be displayed on a screen of a mobile device. The mobile device may be configured to capture the stream (e.g., with a camera of the mobile device) or to receive it from another device. The scene depicted in frame 1100 includes a first object 1102, a second object 1104, a third object 1106, a star, and a tree. In the illustrated embodiment, first object 1102 may correspond to a first person, second object 1104 may correspond to a second person, and third object 1106 may correspond to a third person. In another embodiment, at least one of the objects 1102-1106 may correspond to a robot that is controlled via the mobile device.

FIG. 11 also shows a display 1110 of frame 1100 on a screen of the mobile device. The screen of the mobile device (e.g., a touchscreen) may correspond to a viewfinder. Display 1110 may also include a user selection mechanism 1111 that enables a user to select displayed objects for tracking (e.g., by tracking task T250). For example, the user may touch user selection mechanism 1111 on the screen and then drag a first focus ring 1112 around first object 1102 to enable tracking of first object 1102. In response to such placement of first focus ring 1112, the mobile device may select first object 1102 for tracking within the depicted scene. In a similar manner, the user may also touch user selection mechanism 1111 and then drag a second focus ring 1114 around second object 1104, and touch user selection mechanism 1111 and then drag a third focus ring 1116 around third object 1106, to enable tracking of second object 1104 and third object 1106, respectively. In response to such placement of second focus ring 1114 and third focus ring 1116, the mobile device may select second object 1104 and third object 1106, respectively, for tracking within the depicted scene.

FIG. 11 also shows a frame 1120 of the video stream that depicts the scene as captured at a second time instance (e.g., subsequent to the first time instance). In frame 1120, the positions of the objects 1102-1106 have changed with respect to the corresponding positions in frame 1100 depicting the scene at the first time instance. For example, in frame 1120 first object 1102 has moved closer to the star, second object 1104 has moved closer to the tree, and third object 1106 has moved closer to the bottom of the frame.

FIG. 11 also shows a display 1130 of frame 1120 on the screen of the mobile device. Display 1130 may be partitioned (e.g., by display task T400) into two or more windows. In this example, display 1130 is partitioned into a first window 1132, a second window 1134, and a third window 1136. In response to selection of the three objects 1102-1106 with user selection mechanism 1111, for example, the mobile device may partition display 1130 into three corresponding windows 1132-1136.

The device may be configured to apply the selected partitioning in response to an indication by the user that object selection is complete. For example, although a default partitioning may be applied by creating each window as the corresponding object is selected, it may be desirable to refrain from applying the partitioning until object selection is completed (e.g., such that the display area remains available during object selection). The device may indicate that object selection is in progress by, for example, blinking the focus rings and/or selected objects until completion of selection is indicated. The focus ring or other selection indication for each selected object may continue to follow or otherwise indicate the object (e.g., as the object moves within the scene) until completion of selection is indicated.

The first window 1132 may display a first portion of frame 1120 that includes first object 1102. The first portion of frame 1120 may be determined based on a location of first object 1102 in frame 1120. For example, the mobile device may track the location of first object 1102 and display, in first window 1132, a video stream that is focused on (e.g., centered at) the location of first object 1102. The second window 1134 may display a second portion of frame 1120 that includes second object 1104. The second portion of frame 1120 may be determined based on a location of second object 1104 in frame 1120. For example, the mobile device may track the location of second object 1104 and display, in second window 1134, a video stream that is focused on the location of second object 1104. The third window 1136 may display a third portion of frame 1120 that includes third object 1106. The third portion of frame 1120 may be determined based on a location of third object 1106 in frame 1120. For example, the mobile device may track the location of third object 1104 and display, in third window 1136, a video stream that is focused on the location of third object 1106.

FIGS. 36A and 36B show examples of other possible default arrangements of windows 1132-1136. A particular default arrangement may be user-selectable as a display configuration option of the device. The arrangement may be fixed or may be modifiable by the user. In one example, the device is configured such that the user may move a window to a different location in the display by dragging one of the window sides, may resize a window by dragging a corner of the window that is not located on a border of the display, and may delete a window by holding the fingertip or stylus within the window (e.g., for a period of two seconds). In a further example, the device is configured such that the user may double-tap within a window to cause the device to exchange the content of that window (e.g., the secondary video stream displayed within the window) with the content of the window which is currently the largest in the display.

FIG. 11 also shows a frame 1140 of the video stream that depicts the scene at a third time instance (e.g., subsequent to the second time instance). In frame 1140, the position of each object 1102-1106 has changed with respect to the corresponding positions in frame 1120 depicting the scene at the second time instance. For example, in frame 1140 first object 1102 has moved closer to the tree, second object has moved closer to the bottom of the frame, and third object 1106 has moved closer to the star.

FIG. 11 also shows a display 1150 of frame 1140 on the screen of the mobile device using the windows 1132-1136 generated by the mobile device. For example, first window 1132 displays a first portion of frame 1140 that includes first object 1102, second window 1134 displays a second portion of frame 1140 that includes second object 1104, and third window 1136 displays a third portion of frame 1140 that includes third object 1106.

Within each of the windows, it may be desirable to normalize the location of the respective selected object. For example, it may be desirable to display a window such that a center (e.g., a center of mass) of the respective selected object coincides with a center of the window, and to maintain this relation as the object moves within the scene. Additionally or alternatively, within each of the windows, it may be desirable to normalize the size of the respective selected object. For example, it may be desirable to display a window such that the maximum dimension of the respective selected object is between fifty and seventy-five percent of the corresponding dimension of the window, and to maintain this relation as the object moves toward or away from the camera. Such display may be achieved, for example, by resizing (e.g., applying a digital zoom operation to) the portion being displayed in the window. Additionally or alternatively, within each of the windows, it may be desirable to normalize one or more display aspects of the window, which may include any of brightness, contrast, and white balance.

In a particular embodiment, a fourth window (e.g., window 1138 as shown in FIG. 36C) may be included (e.g., by display task T400) in the displays 1130 and 1150. The fourth window may illustrate the geometry between each object as further described with respect to FIG. 17. Additionally, or in the alternative, the fourth window may display a video stream that includes frames 1120 and 1140. For example, first window 1132, second window 1134, and third window 1136 may correspond to picture-in-picture shots of frames 1120 and 1140 and the fourth window may correspond to the entire frames 1120 and 1140. In such case, it may be desirable to control an optical and/or digital zoom operation of the camera such that all of the selected objects remain visible within the stream being displayed in the fourth window. Such a combination of zooming responsive to object selection may also be performed in the absence of display partitioning. Alternatively or additionally, it may be desirable to indicate the selected objects within the stream being displayed in the fourth window. For example, a mark may be overlaid on each object (e.g., a shape having a contrasting color respective to the object and overlaid at the object's centroid) and/or a halo (e.g., an ellipse) may be arranged around the object (possibly with a lower contrast or other distinguishing appearance within the halo). FIGS. 36D and 36E show two other examples of possible arrangements of windows 1132-1138.

In another particular embodiment, tracking of a single object (e.g., only first object 1112) may be selected for display. In response to selecting the object for display, the display may be partitioned into two windows (e.g., as shown in FIG. 36F). In this case, a first window may include a portion of the scene that is determined based on a position of the selected object in the scene. For example, the mobile device may track the location of the selected object and a video stream focused on the position of the object may be displayed in the first window (e.g., by task T400). Additionally, a second window may include the entire scene. Thus, the first window may correspond to a focused picture-in-picture shot of the selected object in the scene.

FIGS. 41A and 41B show two examples of displays of a portion of the field of view of the primary video stream that includes the selected objects. Such a display may be displayed in a window as described above (e.g., window 1132, 1134, 1136, or 1138), which may be shown with or instead of a window that shows the entire field of view of the primary video stream. Each of these examples includes an icon (the dotted box in FIG. 41A, and the bounded line near the top of FIG. 41B) whose dimension relative to the size of the window indicates the relation of the displayed (narrowed) field of view to the field of view of the primary video stream. In these particular examples, the narrowed field of view is centered at a position of the composite geometry of the selected objects (indicated by an open circle). Each of these examples also includes a dotted line that indicates the recent trajectory of this position.

FIG. 42 shows an example of a frame of a display video stream (e.g., as produced by an implementation of display task T400). This frame includes three windows, along the bottom of the frame, that display secondary video streams corresponding to the selected objects A, B, and C (e.g., as generated by instances of tasks T300 and T350). The upper left window displays the primary video stream, which may be resized to fit the window. This window also includes an overlay (in this example, a crosshair) that indicates the position of the composite geometry of the selected objects in the corresponding frame. The upper right window displays a portion of the field of view of the primary video stream that includes the selected object, as described above with reference to FIGS. 41A-B.

FIG. 43B shows an example of a graphic that indicates a composite geometry of the selected objects, a position of this geometry, and a recent trajectory of this position. Such a graphic may be displayed as a separate window or overlaid on a display of the primary video stream. FIGS. 43A and 43C show windows displaying frames of the primary video stream that include similar overlays.

The embodiment depicted in FIG. 11 may enable the mobile device to track objects 1102-1106 in the frames 1100, 1120, 1140 and may display individualized (e.g., focused) video streams corresponding to the objects 1102-1106 in separate windows 1132-1136. The mobile device may perform the techniques described with respect to FIG. 11 using a single camera or using multiple cameras. While the partitioning is being configured (e.g., by the user) and applied to the video stream, the device may continue to record the unpartitioned video stream and/or one or more video streams that each include one or more of the windows. Additionally or as an alternative to storing one or more video streams that each include one or more of the windows, it may be desirable for the device to store metadata (embedded in the video stream and/or as a separate file) from which the particular partitioning may be recreated from the recorded unpartitioned stream.

Figure 12:
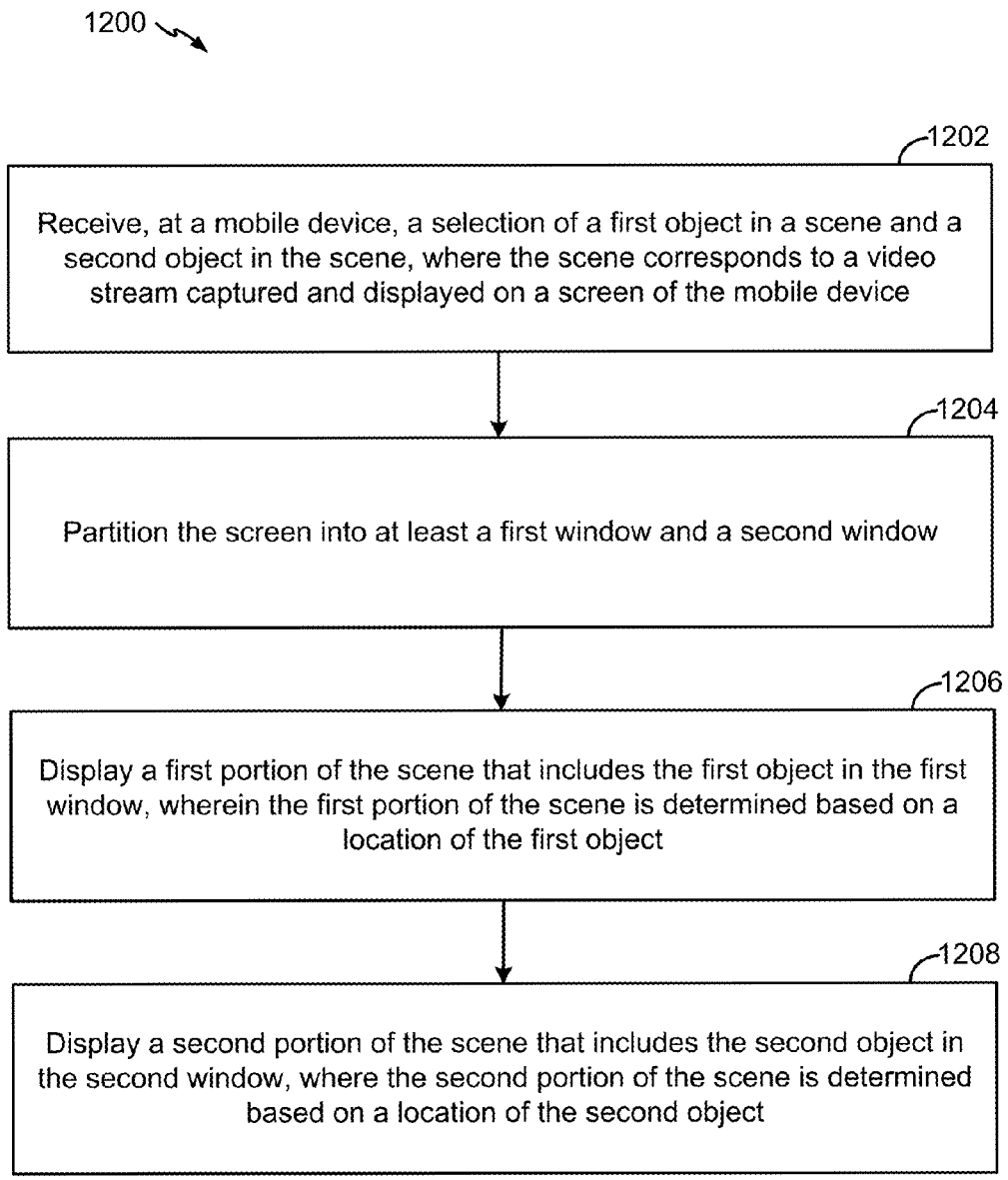
FIG. 12 is a flowchart of a particular illustrative embodiment of a video processing method using object tracking.

Referring to FIG. 12, a flowchart that illustrates a particular embodiment of a video processing method 1200 using object tracking is shown. In an illustrative embodiment, the method 1200 may be performed using the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

The method 1200 includes receiving, at a mobile device, a selection of a first object in a displayed scene and a second object in the displayed scene, at 1202. For example, referring to FIG. 11, the user may touch user selection mechanism 1111 on the screen and then drag first focus ring 1112 around first object 1102, and touch user selection mechanism 1111 on the screen and then drag second focus ring 1114 around second object 1104, to enable tracking of first object 1102 and second object 1104, respectively. The displayed scene may correspond to a video stream captured and displayed on the screen of the mobile device.

The display may be partitioned into at least a first window and a second window, at 1204. For example, referring to FIG. 11, the display 1130 may be partitioned into first window 1132, second window 1134, and third window 1136. For example, in response to selecting the three objects 1102-1106 with user selection mechanism 1111, the mobile device may partition the display 1130 into three corresponding windows 1132-1136.

A first portion of the scene that includes the first object may be displayed in the first window, at 1206. For example, referring to FIG. 11, the first window 1132 may display the first portion of frame 1120 that includes first object 1102. The first portion of frame 1120 may be determined based on a location of first object 1102 in frame 1120. For example, the mobile device may track the location of first object 1102 and a video stream focused on the location of first object 1102 may be displayed in the first window 1132.

A second portion of the scene that includes the second object may be displayed in the second window, at 1208. For example, referring to FIG. 11, the second window 1134 may display the second portion of frame 1120 that includes second object 1104. The second portion of frame 1120 may be determined based on a location of second object 1104 in frame 1120. For example, the mobile device may track the location of second object 1104 and a video stream focused on the location of second object 1104 may be displayed in the second window 1134.

The method 1200 of FIG. 12 may enable the mobile device to track objects 1102-1106 in the scene 1100, 1120, 1140 and may display individualized (e.g., focused) video streams corresponding to the objects 1102-1106 in separate windows 1132-1136. The mobile device may perform the method 1200 using a single camera or using multiple cameras.

Figure 13:
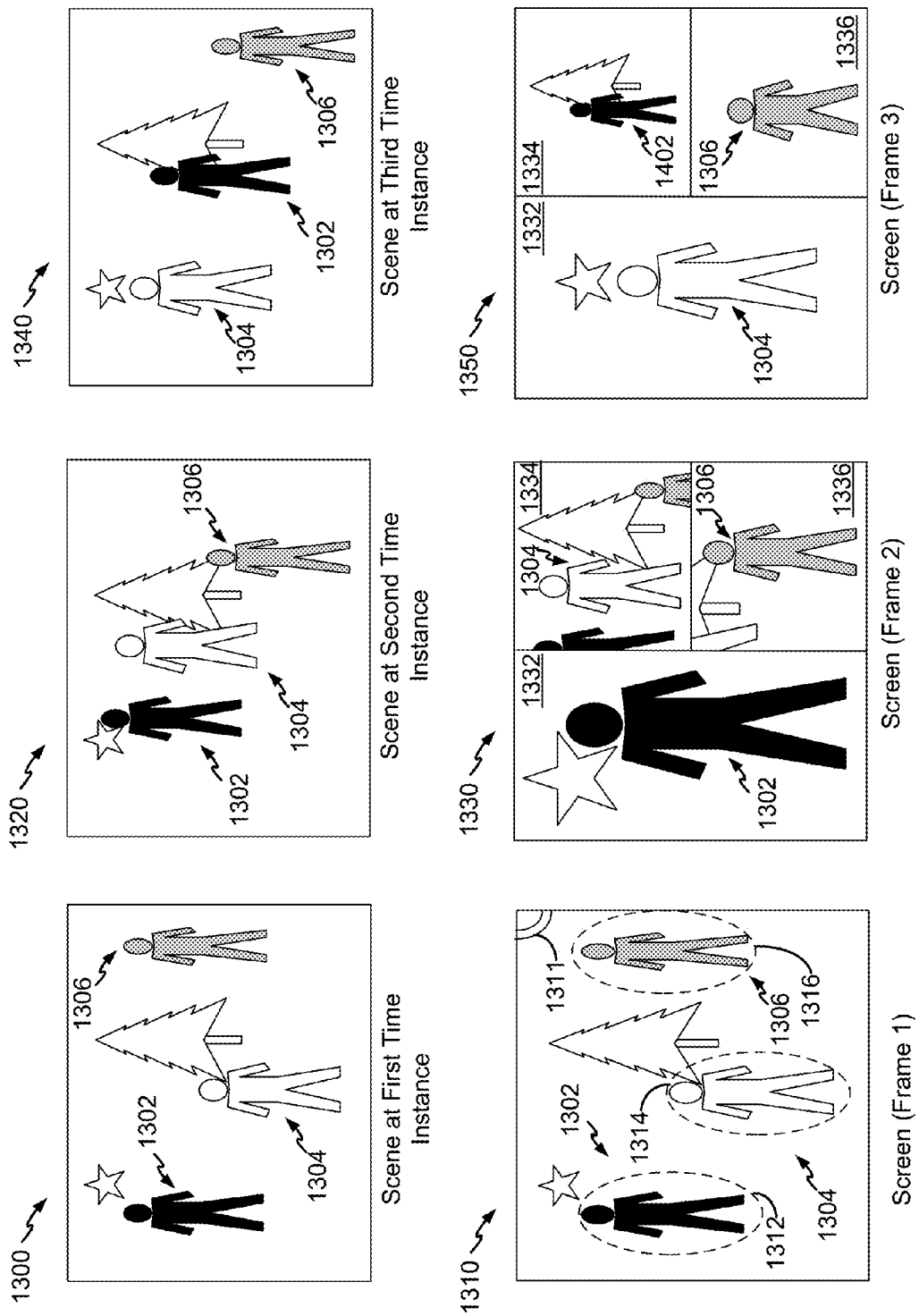
FIG. 13 is another particular embodiment depicting video processing using object tracking.

FIG. 13 shows an example of an application of an implementation of method M100 (e.g., method M110, M200, M300, or M400). The video processing techniques described with respect to the embodiment depicted in FIG. 13 may be performed by the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

FIG. 13 shows a frame 1300 of a primary video stream that depicts a scene as captured at a first time instance. For example, frame 1300 may correspond to a frame of a video stream to be displayed on a screen of a mobile device. The mobile device may be configured to capture the stream (e.g., with a camera of the mobile device) or to receive it from another device. The scene depicted in frame 1300 includes a first object 1302, a second object 1304, a third object 1306, a star, and a tree. In the illustrated embodiment, the first object 1302 may correspond to a first person, the second object 1304 may correspond to a second person, and the third object 1306 may correspond to a third person. In another embodiment, at least one of the objects 1302-1306 may correspond to a robot that is controlled via the mobile device.

FIG. 13 also shows a display 1310 of frame 1300 on a screen of the mobile device. The screen of the mobile device (e.g., a touchscreen) may correspond to a viewfinder. Display 1310 may include a user selection mechanism 1311 that enables a user to select objects for tracking (e.g., by tracking task T250). For example, the user may touch user selection mechanism 1311 on the screen and drag a first focus ring 1312 around first object 1302 to enable tracking of first object 1302. In response to such placement of first focus ring 1312, the mobile device may select first object 1312 for tracking within the depicted scene. In a similar manner, the user may also touch user selection mechanism 1311 on the screen and drag a second focus ring 1314 and a third focus ring 1316 around second object 1304 and third object 1306 to enable tracking of second object 1304 and third object 1306, respectively. In response to such placement of second focus ring 1314 and third focus ring 1316, the mobile device may select second object 1304 and third object 1306, respectively, for tracking.

FIG. 13 also shows a frame 1320 of the video stream that depicts the scene as captured at a second time instance. In frame 1320, the position of each object 1302-1306 has changed with respect to the corresponding positions in frame 1300 depicting the scene at the first time instance. For example, in frame 1320 first object 1302 has moved closer to second object 1304, second object 1304 has moved closer to first object 1302, and third object 1306 has moved closer to the bottom of the frame.

FIG. 13 also shows a display 1330 of frame 1320 on the screen of the mobile device. Display 1330 may be partitioned (e.g., by display task T400) into two or more windows. In this example, display 1330 is partitioned into a first window 1332, a second window 1334, and a third window 1336. For example, in response to selecting the three objects 1302-1306 with the user selection mechanism 1311, the mobile device may partition the display 1330 into three corresponding windows 1332-1336.

The mobile device may be configured to apply the selected partitioning in response to an indication by the user that object selection is complete. For example, although a default partitioning may be applied by creating each window as the corresponding object is selected, it may be desirable to refrain from applying the partitioning until object selection is completed (e.g., such that the display area remains available during object selection). The device may indicate that object selection is in progress by, for example, blinking the focus rings and/or selected objects until completion of selection is indicated. The focus ring or other selection indication for each selected object may continue to follow or otherwise indicate the object (e.g., as the object moves within the scene) until completion of selection is indicated.

The first window 1332 may display a first portion of frame 1320 that includes first object 1302. The first portion of frame 1320 may be determined based on a location of first object 1302 in frame 1320. For example, the mobile device may track the location of first object 1302 and display, in first window 1332, a video stream that is focused on (e.g., centered at) the location of first object 1302. The second window 1334 may display a second portion of frame 1320 that includes second object 1304. The second portion of frame 1320 may be determined based on a location of second object 1304 in frame 1320. For example, the mobile device may track the location of second object 1304 and display, in second window 1334, a video stream that is focused on the location of second object 1304. The third window 1336 may display a third portion of frame 1320 that includes third object 1306. The third portion of frame 1320 may be determined based on a location of third object 1306 in frame 1320. For example, the mobile device may track the location of third object 1304 and display, in third window 1336, a video stream focused on the location of the third object 1306.

FIG. 13 also shows a frame 1340 that depicts the scene at a third time instance (e.g., subsequent to the second time instance). In frame 1340, the position of each object 1302-1306 has changed with respect to the corresponding positions in frame 1320 depicting the scene at the second time instance. For example, in frame 1340 first object 1302 and second object 1304 have crossed each one another, and third object 1306 has moved closer to the bottom-right portion of the frame.

FIG. 13 also shows a display 1350 of frame 1340 on the screen of the mobile device using the windows 1332-1336 generated by the mobile device. It will be appreciated that the first portion of frame 1340 is displayed in the second window 1334 and the second portion of frame 1340 is displayed in the first window 1332. For example, if a portion of first object 1302 overlaps a portion of second object 1304 by a threshold amount (as indicated, e.g., by tracking task T250), the first window 1332 may display a video stream focused on second object 1304 and the second window 1334 may display a video stream focused on first object 1302. The third window 1336 displays the third portion of frame 1340 that includes third object 1306.

In a particular embodiment, the threshold amount may correspond to a complete overlap of first object 1302 and second object 1304. For example, when each x-coordinate (or y-coordinate) associated with the position of first object 1302 has a value that is less than each x-coordinate (or y-coordinate) associated with the position of second object 1304, first object 1302 may completely overlap (e.g., cross) second object 1304 at a frame when each x-coordinate (or y-coordinate) associated with the position of first object 1302 has a value that is greater than each x-coordinate (or y-coordinate) associated with the position of second object 1304.

Alternatively, when each x-coordinate (or y-coordinate) associated with the position of first object 1302 has a value that is greater than each x-coordinate (or y-coordinate) associated with the position of second object 1304, first object 1302 may completely overlap (e.g., cross) second object 1304 at a frame when each x-coordinate (or y-coordinate) associated with the position of first object 1302 has a value that is less than each x-coordinate (or y-coordinate) associated with the position of second object 1304.

In one example, an overlap may be indicated when the distance between the centers of the bounding boxes of two selected objects in a dimension (e.g., height or width) is less than half of the sum of the sizes of the two boxes in that dimension. In such case, the tracking task may assume that the object closest to the bottom of the frame is overlapping the other object. In another example, a color histogram is performed to associate a respective range of color values with each selected object. In such case, an overlap may be indicated when two objects are in proximity and a spatial border between (A) pixels having color values in the range of one object and (B) pixels having color values in the range of the other object is found within an expected area of one of the objects.

In another particular embodiment, the threshold amount may correspond to a partial overlap of first object 1302 and second object 1304 (e.g., by ten, twenty, twenty-five, thirty, forty, or fifty percent of the expected area of the overlapped object). For example, in a frame where an x-coordinate (or y-coordinate) associated with the position of first object 1302 has the same value of an x-coordinate (or y-coordinate) associated with the position of second object 1304, first object 1302 may partially overlap second object 1304.

The embodiment depicted in FIG. 13 may enable the mobile device to track objects 1302-1306 in frames 1300, 1320, 1340 and may display individualized (e.g., focused) video streams corresponding to the objects 1302-1306 in separate windows 1332-1336. The embodiment depicted in FIG. 13 may also enable the video stream in each window 1332-1336 to depict the relative positions of each object 1302-1306 with respect to one another. The mobile device may perform the techniques described with respect to FIG. 13 using a single camera or using multiple cameras.

It may be desirable to implement display task T400 to modify a display partitioning as described above in response to detecting an occlusion among the selected objects. For example, when particular objects cross one another (e.g., as indicated by the tracking task), the associations between the secondary video streams and the corresponding windows 1332-1336 may be updated (e.g., switched) to reflect the cross. It may be desirable to configure the device to call attention to the switch by, for example, blinking the switched objects and/or windows for a brief period (e.g., one, two, or three seconds).

It may be desirable to apply an inertial mechanism (e.g., within tracking task T250 and/or display task T400) to inhibit overly frequent switching among objects that remain in close proximity for some time. In one such example, a hangover period is applied such that a switch among two objects will not be reversed within the hangover period (e.g., two, three, four, or five seconds). In another example, a hysteresis function is applied to the threshold amount such that a switch among two objects will not be reversed within the hangover period unless a second, higher threshold amount of overlap occurs within the hangover period.

Figure 14:
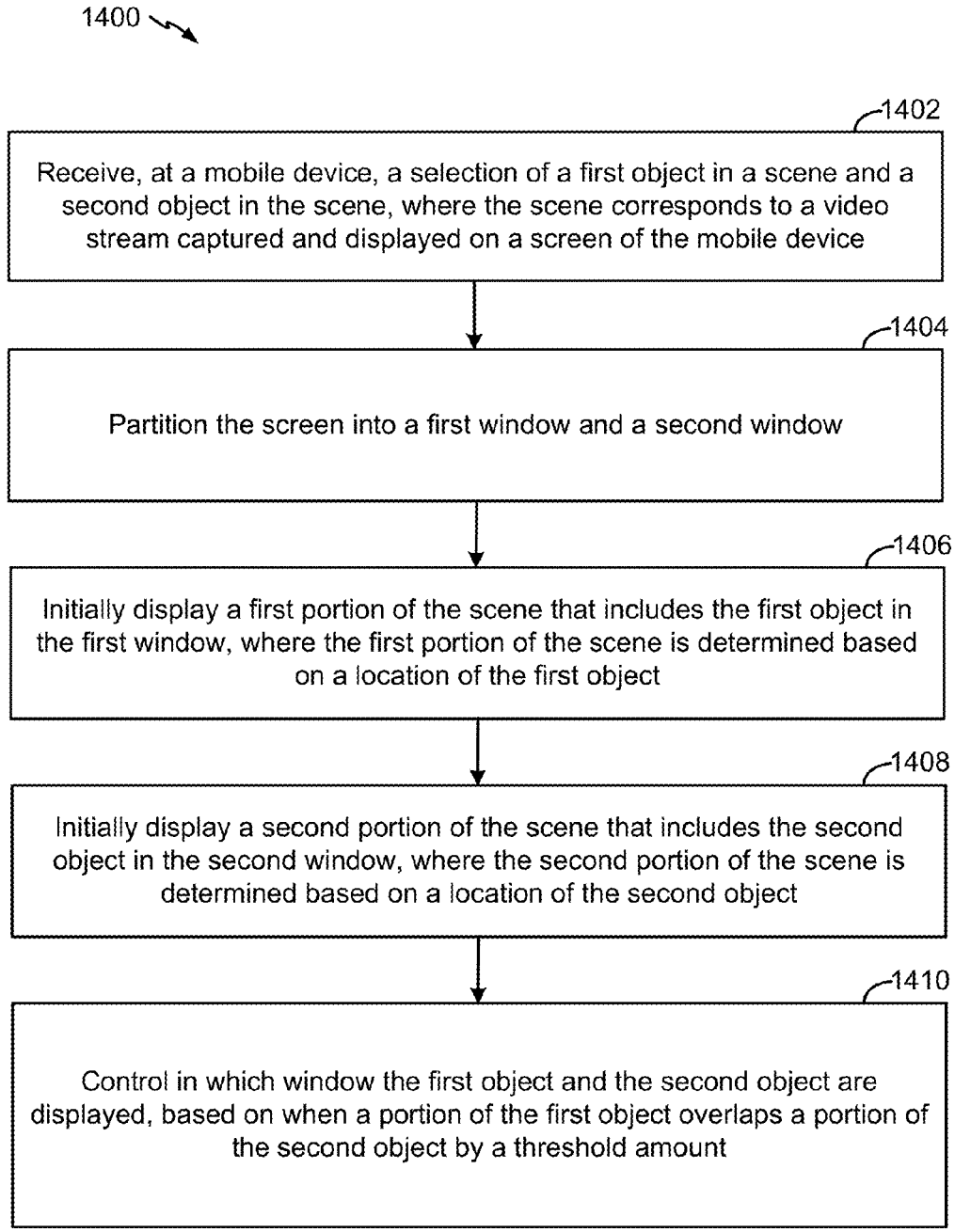
FIG. 14 is another flowchart of a particular illustrative embodiment of a video processing method using object tracking.

Referring to FIG. 14, a flowchart that illustrates a particular embodiment of a video processing method 1400 using object tracking is shown. In an illustrative embodiment, the method 1400 may be performed using the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

The method 1400 includes receiving, at a mobile device, a selection of a first object in a displayed scene and a second object in the displayed scene, at 1402. For example, referring to FIG. 13, the user may touch user selection mechanism 1311 on the screen and drag the first focus ring 1312 around first object 1302 and the second focus ring 1314 around second object 1304 to enable tracking of the first object 1302 and the second object 1304, respectively. The displayed scene may correspond to frames (e.g., frame 1300) of a video stream captured and displayed on the screen of the mobile device.

The screen may be partitioned into at least a first window and a second window, at 1404. For example, referring to FIG. 13, the display 1330 may be partitioned into the first window 1332, the second window 1334, and the third window 1336. For example, in response to selecting the three objects 1302-1306 with user selection mechanism 1311, the mobile device may partition the display 1330 into three corresponding windows 1332-1336.

A first portion of the scene that includes the first object may be initially displayed in the first window, at 1406. For example, referring to FIG. 13, the first window 1332 may initially display the first portion of frame 1320 that includes first object 1302. The first portion of frame 1320 may be determined based on a location of first object 1302 in frame 1320. For example, the mobile device may track the location of first object 1302 and a video stream focused on the location of first object 1302 may be displayed in the first window 1332.

A second portion of the scene that includes the second object may be initially displayed in the second window, at 1408. For example, referring to FIG. 13, the second window 1334 may initially display the second portion of frame 1320 that includes second object 1304. The second portion of frame 1320 may be determined based on a location of second object 1304 in frame 1320. For example, the mobile device may track the location of second object 1304 and a video stream focused on the location of second object 1304 may be displayed in the second window 1334.

The windows in which the first object and the second object are displayed may be controlled based on when a portion of the first object overlaps a portion of the second object by a threshold amount, 1410. For example, referring to FIG. 13, the first portion of frame 1340 is displayed in the second window 1334 of the display 1350 and the second portion of frame 1340 is displayed in the first window 1332 of display 1350. For example, if a portion of first object 1302 overlaps a portion of second object 1304 by a threshold amount, the first window 1332 may display a video stream focused on the second object 1304 and the second window 1334 may display a video stream focused on the first object 1302. The third window 1336 displays the third portion of frame 1340 that includes the third object 1306.

The method 1400 of FIG. 14 may enable the mobile device to track objects 1302-1306 in frames 1300, 1320, 1340 and may display individualized (e.g., focused) video streams corresponding to the objects 1302-1306 in separate windows 1332-1336. The method 1400 may also enable the video stream in each window 1332-1336 to depict the relative positions of each object 1302-1306 with respect to one another. For example, when particular objects cross one another, the video streams in the windows 1332-1336 may be updated (e.g., switched) to reflect the cross. The mobile device may perform the method 1400 using a single camera or using multiple cameras.

Figure 15:
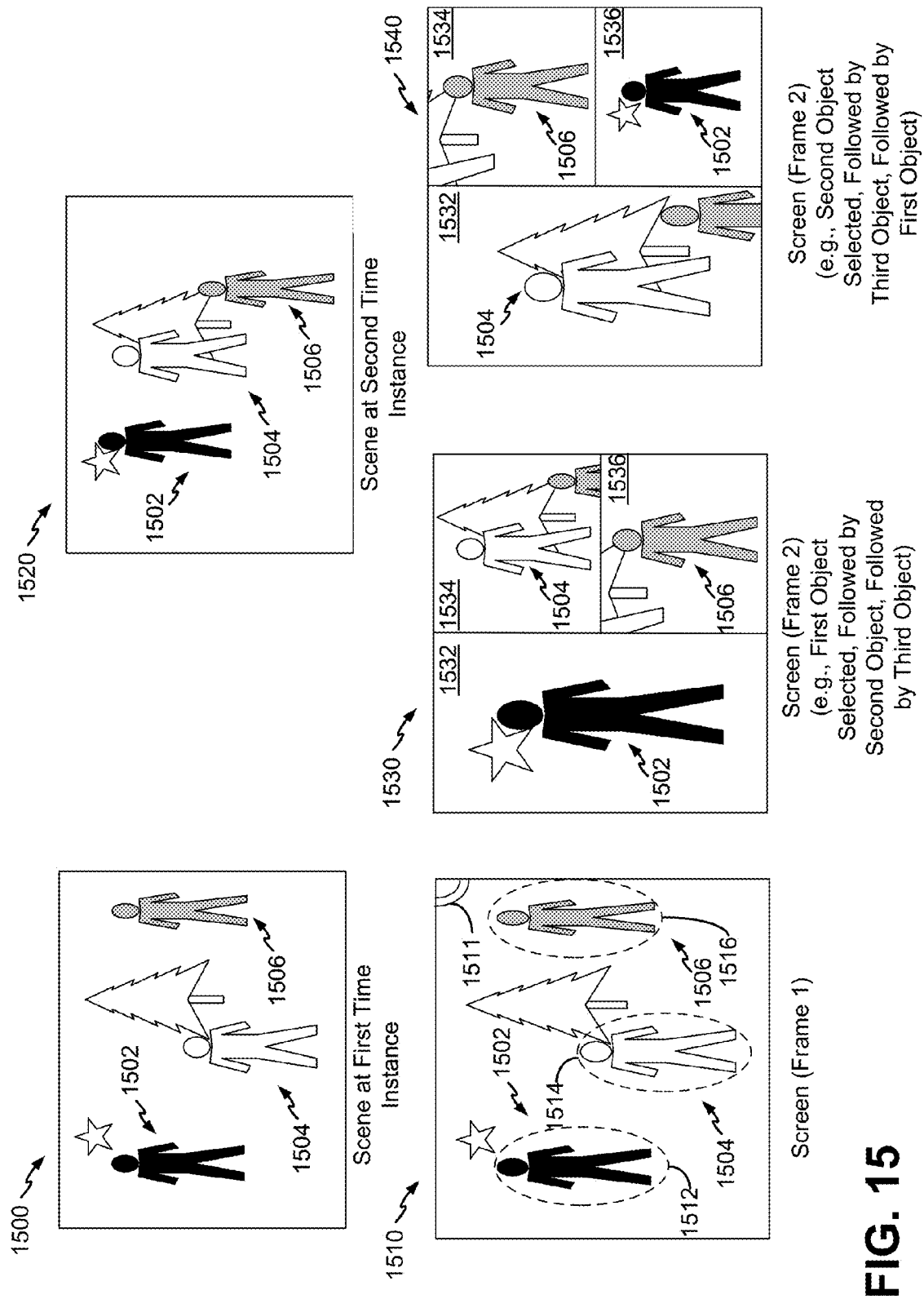
FIG. 15 is another particular embodiment depicting video processing using object tracking.

FIG. 15 shows an example of an application of an implementation of method M100 (e.g., method M110, M200, M300, or M400). The video processing techniques described with respect to the embodiment depicted in FIG. 15 may be performed by the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

FIG. 15 shows a frame 1500 of a primary video stream that depicts a scene as captured at a first time instance. For example, frame 1500 may correspond to a frame of a video stream to be displayed on a screen of a mobile device. The mobile device may be configured to capture the stream (e.g., with a camera of the mobile device) or to receive it from another device. The scene depicted in frame 1500 includes a first object 1502, a second object 1504, a third object 1506, a star, and a tree. In the illustrated embodiment, first object 1502 may correspond to a first person, second object 1504 may correspond to a second person, and third object 1506 may correspond to a third person. In another embodiment, at least one of the objects 1502-1506 may correspond to a robot that is controlled via the mobile device.

FIG. 15 also shows a display 1510 of frame 1500 on a screen of the mobile device. The screen of the mobile device (e.g., a touchscreen) may correspond to a viewfinder. Display 1510 may include a user selection mechanism 1511 that enables a user to select objects for tracking (e.g., by tracking task T250). For example, the user may touch user selection mechanism 1511 on the screen and drag a first focus ring 1512 around first object 1502 to enable tracking of first object 1502. In response to such placement of first focus ring 1512, the mobile device may select first object 1512 for tracking. In a similar manner, the user may also touch user selection mechanism 1511 on the screen and drag a second focus ring 1514 and a third focus ring 1516 around second object 1504 and third object 1506 to enable tracking of second object 1504 and third object 1506, respectively. In response to such placement of second focus ring 1514 and third focus ring 1516, the mobile device may select second object 1504 and third object 1506, respectively, for tracking.

FIG. 15 also shows a frame 1520 of the video stream that depicts the scene as captured at a second time instance (e.g., subsequent to the first time instance). In frame 1520, the position of each object 1502-1506 has changed with respect to the corresponding positions depicted in frame 1500 depicting the scene at the first time instance. For example, in frame 1520 first object 1502 has moved closer to the star, second object 1504 has moved closer to the tree, and third object has moved closer to the bottom of the frame.

FIG. 15 also shows a display 1530 of frame 1520 on the screen of the mobile device if first object 1502 was selected prior to second object 1504 and second object 1504 was selected prior to third object 1506. For example, the display 1530 may be partitioned (e.g., by display task T400) into a first window 1532, a second window 1534, and a third window 1506. The video streams displayed in each window 1532-1536 may depend on a selection order of the objects 1502-1506.

The first window 1532 may display a first portion of frame 1520 that includes first object 1502 if first object 1502 was selected prior to selection of other objects 1504, 1506. The first portion of frame 1520 may be determined based on a location of first object 1502 in frame 1520. For example, the mobile device may track the location of first object 1502 and a video stream focused on the location of first object 1502 may be displayed in first window 1532. The second window 1534 may display a second portion of frame 1520 that includes second object 1504 if second object 1504 was selected prior to selection of third object 1506. The second portion of frame 1520 may be determined based on a location of second object 1504 in frame 1520. For example, the mobile device may track the location of second object 1504 and a video stream focused on the location of second object 1504 may be displayed in second window 1534. The third window 1536 may display a third portion of frame 1520 that includes third object 1506. The third portion of frame 1520 may be determined based on a location of third object 1506 in frame 1520. For example, the mobile device may track the location of third object 1504 and a video stream focused on the location of third object 1506 may be displayed in third window 1506.

FIG. 15 also shows a display 1530 of frame 1520 on the screen of the mobile device if second object 1502 was selected prior to third object 1506 and third object 1506 was selected prior to first object 1502. For example, the display 1530 may be partitioned into the first window 1532, the second window 1534, and the third window 1506. The video streams displayed in each window 1532-1536 may depend on a selection order of the objects 1502-1506.

The first window 1532 may display the second portion of frame 1520 that includes second object 1504 if second object 1504 was selected prior to selection of other objects 1502, 1506. The second window 1534 may display the third portion of frame 1520 that includes third object 1506 if third object 1506 was selected prior to selection of first object 1502. The third window 1536 may display the first portion of frame 1520 that includes first object 1502.

The embodiment depicted in FIG. 15 may enable the mobile device to track objects 1502-1506 in frames 1500, 1520 and to display individualized (e.g., focused) video streams corresponding to the objects 1502-1506 in separate windows 1532-1536. The video stream that is displayed in a particular window 1532-1536 may depend on a selection order of the objects 1502-1506. Thus, a user may determine which object 1502-1506 to place in a particular window 1532-1536 based on importance (or other selection criteria). The mobile device may perform the techniques described with respect to FIG. 15 using a single camera or using multiple cameras.

Figure 16:
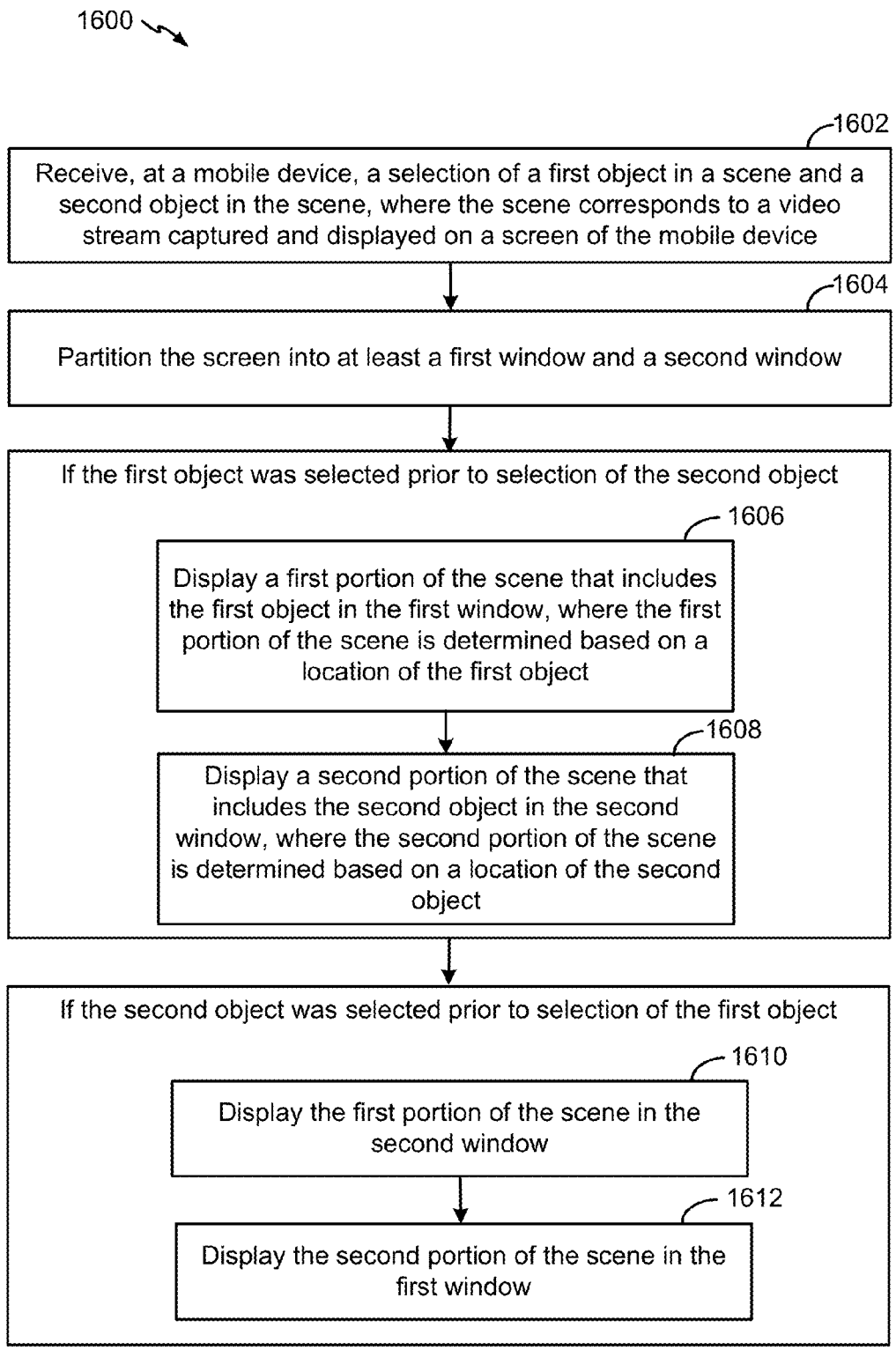
FIG. 16 is another flowchart of a particular illustrative embodiment of a video processing method using object tracking.

Referring to FIG. 16, a flowchart that illustrates a particular embodiment of a video processing method 1600 using object tracking is shown. In an illustrative embodiment, the method 1600 may be performed using the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

The method 1600 includes receiving, at a mobile device, a selection of a first object in a displayed scene and a second object in the displayed scene, at 1602. For example, referring to FIG. 15, the user may touch user selection mechanism 1511 on the screen and drag the first focus ring 1512 around the first object 1502 and the second focus ring 1514 around the second object 1504 to enable tracking of first object 1502 and second object 1504, respectively. The displayed scene may correspond to a video stream captured and displayed on the screen of the mobile device.

The display may be partitioned into a first window and a second window, at 1604. For example, referring to FIG. 15, the display 1530 may be partitioned into the first window 1532, the second window 1534, and the third window 1536. For example, in response to selecting the three objects 1502-1506 with the user selection mechanism 1511, the mobile device may partition the display 1530 into three corresponding windows 1532-1536.

A first portion of the scene that includes the first object may be displayed in the first window if the first object was selected prior to selection of the second object, at 1606. For example, referring to FIG. 15, the first window 1532 may display the first portion of frame 1520 that includes first object 1502 if first object 1502 was selected prior to selection of other objects 1504, 1506. The first portion of frame 1520 may be determined based on the location of first object 1502 in frame 1520. For example, the mobile device may track the location of first object 1502 and a video stream focused on the location of first object 1502 may be displayed in the first window 1532.

A second portion of the scene that includes the second object may be displayed in the second window if the first object was selected prior to selection of the second object, at 1608. For example, referring to FIG. 15, the second window 1534 may display the second portion of frame 1520 that includes second object 1504. The second portion of frame 1520 may be determined based on a location of second object 1504 in frame 1520. For example, the mobile device may track the location of second object 1504 and a video stream focused on the location of second object 1504 may be displayed in the second window 1534.

The first portion of the scene may be displayed in the second window if the second object was selected prior to selection of the first object, at 1610. Additionally, the second portion of the scene may be displayed in the first window if the second object was selected prior to selection of the first object, at 1612.

The method 1600 of FIG. 16 may enable the mobile device to track objects 1502-1506 in the scene 1500, 1520 and may display individualized (e.g., focused) video streams corresponding to the objects 1502-1506 in separate windows 1532-1536. The video stream that is displayed in a particular window 1532-1536 may depend on a selection order of the objects 1502-1506. Thus, a user may determine which object 1502-1506 to place in a particular window 1532-1536 based on importance (or other selection criteria). The mobile device may perform the method 1600 using a single camera or using multiple cameras.

Figure 17:
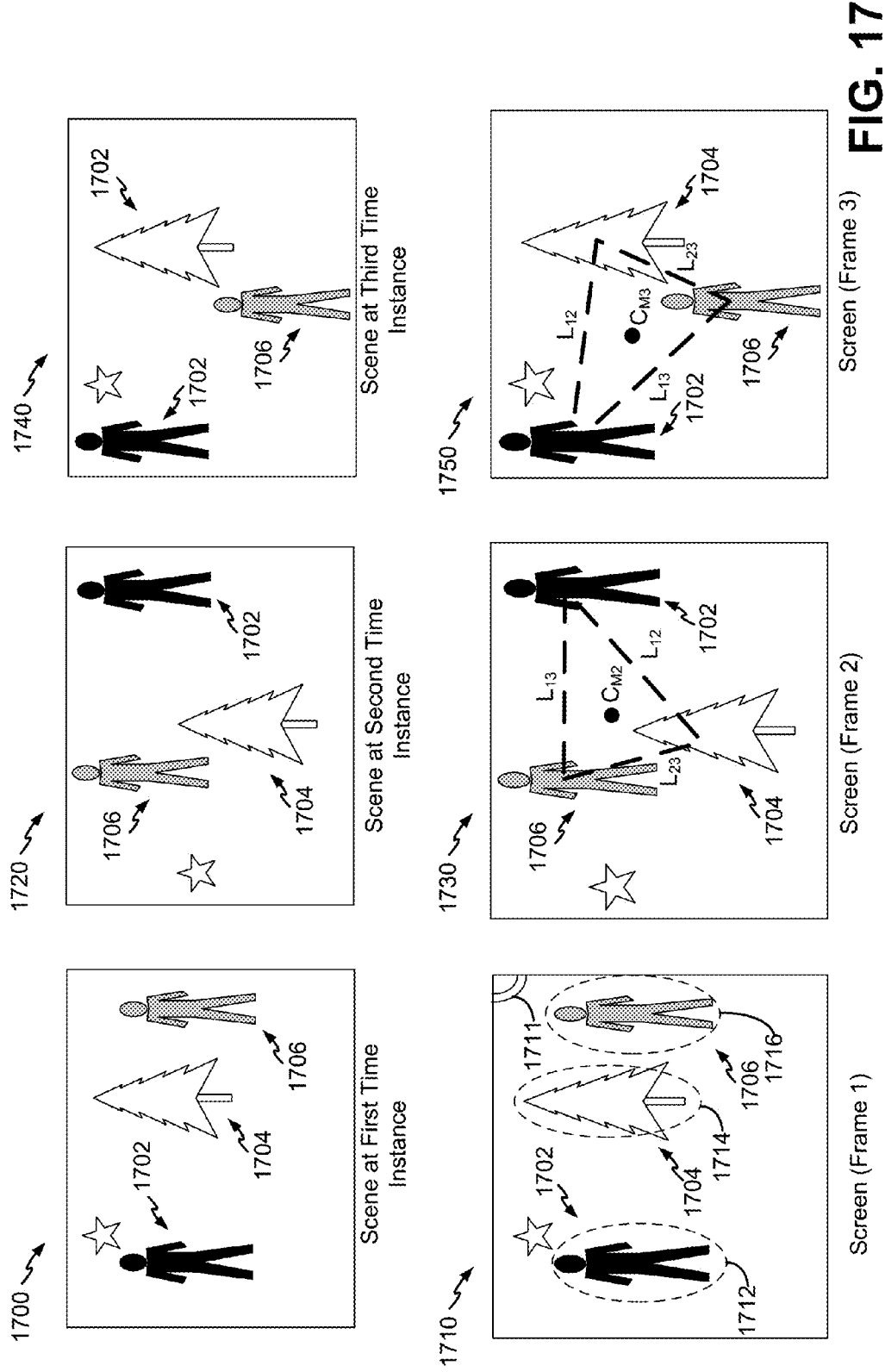
FIG. 17 is another particular embodiment depicting video processing using object tracking.

FIG. 17 shows an example of an application of an implementation of method M100 (e.g., method M110, M200, M300, or M400). The video processing techniques described with respect to the embodiment depicted in FIG. 17 may be performed by the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

FIG. 17 shows a frame 1700 of a primary video stream that depicts a scene as captured at a first time instance. For example, frame 1700 may correspond to a video stream to be displayed on a screen of a mobile device. The mobile device may be configured to capture the stream (e.g., with a camera of the mobile device) or to receive it from another device. The scene depicted in frame 1700 includes a first object 1702, a second object 1704, a third object 1706, and a star. In the illustrated embodiment, first object 1702 may correspond to a first person, second object 1704 may correspond to a tree, and third object 1706 may correspond to a second person. In another embodiment, at least one of first object 1702 and third object 1706 may correspond to a robot that is controlled via the mobile device.

FIG. 17 also shows a display 1710 of frame 1700 on a screen of the mobile device. The screen of the mobile device (e.g., a touchscreen) may correspond to a viewfinder. Display 1710 may include a user selection mechanism 1711 that enables a user to select objects for tracking (e.g., by tracking task T250). For example, the user may touch user selection mechanism 1711 on the screen and drag a first focus ring 1712 around first object 1702 to enable tracking of first object 1702. In response to such placement of first focus ring 1712, the mobile device may select first object 1712 in frame 1700 for tracking. In a similar manner, the user may also touch user selection mechanism 1711 on the screen and drag a second focus ring 1714 and a third focus ring 1716 around second object 1704 and third object 1706 to enable tracking of second object 1704 and third object 1706, respectively. In response to such placement of second focus ring 1714 and the third focus ring 1716, the mobile device may select second object 1704 and third object 1706, respectively, for tracking.

FIG. 17 also shows a frame 1720 of the video stream that depicts the scene as captured at a second time instance (e.g., subsequent to the first time instance). In frame 1720, the position of each object 1702-1706 has changed with respect to the corresponding positions depicted in frame 1700 depicting the scene at the first time instance. For example, in frame 1720 first object 1702 and third object 1704 have moved. Although second object 1704 (e.g., the tree) is a stationary object, second object 1704 may appear to have moved. For example, the position of the mobile device (or other capturing device) may move, which in turn, may create the illusion that second object 1704 has moved.

The mobile device may monitor one or more spatial relations (also called "geometry") among the selected objects. For example, the mobile device may track and measure a first distance between first object 1702 and second object 1704, a second distance between second object 1704 and third object 1706, and a third distance between third object 1706 and first object 1702. In a particular embodiment, tracking the geometry between each selected object 1702-1706 (e.g., by tracking task T250) may initiate upon a trigger event. As a non-limiting example, tracking the geometry between each selected object 1702-1706 may initiate upon first object 1702 crossing second object 1704. In other embodiments, tracking the geometry between each selected object 1702-1706 may initiate upon a user input. As a non-limiting example, tracking the geometry between each selected object 1702-1706 may initiate upon user selection of two or more of the objects 1702-1706. As another example, tracking the geometry between each selected object 1702-1706 may initiate upon the user selecting to initiate a tracking mode.

FIG. 17 also shows a display 1730 of frame 1720 on the screen of the mobile device (e.g., by display task T400). The mobile device may include an indication of the geometry on the display 1730. For example, a first indication ($L_{12}$) of the first distance between first object 1702 and second object 1704 may be included in display 1730. The first distance may be determined based on a location of first object 1702 in frame 1720 and a location of second object 1704 in frame 1720. For example, the mobile device may track the location of the object 1702 and the location of second object 1704 to generate the first indication ($L_{12}$). A second indication ($L_{23}$) of the second distance between second object 1704 and third object 1706 may be also included in display 1730. The second distance may be determined based on a location of second object 1704 in frame 1720 and a location of third object 1706 in frame 1720. For example, the mobile device may track the location of second object 1704 and the location of third object 1706 to generate the second indication ($L_{23}$). A third indication ($L_{13}$) of the third distance between first object 1702 and third object 1706 may also be included in display 1730. The third distance may be determined based on a location of first object 1702 in frame 1720 and a location of third object 1706 in frame 1720. For example, the mobile device may track the location of first object 1702 and the location of second object 1704 to generate the third indication ($L_{13}$).

The mobile device may also track the composite geometry of the objects 1702-1706 (e.g., a geometrical arrangement of the selected objects). For example, in the illustrated embodiment, the geometrical arrangement of the objects 1702-1706 may be characterized as a triangle formed by the three indications ($L_{12}$, $L_{23}$, $L_{13}$). At least one parameter of the geometry between each object, or at least one parameter of the composite geometry may be used to cluster frames of the video stream. As a non-limiting example, particular frames may be clustered based on a distance (e.g., the first distance, the second distance, and/or the third distance) between two particular objects 1702-1706. As another non-limiting example, particular frames may be clustered based on a center of mass ($C_{M2}$) of multiple objects 1702-1706. For example, the mobile device may determine the center of mass ($C_{M2}$) of the triangle formed by the three indications ($L_{12}$, $L_{23}$, $L_{13}$) for each frame. In a particular embodiment, the center of mass ($C_{M2}$) may be calculated, indexed, and displayed on the screen 1730. In another embodiment, the center of mass ($C_{M2}$) may only be calculated and indexed. Frames in which the geometrical arrangement of the selected objects has a substantially similar center of mass may be clustered together and indexed into a memory. During such tracking, it may be desirable to control a display translation operation such that the center of the display coincides with the center of mass. Additionally or alternatively, it may be desirable to control an optical and/or digital zoom operation of the camera such that all of the selected objects remain visible within the display.

In a particular embodiment, the mobile device may track the geometry between each object 1702-1706 and/or the composite geometry for each frame (e.g., track the geometries on a frame-by-frame basis). In other embodiments, the mobile device may track the geometry between each object 1702-1706 and/or the composite geometry at non-consecutive intervals (e.g., track the geometries at non-consecutive frames). Tracking the geometries at non-consecutive frames may reduce an amount of power consumed at the mobile device (e.g., prolong battery life) and reduce an amount of memory used for indexing information associated with the geometries and/or clustering information.

For example, in a particular embodiment, the mobile device may track each object 1702-1706 (e.g., three objects) at every frame. During tracking, each object 1702-1706 may be represented by at least three values associated with the position of the object 1702-1706 and the size of the object 1702-1706. For example, one value may correspond to an x-coordinate of the object 1702-1706, one value may correspond to a y-coordinate of the object 1702-1706, and another value may correspond to a size (e.g., a bounding box) of the object 1702-1706. Each value may correspond to a 32-bit (e.g., 4 byte) number. Thus, at least 288 bits of data (3 objects*3 values/object*32-bits/value) may be collected and logged into memory for each frame during tracking. Assuming that the mobile device captures 30 frames per second, to track and index three objects 1702-1706 on a frame-by-frame basis for an hour (e.g., 3600 seconds), at least 3,888,000 bytes of data is collected and logged into memory.

However, tracking the geometries at non-consecutive frames may relax memory requirements. As a non-limiting example, tracking and indexing each object 1702-1706 at every interval of 15 frames for an hour may yield a 93.33% savings in memory space. Tracking the geometries at non-consecutive frames may be particularly beneficial in scenarios where there is a relatively small amount of movement associated with the objects 1702-1706. The mobile device may determine the frequency at which to track and index the frames based on user input (e.g., user preference) and/or may vary the frequency based on, for example, a user indication and/or a degree of change over time in a position of each of one or more of the selected objects.

Each object 1702-1706 may also have an individual center of mass corresponding to the object's 1702-1706 location on the screen 1730. For example, the first object 1702 may have a center of mass ($C_{O1}$) at the location of the first object 1702, the second object 1704 may have a center of mass ($C_{O1}$) at the location of the second object 1704, etc. The center of mass for each object 1702-1706 may also be a geometric parameter that the mobile device tracks.

FIG. 17 also shows a frame 1740 of the video stream that depicts the scene as captured at a third time instance (e.g., subsequent to the second time instance). In frame 1740, the position of each object 1702-1706 has changed with respect to the corresponding positions depicted in frame 1720 depicting the scene at the second time instance.

FIG. 17 also shows a display 1750 of frame 1740 on the screen of the mobile device (e.g., by display task T400). The mobile device may include an indication of the geometry in display 1750. For example, the first indication ($L_{12}$) of the first distance between first object 1702 and second object 1704 may be included in display 1750, the second indication ($L_{23}$) of the second distance between second object 1704 and third object 1706 may be included in display 1750, and the third indication ($L_{13}$) of the third distance between first object 1702 and third object 1706 may be included in display 1750. Additionally, the mobile device may also track the composite geometry of the objects 1702-1706. For example, in the illustrated embodiment, the composite geometry of the objects 1702-1706 may correspond to the triangle formed by the three indications ($L_{12}$, $L_{23}$, $L_{13}$).

In another embodiment, the mobile device may track the movement of each object 1702-1706 and generate a sequence of plots that display the movement of each object 1702-1706 over time. The mobile device may generate a plot for each object 1702-1706 at every frame, or may generate a plot for each object 1702-1706 at non-consecutive frames to relax memory requirements and improve power savings, as described above.

It is also possible to configure the device (e.g., to implement tracking task T250) to track a spatial relation of one or more selected objects to objects that are not currently visible on the display (e.g., are not currently within the scene captured by the video stream). For example, spatial relations of moving objects to fixed (reference) objects that are currently off-screen may be tracked. In a particular example, the device may be configured to indicate whenever a selected player is within twenty feet of the goal or basket, and/or is moving toward the goal/basket, even if the goal/basket is not currently on-screen. In such case, the device may be configured to create a map that is larger than the scene currently displayed. For a case in which the location of the camera is known (e.g., as indicated by a location sensor, such as a GPS sensor), one or more orientation sensors of the camera may be used to determine how the current view relates to the larger scene map. Such one or more orientation sensors may include one or more inertial sensors (e.g., gyroscopes and/or accelerometers), and/or one or more magnetic field sensors (e.g., magnetometers), to indicate an orientation of the camera relative to a gravitational axis (e.g., an axis through the device and the center of the earth). Additionally or alternatively, visible features of fixed reference objects, such as markings on a sports field or court, or scene fixtures of a performance stage, may be used as fiducials. Such mapping may also be done for a camera that is moving, although the appearance of a reference object may change as the angle from which it is viewed changes.

The embodiment depicted in FIG. 17 may enable the mobile device to track geometries of the objects 1702-1706 in the scene 1700, 1720, 1740 and cluster frames for retrieval that have substantially similar geometries, as explained below with respect to FIG. 18. The mobile device may perform the techniques described with respect to FIG. 17 using a single camera or using multiple cameras.

Uses and applications for display partitioning and/or object tracking as described herein may include any of the following: sporting events (e.g., soccer, basketball, football, hockey), social events (e.g., wedding, party, dancing), art performances (e.g., play, school play, concert, duet), and security or surveillance monitoring. The mobile device may also be a head-mounted display, with user selection being performed by use of, e.g., a joystick, a gesture-recognition camera system, or a glove equipped with touch and/or orientation sensors (e.g., one or more orientation sensors as described above) to detect user commands. The video stream may be live (e.g., captured by the device or streamed from another capturing device, e.g., via a short-range connection, such as Bluetooth, or via a network, such as a Wi-Fi connection to the internet) or recorded (again, by the device or by another device).

It may be desirable to classify frames of a video stream according to relative locations of and/or spatial relations among selected objects within the stream. Referring to FIG. 18, a particular embodiment of a display 1800 on a screen of a mobile device that is used to retrieve frames based on clustering is shown. The display 1800 may include a graph having a horizontal axis and a vertical axis. The horizontal axis may correspond to different video files captured by the mobile device. For example, in the illustrative embodiment, the mobile device captured a first video file and a second video file. The vertical axis may correspond to time indexes of the video files.

Each video file may include clusters of frames that are based on at least one parameter associated with the geometry of selected objects in the video file. For example, each cluster in the video files may include a group of frames having a substantially similar geometry between selected objects. The clusters depicted in FIG. 18 may be based on a center of mass between the objects; however, in other embodiments, the clusters may be based on one or more different parameters (e.g., shape, distance, spatial characteristics, color schemes, etc). The parameters may be selected by a user.

Frames at the beginning of the first video until approximately the 10:00 mark of the first video may be grouped into a first cluster (e.g., Cluster 1). The first cluster may correspond to frames whereby the center of mass between the selected objects in the pixel coordinate space has an x-coordinate at approximately 150 and a y-coordinate at approximately 250. Referring to the second frame in FIG. 17, the center of mass ($C_{M2}$) of the selected objects 1702-1706 (e.g., the center of mass ($C_{M2}$) of the triangle) may have an x-coordinate at approximately 150 on display 1730 and a y-coordinate at approximately 250 on display 1730. Thus, the second frame (and other frames having a substantially similar center of mass between the objects 1702-1706) may be placed in the first cluster of FIG. 18. Thus, if the user selects the first cluster, the mobile device may display corresponding video streams (e.g., portions of the video) where the selected objects 1702-1706 have a substantially similar configuration as the second frame in FIG. 17.

Frames from approximately the 10:00 mark of the first video until approximately the 20:00 mark of the first video may be grouped into a second cluster (e.g., Cluster 2). The second cluster may correspond to frames whereby the center of mass between the selected objects in the pixel coordinate space has an x-coordinate at approximately 200 and a y-coordinate at approximately 250. Referring to the third frame in FIG. 3, the center of mass ($C_{M3}$) of the selected objects 1702-1706 may have an x-coordinate at approximately 200 on display 1750 and a y-coordinate at approximately 250 on display 1750. Thus, the third frame (and other frames having a substantially similar center of mass between the objects 1702-1706) may be placed in the second cluster of FIG. 18. Thus, if the user selects the second cluster, the mobile device may display corresponding video streams (e.g., portions of the video) where the selected objects 1702-1706 have a substantially similar configuration as the third frame in FIG. 18.

Additional clusters (e.g., a third cluster) may correspond to frames having different centers of mass (e.g., an x-coordinate at 175 and a y-coordinate at 325). The user may retrieve (e.g., locate) particular portions of the video by selecting clusters having a configuration (e.g., a center of mass) associated with the particular portions of the video. Thus, by indexing frames into clusters that are based on geometric parameters of the selected objects 1702-1706 (e.g., distance, center of mass of each and/or all selected objects), the user of the mobile device may readily locate desired portions of a video without having to navigate (e.g., play, fast-forward, rewind, etc.) through the video. Indexing the frames into clusters may also permit the user to view which configuration (e.g., geometry) occurred most frequently, least frequently, etc. Such indexing and/or values of such geometric parameters may be included in metadata stored by task T300 and/or T350 as described above.

Figure 18:
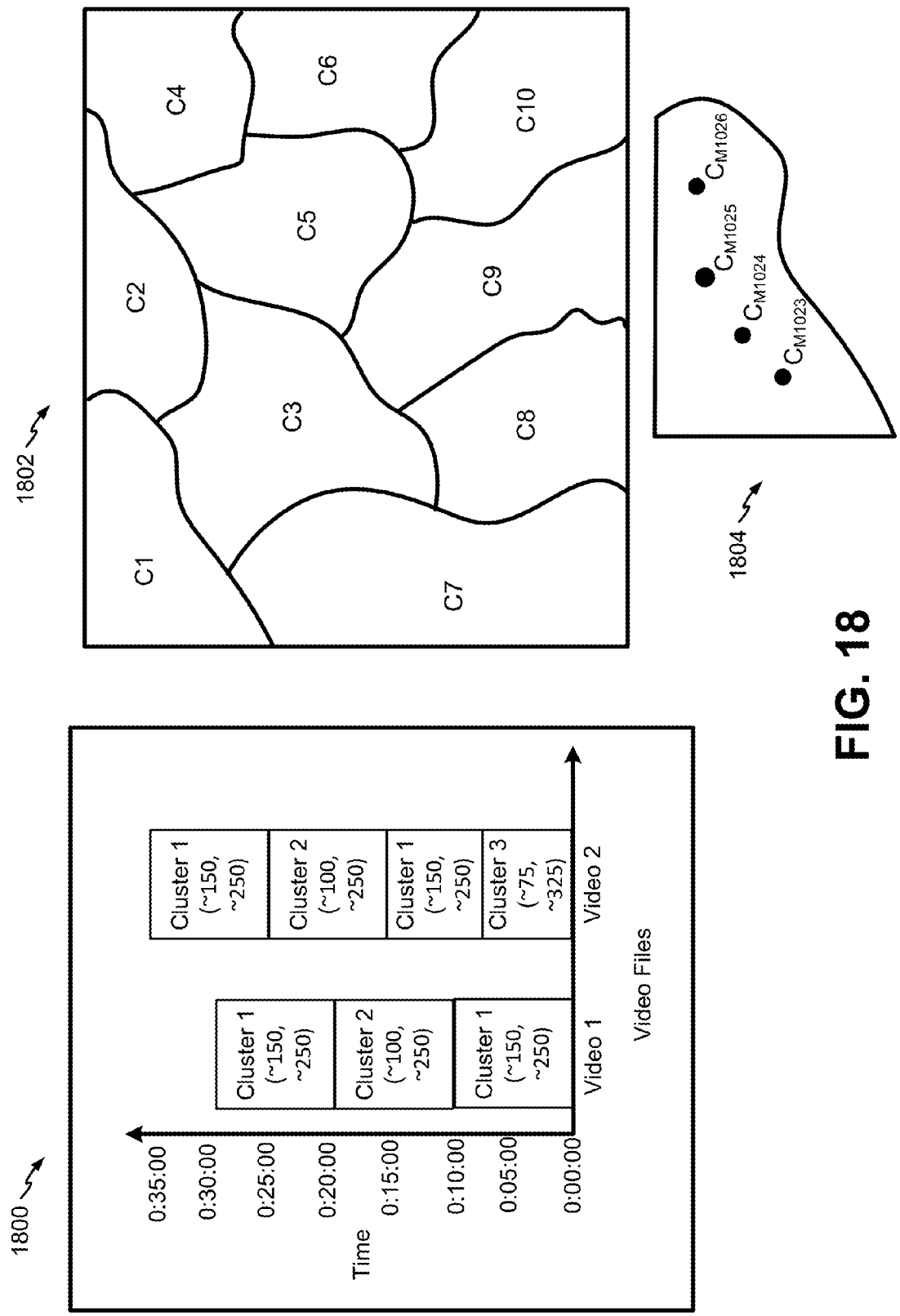
FIG. 18 is depicts particular embodiments of a screen of a mobile device that is used to retrieve frames based on clustering.

FIG. 18 also includes a display 1802 of regions associated with clusters of frames of a video stream. For example the display 1802 of regions may correspond to the video stream of the scene in FIG. 17. The display 1802 includes ten regions (C1-C10). In the illustrated embodiment, the regions (C1-C10) are based on a center of mass of the objects 1702-1706 at particular frames. In other embodiments, the regions (C1-C10) may be based on other geometric parameters that may be used to index the frames into clusters (e.g., the center of mass for each of the objects 1702-1706, shapes, distances, spatial characteristics, color schemes, etc). In a particular embodiment, each region (C1-C10) may have an equal size (e.g., each region (C1-C10) may be a "Voronoi Cell").

Each region (C1-C10) may include an x-coordinate and a y-coordinate that corresponds to a center of mass associated with a corresponding cluster. As a non-limiting example, the center of mass corresponding to the first region (C1) may have an x-coordinate of 75 and a y-coordinate of 580. Additionally, the center of mass corresponding to the second region (C2) may have an x-coordinate of 215 and a y-coordinate of 580. Frames in the video stream of the scene in FIG. 17 may be indexed by the center of mass of the objects 1702-1706. Each frame may be placed in a cluster corresponding to one of the regions (C1-C10) based on the center of mass. For example, a frame having a center of mass that is closest to the center of mass of the first region (C1) may be placed within a corresponding first cluster. Such clustering information may be associated with the corresponding frames as metadata (e.g., in a metadata stream synchronized to the video stream as described herein). In such case, the frames indexed within a particular cluster may be easily identified for retrieval by searching the metadata, thus avoiding a need to review the entire video stream.

The mobile device may display video frames having a particular geometry (e.g., center of mass) in response to a user selection of a particular cluster. For example, if the user selects (e.g., touches) the first region (C1), the mobile device may display a cluster of video frames in which the center of mass of the objects 1702-1706 is within the first (C1) region. In a particular embodiment, the user may touch the screen at the first region (C1) and hold the first region (C1) for a period of time that exceeds a threshold (e.g., three seconds). After holding the first region for three seconds, the first region (C1) may be enlarged on the display 1802. For example, display 1802 may depict the first region (C1) as shown in 1804. In this mode, the first region 1804 may illustrate particular frames (e.g., frame 1023 to frame 1026) based on the center of mass ($C_{M1023-1026}$) of the particular frames. In a particular embodiment, the user may select a particular frame (e.g., frame 1024) and the mobile device may initiate playback of the video stream at frame 1024.

Figure 19:
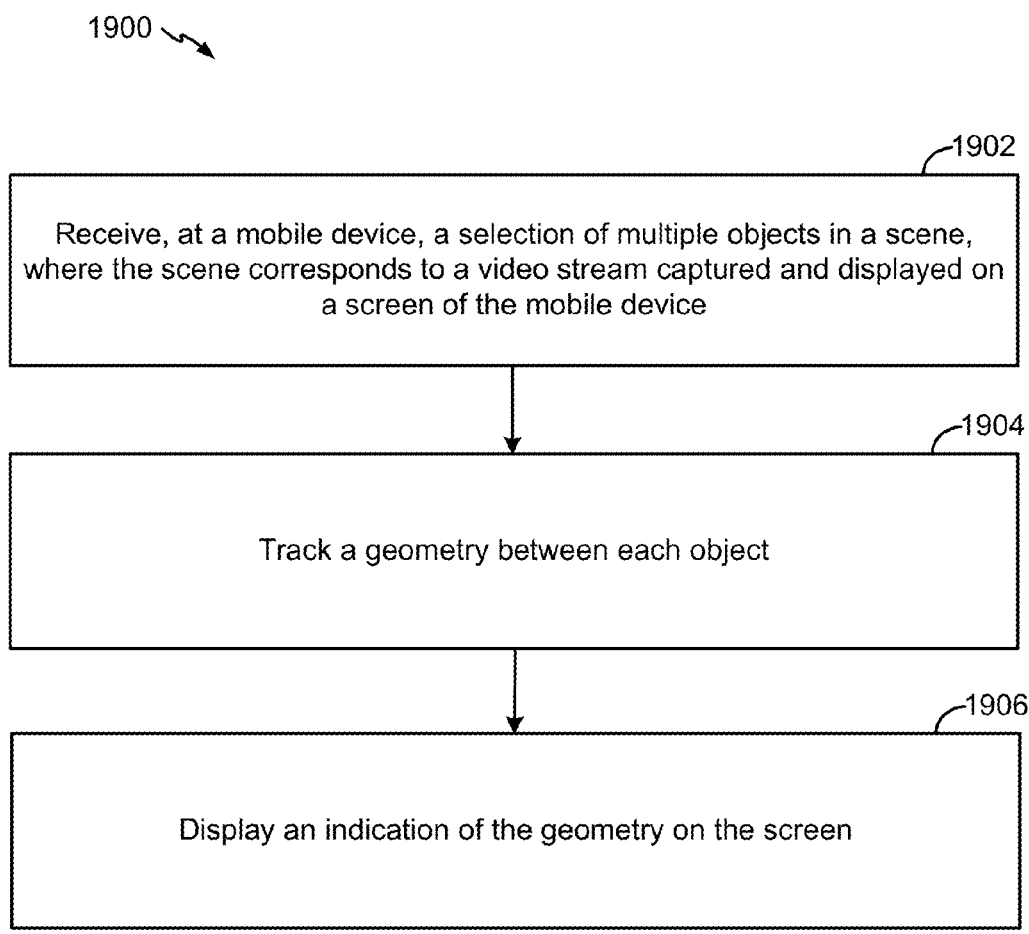
FIG. 19 is another flowchart of a particular illustrative embodiment of a video processing method using object tracking.

Referring to FIG. 19, a flowchart that illustrates a particular embodiment of a video processing method 1900 using object tracking is shown. In an illustrative embodiment, the method 1900 may be performed using the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

The method 1900 includes receiving, at a mobile device, a selection of multiple objects in a scene, at 1902. For example, referring to FIG. 17, the user may touch the user selection mechanism 1711 on the screen and drag the first focus ring 1712 around first object 1702, the second focus ring 1714 around second object 1704, and the third focus ring 1716 around third object 1706 to enable tracking of the first, second, and third objects 1702-1706, respectively. The displayed scene may correspond to a video stream captured and displayed on the screen of the mobile device. The mobile device may be configured to capture the stream (e.g., with a camera of the mobile device) or to receive it from another device.

A geometry between each object may be tracked, at 1904. For example, referring to FIG. 17, the mobile device may track the geometry between each selected object 1702-1706. For example, the mobile device may track and measure the first distance between first object 1702 and second object 1704, the second distance between second object 1704 and third object 1706, and the third distance between third object 1706 and first object 1702.

An indication of the geometry may be displayed on the screen, at 1906. For example, referring to FIG. 17, the first indication ($L_{12}$) of the first distance between first object 1702 and second object 1704 may be included in display 1730. The first distance may be determined based on a location of first object 1702 in frame 1720 and a location of second object 1704 in frame 1720. For example, the mobile device may track the location of first object 1702 and the location of second object 1704 to generate the first indication ($L_{12}$). The second indication ($L_{23}$) of the second distance between second object 1704 and third object 1706 may be also included in display 1730. The second distance may be determined based on a location of second object 1704 in frame 1720 and a location of third object 1706 in frame 1720. For example, the mobile device may track the location of second object 1704 and the location of third object 1706 to generate the second indication ($L_{23}$). The third indication ($L_{13}$) of the third distance between first object 1702 and third object 1706 may also be included in display 1730. The third distance may be determined based on a location of first object 1702 in frame 1720 and a location of third object 1706 in frame 1720. For example, the mobile device may track the location of first object 1702 and the location of second object 1704 to generate the third indication ($L_{13}$).

The method 1900 of FIG. 19 may enable the mobile device to track geometries of the objects 1702-1706 in frames 1700, 1720, 1740 and cluster frames for retrieval that have substantially similar geometries. The mobile device may perform the method 1900 using a single camera or using multiple cameras. In a further example, the method may include indicating an alarm condition when a specified spatial relation among one or more objects is detected, such as when a distance between a first selected object and a second selected object becomes less than (alternatively, greater than) a specified threshold distance.

Figure 20:
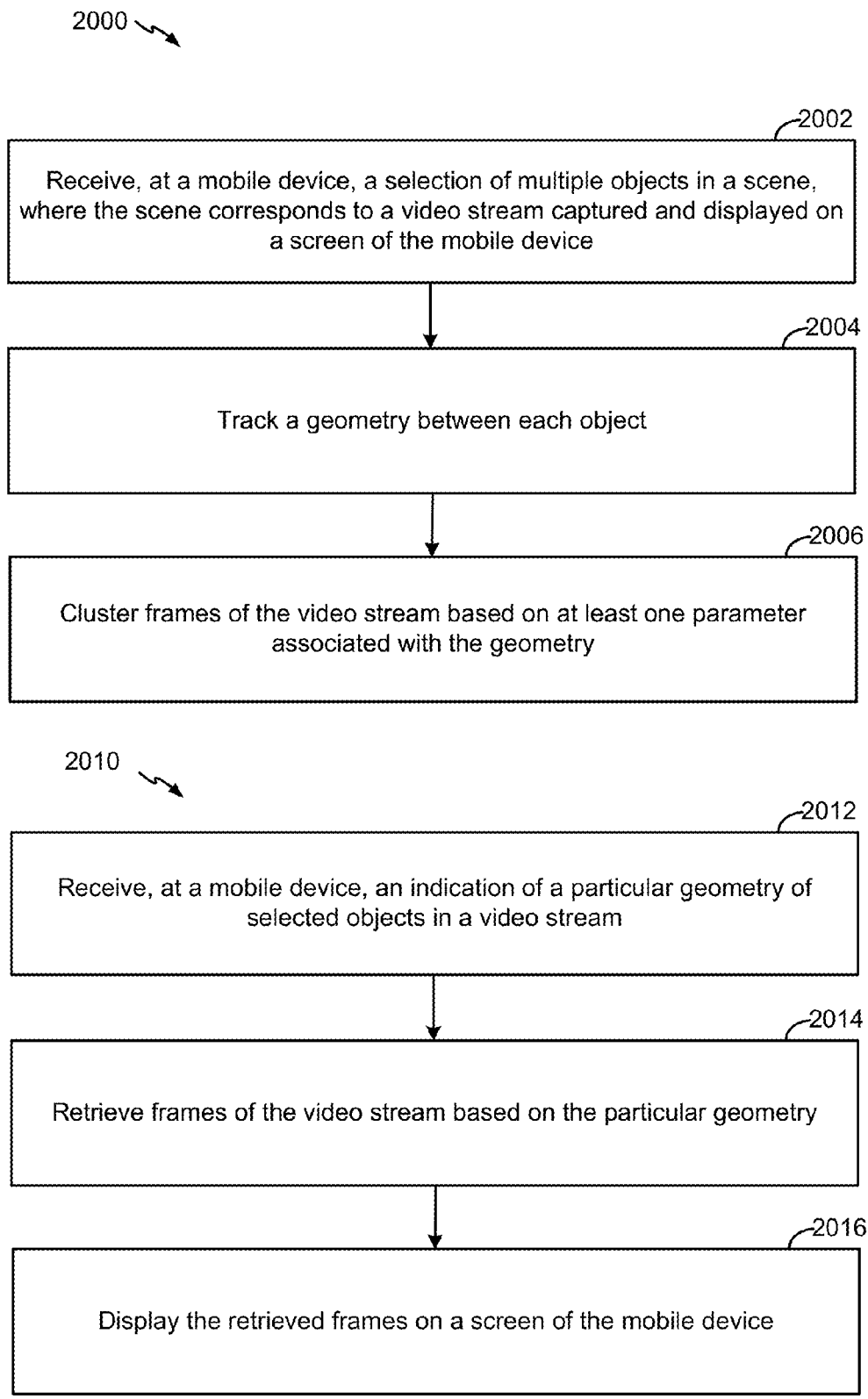
FIG. 20 depicts flowcharts of particular illustrative embodiments of a video processing methods using object tracking.

Referring to FIG. 20, a flowchart that illustrates particular embodiments of video processing methods 2000, 2010 using object tracking is shown. In an illustrative embodiment, the methods 2000, 2010 may be performed using the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

The method 2000 includes receiving, at a mobile device, a selection of multiple objects in a scene, at 2002. For example, referring to FIG. 17, the user may touch user selection mechanism 1711 on the screen and drag the first focus ring 1712 around first object 1702, the second focus ring 1714 around second object 1704, and the third focus ring 1716 around third object 1706 to enable tracking of the first, second, and third objects 1702-1706, respectively. The displayed scene 1700 may correspond to a video stream captured and displayed on the screen of the mobile device. The mobile device may be configured to capture the stream (e.g., with a camera of the mobile device) or to receive it from another device.

A geometry between each object may be tracked, at 2004. For example, referring to FIG. 17, the mobile device may track the geometry between each selected object 1702-1706. For example, the mobile device may track and measure the first distance between first object 1702 and second object 1704, the second distance between second object 1704 and third object 1706, and the third distance between third object 1706 and first object 1702. Additionally, the mobile device may also track the composite geometry of the objects 1702-1706. For example, in the illustrated embodiment, the composite geometry of the objects 1702-1706 may correspond to a triangle formed by the three indications ($L_{12}$, $L_{23}$, $L_{13}$).

Frames of the video stream may be clustered based on at least one parameter associated with the geometry, at 2006. For example, referring to FIG. 18, each cluster in the video files may include a group of frames having a substantially similar geometry between selected objects 1706-1708. The clusters depicted in FIG. 18 may be based on a center of mass ($C_{M2}$, $C_{M3}$) between the objects 1706-1708 (e.g., a center of mass of the triangle).

In a particular embodiment, the method 2000 may include retrieving frames when the objects are in a particular geometry. For example, referring to FIG. 18, the mobile device may index frames based on a center of mass ($C_{M2}$, $C_{M3}$) of the objects 1702-1706 in the frames. Frames having a particular center of mass (e.g., a particular geometry) may be readily achieved by selecting a cluster associated with the particular center of mass. For example, the mobile device may retrieve frames where the objects 1702-1706 have a substantially similar geometry as the objects 1702-1706 in the second frame of FIG. 17 by selecting the first cluster (e.g., Cluster 1) as shown in display 1800 of FIG. 18. For example, in response to the user selecting the first cluster, the mobile device may retrieve frames whereby the center of mass of the objects 1702-1706 has an x-coordinate at approximately 150 and a y-coordinate at approximately 250.

The method 2010 may include receiving, at a mobile device, an indication of a particular geometry of selected objects in a video stream, at 2012. As a non-limiting example, referring to FIG. 18, the mobile device may receive an indication (e.g., a user touching the screen at the first region (C1) shown in display 1802) to display video streams where the center of mass of the objects 1702-1704 are closest to the center of the mass of the first region (C1).

Frames of the video stream may be retrieved based on the particular geometry, at 2014. For example, referring to FIG. 18, the mobile device may retrieve frames of the video stream in the scene in FIG. 17 where the center of mass of the objects 1702-1704 are in an area corresponding to the first region (C1).

The retrieved frames may be displayed on a screen of the mobile device, at 2016. For example, referring to FIG. 18, the mobile device may display (e.g., play) the frames of the video stream where the center of mass of the objects 1702-1704 are in the area corresponding to the first region (C1). In a particular embodiment, the mobile device may play the video streams in a sequential order.

The methods 2000, 2010 of FIG. 20 may enable the user may retrieve (e.g., locate) particular portions of the video by selecting clusters having a configuration (e.g., a center of mass) associated with the particular portions of the video. Thus, by indexing frames into clusters that are based on geometric parameters of the selected objects 1702-1706, the user of the mobile device may readily locate desired portions of a video without having to navigate (e.g., play, fast-forward, rewind, etc.) through the video.

Figure 21:
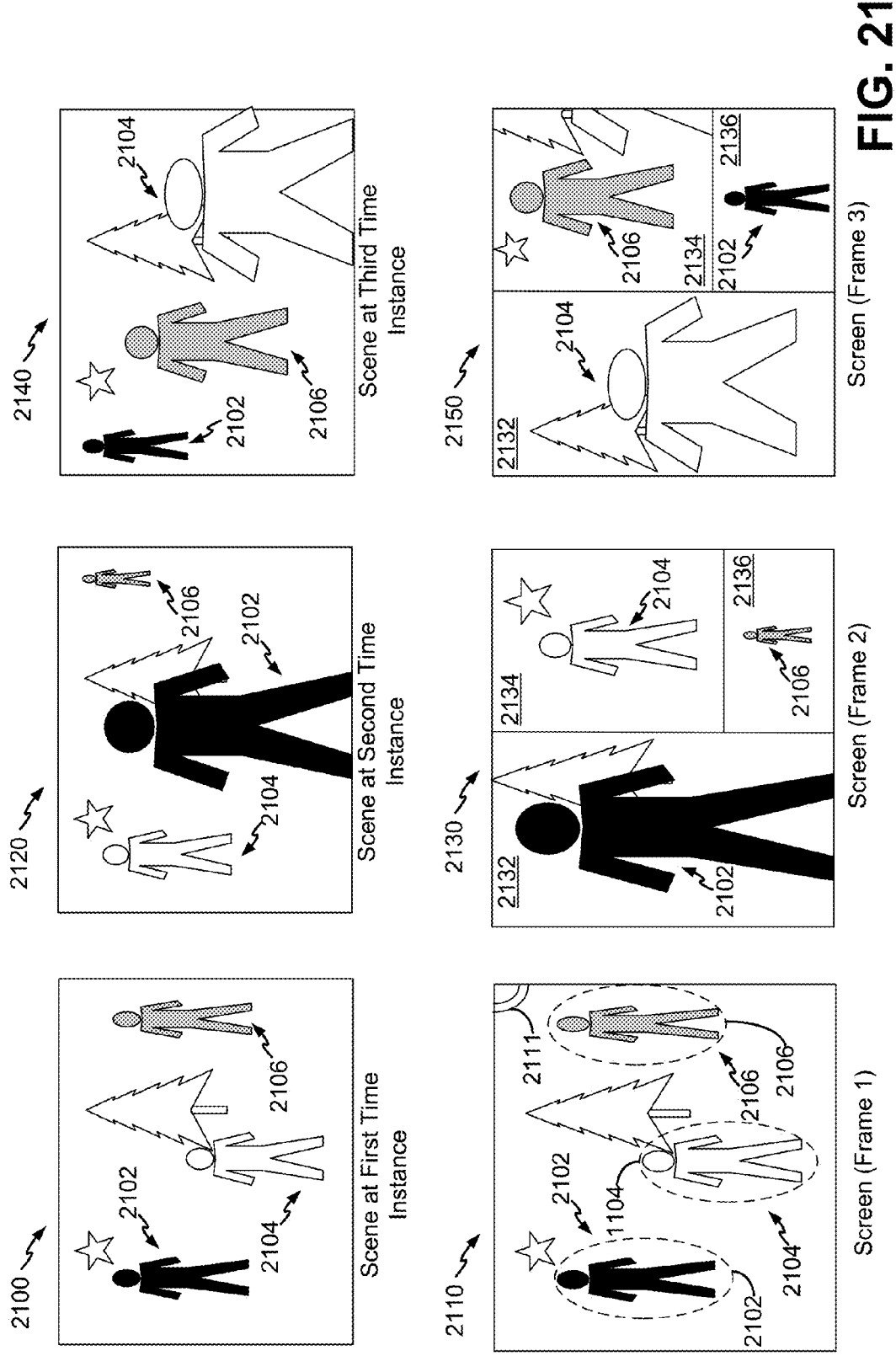
FIG. 21 is another particular embodiment depicting video processing using object tracking.

FIG. 21 shows an example of an application of an implementation of method M100 (e.g., method M110, M200, M300, or M400). The video processing techniques described with respect to the embodiment depicted in FIG. 21 may be performed by the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

FIG. 21 shows a frame 2100 of a primary video stream that depicts a scene as captured at a first time instance. For example, frame 2100 may correspond to a frame of a video stream to be displayed on a screen of a mobile device. The mobile device may be configured to capture the stream (e.g., with a camera of the mobile device) or to receive it from another device. The scene depicted in frame 1100 includes a first object 2102, a second object 2104, a third object 2106, a star, and a tree. In the illustrated embodiment, first object 2102 may correspond to a first person, second object 2104 may correspond to a second person, and third object 2106 may correspond to a third person. In another embodiment, at least one of the objects 2102-2106 may correspond to a robot that is controlled via the mobile device.

FIG. 21 also shows a display 2110 of frame 2100 on a screen of the mobile device. The screen of the mobile device (e.g., a touchscreen) may correspond to a viewfinder. Display 2110 may include a user selection mechanism 2111 that enables a user to select objects for tracking (e.g., by tracking task T250). For example, the user may touch user selection mechanism 2111 on the screen and drag a first focus ring 2112 around first object 2102 to enable tracking of first object 2102. In response to such placement of first focus ring 2112, the mobile device may select first object 2112 for tracking. In a similar manner, the user may also touch user selection mechanism 2111 on the screen and drag a second focus ring 2114 and a third focus ring 2116 around second object 2104 and third object 2106 to enable tracking of second object 2104 and third object 2106, respectively. In response to such placement of second focus ring 2114 and third focus ring 2116, the mobile device may select second object 2104 and third object 2106, respectively, for tracking.

FIG. 21 also shows a frame 2120 of the video stream that depicts the scene as captured at a second time instance (e.g., subsequent to the first time instance). In frame 2120, the sizes of particular objects 2102, 2106 have changed with respect to the corresponding sizes in frame 2100 depicting the scene at the first time instance. For example, the first object 2102 has moved closer to a camera lens (e.g., a size of the first object 2102 appears to be relatively large), and the third object 2104 has moved farther away from the camera lens (e.g., the size of the third object 2106 appears to be relatively small). The size of the second object 2104 appears to be larger than the size of the third object 2106 and smaller than the size of the first object 2102.

FIG. 21 also shows a display 2130 of frame 2120 on a screen of the mobile device. Display 2130 may be partitioned (e.g., by display task T400) into a first window 2132, a second window 2134, and a third window 2136. For example, in response to selecting the three objects 2102-2106 with the user selection mechanism 2111, the mobile device may partition display 2130 into three windows 2132-2136. The first window 2132 may be larger than the second window 2134, and the second window 2134 may be larger than the third window 2136. The portions of frame 2120 displayed in each window 2132-2136 may be based on a size of objects 2102-2106 with respect to the size of the display 2130.

The first window 2132 (e.g., the largest window) may display a first portion of frame 2120 that includes first object 2102 if the size of first object 2102 with respect to the size of display 2130 is greater than the size of the other selected objects 2104, 2106 with respect to the size of display 2130. The first portion of frame 2120 may be determined based on a location of first object 2102 in frame 2120. For example, the mobile device may track the location of first object 2102 and a video stream focused on the location of first object 2102 may be displayed in the first window 2132.

The second window 2134 may display a second portion of frame 2120 that includes second object 2104 if the size of second object 2104 with respect to the size of display 2130 is greater than the size of third object 2106 with respect to the size of display 2130. The second portion of frame 2120 may be determined based on a location of second object 2104 in frame 2120. For example, the mobile device may track the location of second object 2104 and a video stream focused on the location of second object 2104 may be displayed in the second window 2134.

The third window 2136 (e.g., the smallest window) may display a third portion of frame 2120 that includes third object 2106 (e.g., the smallest object with respect to the size of display 2130). The third portion of frame 2120 may be determined based on a location of third object 2106 in frame 2120. For example, the mobile device may track the location of third object 2104 and a video stream focused on the location of third object 2106 may be displayed in the third window 2136.

FIG. 21 also shows a frame 2140 of the video stream that depicts the scene as captured at a third time instance (e.g., subsequent to the second time instance). In frame 2140, the sizes of the objects 2102-2106 have changed with respect to the corresponding sizes depicted in frame 2120 depicting the scene at the second time instance. For example, the first object 2102 has moved farther away from the camera lens (e.g., the size of the first object 2102 appears to be relatively small), the second object has moved closer to the camera lens (e.g., the size of the first object 2102 appears to be relatively large), and the third object 2104 has also moved closer to the camera lens (e.g., the size of the third object 2106 appears to be larger than the size of the first object 2102 and smaller than the size of the second object 2104).

FIG. 21 also shows a display 2150 of frame 2140 on a screen of the mobile device, including the windows 2132-2136 generated by the mobile device. For example, the first window 2132 (e.g., the largest window) displays the second portion of frame 2140 that includes the second object 2104, the second window 2134 displays the third portion of frame 2140 that includes the third object 2106, and the third window 2136 (e.g., the smallest window) displays the first portion of frame 2140 that includes the first object 2102.

The embodiment depicted in FIG. 21 may enable the mobile device to track objects 2102-2106 in frames 2100, 2120, 2140 and may display individualized (e.g., focused) video streams corresponding to the objects 2102-2106 in separate windows 2132-2136 based on the relative size of the objects 2102-2106. For example, the video stream focused on the object 2102-2106 that appears to be larger than the other objects 2102-2106 (e.g., appears to occupy the largest portion of the screen) may be displayed in the largest window (e.g., the first window 2132). In a similar implementation, display task T400 may be implemented to assign the secondary video streams to corresponding windows of the display in response to the relative sizes, within the primary video stream, of the selected objects corresponding to each secondary video stream (e.g., the relative sizes of the bounding boxes of the objects), as indicated by tracking task T250. The mobile device may perform the techniques described with respect to FIG. 21 using a single camera or using multiple cameras.

Figure 22:
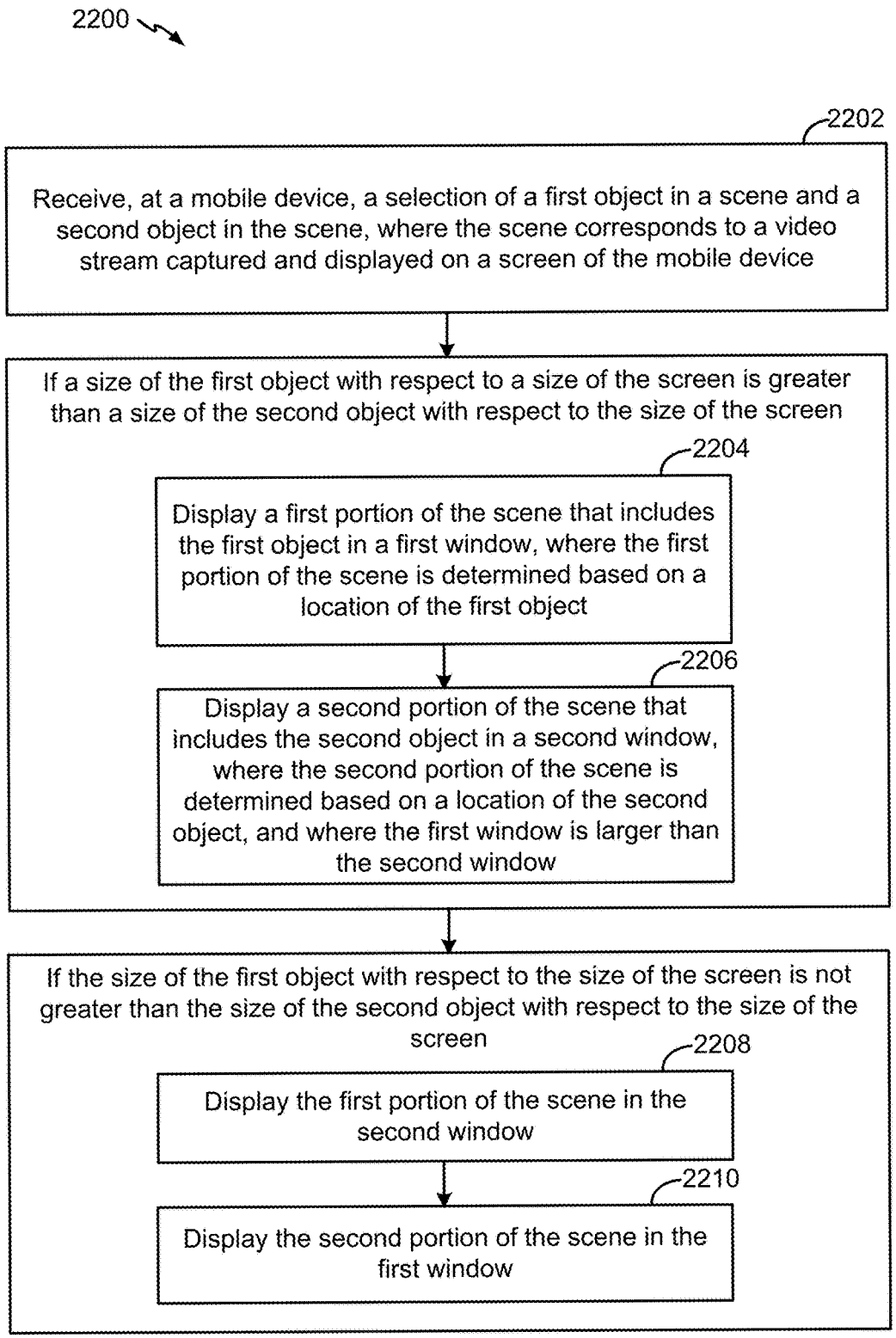
FIG. 22 is another flowchart of a particular illustrative embodiment of a video processing method using object tracking.

Referring to FIG. 22, a flowchart that illustrates a particular embodiment of a video processing method 2200 using object tracking is shown. In an illustrative embodiment, the method 2200 may be performed using the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

The method 2200 includes receiving, at a mobile device, a selection of a first object in a scene and a second object in the scene, at 2202. For example, referring to FIG. 21, the user may touch user selection mechanism 2111 on the screen and drag the first focus ring 2112 around first object 2102 and the second focus ring 2114 around second object 2104 to enable tracking of the first object 2102 and the second object 2104, respectively. The displayed scene may correspond to a video stream captured and displayed on the screen of the mobile device.

A first portion of the displayed scene that includes the first object may be displayed in a first window if a size of the first object with respect to a size of the display is greater than a size of the second object with respect to the size of the display, at 2204. For example, referring to FIG. 21, the first window 2132 (e.g., the largest window) may display the first portion of frame 2120 that includes first object 2102 if the size of first object 2102 with respect to the size of display 2130 is greater than the size of the other selected objects 2104, 2106 with respect to the size of display 2130. The first portion of frame 2120 may be determined based on a location of first object 2102 in frame 2120. For example, the mobile device may track the location of first object 2102 and a video stream focused on the location of first object 2102 may be displayed in the first window 2132.

A second portion of the displayed scene that includes the second object may be displayed in a second window in response to the determination that the size of the first object with respect to the size of the display is greater than the size of the second object with respect to the size of the display, at 2206. For example, referring to FIG. 22, the second window 2134 may display the second portion of frame 2120 that includes second object 2104 if the size of second object 2104 with respect to the size of display 2130 is greater than the size of third object 2106 with respect to the size of display 2130. The second portion of frame 2120 may be determined based on a location of second object 2104 in frame 2120. For example, the mobile device may track the location of second object 2104 and a video stream focused on the location of second object 2104 may be displayed in the second window 2134. The first window 2132 may be larger than the second window 2134.

The first portion of the displayed scene may be displayed in the second window if the size of the first object with respect to the size of the display is not greater than the size of the second object with respect to the size of the display, at 2208. The second portion of the frame may be displayed in the first window if the size of the first object with respect to the size of the display is not greater than the size of the second object with respect to the size of the display, at 2210.

The method 2200 of FIG. 22 may enable the mobile device to track objects 2102-2106 in frames 2100, 2120, 2140 and may display individualized (e.g., focused) video streams corresponding to the objects 2102-2106 in separate windows 2132-2136 based on the relative size of the objects 2102-2106. For example, the video stream focused on the object 2102-2106 that appears to be larger than the other objects 2102-2106 (e.g., appears to occupy the largest portion of the screen) may be displayed in the largest window (e.g., the first window 2132). The mobile device may perform the method 2200 using a single camera or using multiple cameras.

Figure 23:
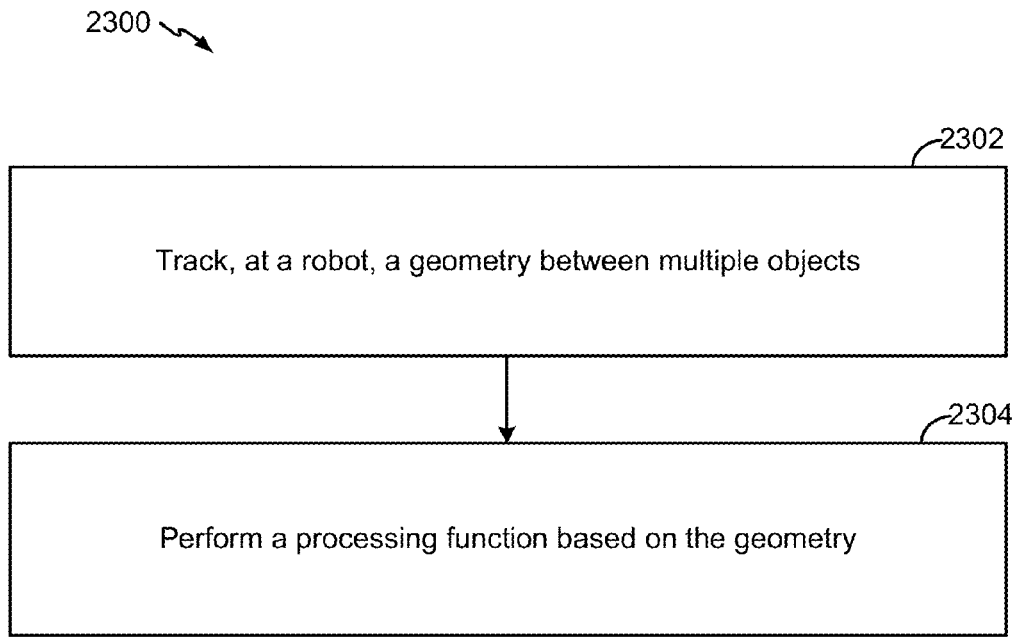
FIG. 23 is another flowchart of a particular illustrative embodiment of a video processing method using object tracking.

Referring to FIG. 23, a flowchart that illustrates a particular embodiment of a video processing method 2300 using object tracking is shown. In an illustrative embodiment, the method 2300 may be performed using a robot.

The method 2300 may include, tracking, at a robot, the geometry between multiple objects, at 2302. For example, a user may communicate to the robot particular objects to be tracked. In a particular embodiment, the robot may include a display interface and the user may communicate to the robot via interactions with the display interface. As another example, the robot may independently determine what objects are to be tracked based on environmental factors. For example, the robot may include a sensor to detect motion. Based on the detected motion, the robot may select to track objects associated with the motion.

A processing function may be performed based on the geometry, at 2304. For example, the robot may determine relationships between the objects based on the geometry. As another example, the robot may determine a setting (e.g., a scene) based on the geometry of the objects.

Figure 24:
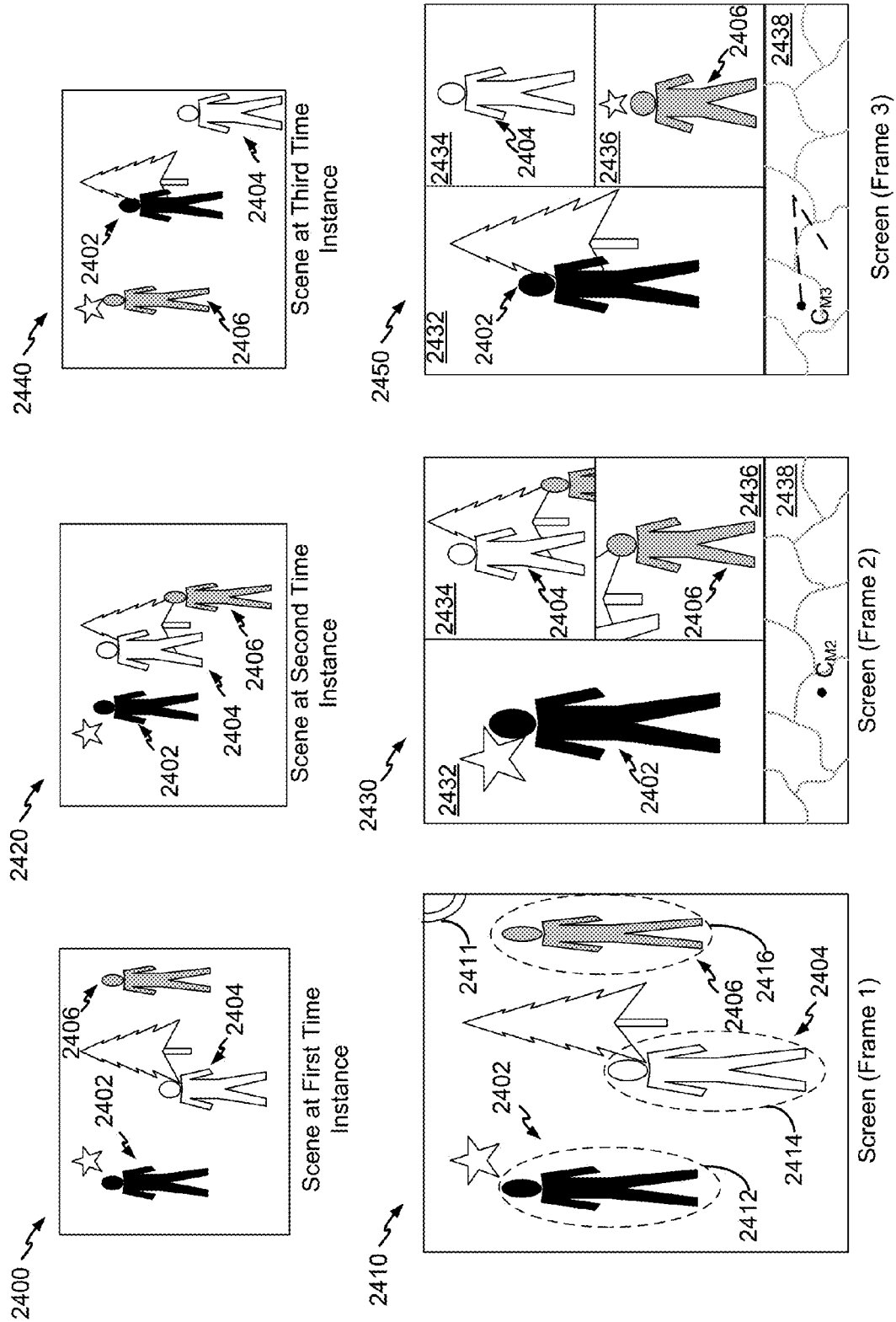
FIG. 24 is another particular embodiment depicting video processing using object tracking.

FIG. 24 shows an example of an application of an implementation of method M100 (e.g., method M110, M200, M300, or M400). The video processing techniques described with respect to the embodiment depicted in FIG. 24 may be performed by the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

FIG. 24 shows a frame 2400 of a primary video stream that depicts a scene as captured at a first time instance. For example, frame 2400 may correspond to a frame of a video stream to be displayed on a screen of a mobile device. The mobile device may be configured to capture the stream (e.g., with a camera of the mobile device) or to receive it from another device. The scene depicted in frame 2400 includes a first object 2402, a second object 2404, a third object 2406, a star, and a tree. In the illustrated embodiment, first object 2402 may correspond to a first person, second object 2404 may correspond to a second person, and third object 2406 may correspond to a third person. In another embodiment, at least one of the objects 2402-2406 may correspond to a robot that is controlled via the mobile device.

FIG. 24 also shows a display 2410 of frame 2400 on a screen of the mobile device. The screen of the mobile device (e.g., a touchscreen) may correspond to a viewfinder. Display 2410 may include a user selection mechanism 2411 that enables a user to select objects for tracking (e.g., by tracking task T250). For example, the user may touch user selection mechanism 2411 on the screen and drag a first focus ring 2412 around first object 2402 to enable tracking of first object 2402. In response to such placement of first focus ring 2412, the mobile device may select first object 2412 for tracking. In a similar manner, the user may also touch user selection mechanism 2411 on the screen and drag a second focus ring 2414 and a third focus ring 2416 around second object 2404 and third object 2406 to enable tracking of the second object 2404 and the third object 2406, respectively. In response to such placement of second focus ring 2414 and third focus ring 2416, the mobile device may select second object 2404 and third object 2406, respectively, for tracking.

FIG. 24 also shows a frame 2420 of the video stream that depicts the scene as captured at a second time instance (e.g., subsequent to the first time instance). In frame 2420, the position of each object 2402-2406 has changed with respect to the corresponding positions in frame 2400 depicting the scene at the first time instance. For example, first object 2402 has moved closer to the star, second object 2404 has moved closer to the tree, and third object 2406 has moved closer to the bottom of the frame.

FIG. 24 also shows a display 2430 of frame 2420 on a screen of the mobile device. Display 2430 may be partitioned (e.g., by display task T400) into two or more windows. In this example, display 2430 is partitioned into a first window 2432, a second window 2434, a third window 2436, and a fourth window 2438. In response to selection of the three objects 2402-2406 with user selection mechanism 2411, for example, the mobile device may partition display 2430 into three corresponding windows 2432-2436 and the fourth window 2438.

The first window 2432 may display a first portion of frame 2420 that includes first object 2402. The first portion of frame 2420 may be determined based on a location of first object 2402 in frame 2420. For example, the mobile device may track the location of first object 2402 and a video stream focused on the location of first object 2402 may be displayed in the first window 2432. The second window 2434 may display a second portion of frame 2420 that includes second object 2404. The second portion of frame 2420 may be determined based on a location of second object 2404 in frame 2420. For example, the mobile device may track the location of second object 2404 and a video stream focused on the location of second object 2404 may be displayed in the second window 2434. The third window 2436 may display a third portion of frame 2420 that includes third object 2406. The third portion of frame 2420 may be determined based on a location of third object 2406 in frame 2420. For example, the mobile device may track the location of third object 2404 and a video stream focused on the location of third object 2406 may be displayed in the third window 2436.

The fourth window 2438 may display an indication of a geometry (e.g., a center of mass ($C_{M2}$)) between each object 2402-2406. For example, the fourth window 2438 may include a grid that includes multiple sections (represented as grayscale lines) that correspond to areas in frame 2420. For example, the bottom left section of the grid may correspond to the bottom left section of frame 2420. In a similar manner as described with respect to FIGS. 18 and 19, the mobile device may determine the center of mass ($C_{M2}$) of the objects in frame 2420. The center of mass ($C_{M2}$) may be displayed at a corresponding section of the grid.

FIG. 24 also shows a frame 2440 that depicts the scene as captured at a third time instance (e.g., subsequent to the second time instance). In frame 2440, the position of each object 2402-2406 has changed with respect to the corresponding positions in frame 2420 depicting the scene at the second time instance. For example, first object 2402 has moved closer to the tree, second object has moved closer to the bottom of the scene 2440, and third object 2406 has moved closer to the star.

FIG. 24 also shows a display 2450 of frame 2440 on the screen of the mobile device, using the windows 2432-2436 generated by the mobile device. For example, the first window 2432 displays the first portion of frame 2440 that includes first object 2402, the second window 2434 displays the second portion of frame 2440 that includes second object 2404, and the third window 2436 displays the third portion of frame 2440 that includes third object 2406.

The fourth window 2438 may update the indication (e.g., the center of mass ($C_{M2}$)) to reflect frame 2440 at the third time instance. The mobile device may track the geometry on a frame-by-frame basis, or at non-consecutive time intervals, and display an indication of the updated geometry in the fourth window 2438. For example, at the third frame, the fourth window 2438 may display the center of mass ($C_{M3}$) of the objects 2402-2406 in frame 2440 at the third time instance. The fourth window 2438 may also display a path (e.g., the dotted lines) that tracks the center of mass of the objects (e.g., as indicated by tracking task T250) between the second frame and the third frame.

The embodiment depicted in FIG. 24 may enable the mobile device to track objects 2402-2406 in frames 2400, 2420, 2440 and may display individualized (e.g., focused) video streams corresponding to the objects 2402-2406 in separate windows 2432-2436. The embodiment also enables the user to view the geometry of the objects 2402-2406 in the fourth window 2438. The mobile device may perform the techniques described with respect to FIG. 24 using a single camera or using multiple cameras.

Figure 25:
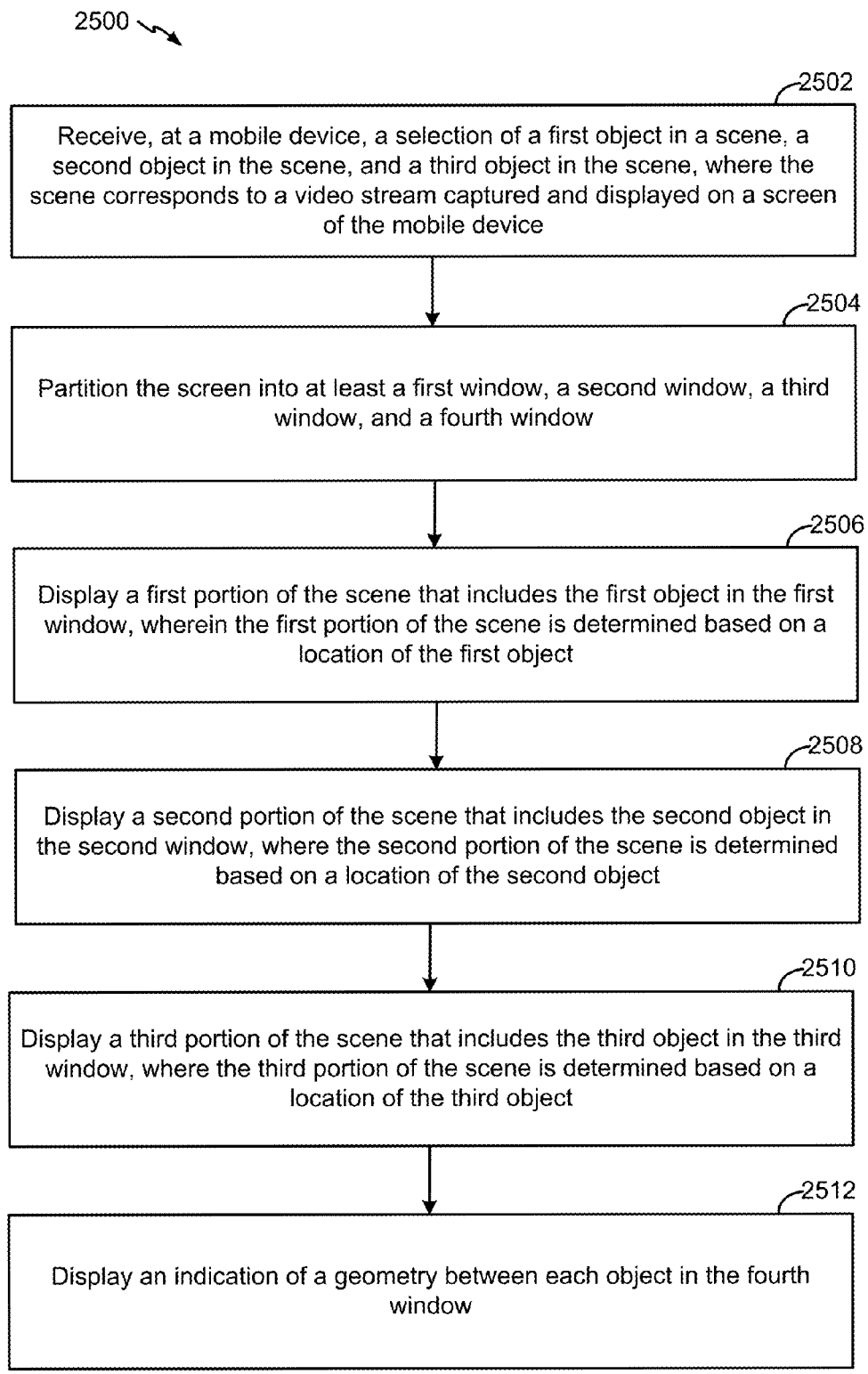
FIG. 25 is another flowchart of a particular illustrative embodiment of a video processing method using object tracking.

Referring to FIG. 25, a flowchart that illustrates a particular embodiment of a video processing method 2500 using object tracking is shown. In an illustrative embodiment, the method 2500 may be performed using the electronic device 102 of FIG. 1, the object tracking and detection module 204 implemented by the processor 264 of FIG. 2B, the object tracking and detection module 804 of FIG. 8 implemented by a processor, the smoothing module 961 of FIG. 9 implemented by a processor, or any combination thereof.

The method 2500 includes receiving, at a mobile device, a selection of a first object in a displayed scene, a second object in the displayed scene, and a third object in the displayed scene, at 2502. For example, referring to FIG. 24, the user may touch the user selection mechanism 2411 on the screen and drag the first focus ring 2412 around first object 2402, the second focus ring 2414 around second object 2404, and the third focus ring 2416 around third object 2406 to enable tracking of the first, second, and third objects 2402-2406, respectively. The displayed scene may correspond to a video stream captured and displayed on the screen of the mobile device.

The display may be partitioned into at a first window, a second window, a third window, and a fourth window, at 2504. For example, referring to FIG. 24, display 2430 may be partitioned into the first window 2432, the second window 2434, the third window 2436, and the fourth window.

A first portion of the displayed scene that includes the first object may be displayed in the first window, at 2506. For example, referring to FIG. 24, the first window 2432 may display the first portion of frame 2420 that includes first object 2402. The first portion of frame 2420 may be determined based on a location of first object 2402 in frame 2420. For example, the mobile device may track the location of first object 2402 and a video stream focused on the location of first object 2402 may be displayed in the first window 2432.

A second portion of the displayed scene that includes second object may be displayed in the second window, at 2508. For example, referring to FIG. 24, the second window 2434 may display the second portion of frame 2420 that includes second object 2404. The second portion of frame 2420 may be determined based on a location of second object 2404 in frame 2420. For example, the mobile device may track the location of second object 2404 and a video stream focused on the location of second object 2404 may be displayed in the second window 2434.

A third portion of the displayed scene that includes the third object may be displayed in the third window, at 2510. For example, referring to FIG. 24, the third window 2436 may display the third portion of frame 2420 that includes third object 2406. The third portion of frame 2420 may be determined based on a location of third object 2406 in frame 2420. For example, the mobile device may track the location of third object 2406 and a video stream focused on the location of second object 2406 may be displayed in the third window 2436.

An indication of a geometry between each object may be displayed in the fourth window, at 2412. For example, referring to FIG. 24, the fourth window 2438 may display the center of mass ($C_{M2}$) between each object 2402-2406. The fourth window 2438 may update the center of mass ($C_{M2}$) to reflect the scene 2440 at the third time instance. For example, at the third frame, the fourth window 2438 may display the center of mass ($C_{M3}$) of the objects 2402-2406 in frame 2440 at the third time instance. The fourth window 2438 may also display a path (e.g., the dotted lines) that tracks the center of mass of the objects between the second frame and the third frame.

The method 2500 of FIG. 25 may enable the mobile device to track objects 2402-2406 in the scene 2400, 2420, 2440 and may display individualized (e.g., focused) video streams corresponding to the objects 2402-2406 in separate windows 2432-2436. The method 2500 also enables the user to view the geometry of the objects 2402-2406 in a separate window (e.g., the fourth window 2438). The mobile device may perform the method 2500 using a single camera or using multiple cameras.

FIG. 37B shows a block diagram of an apparatus A100 according to a general configuration. Apparatus A100 includes a discriminator 200 configured to select at least two objects within a primary video stream PS10 that has a primary field of view (e.g., as described herein with reference to selecting task T200). Apparatus A100 also includes a video stream generator 200 configured to generate from the primary video stream, in response to said selecting, a first video stream VS10 including a first of the selected objects and having a first field of view that is narrower than the primary field of view, and to generate from the primary video stream, subsequent to said selecting, a second video stream VS20 including a second of the selected objects and having a second field of view that is narrower than the primary field of view (e.g., as described herein with reference to stream-generating task T300 and T350). After said generating the first video stream and said generating the second video stream begin, the first field of view includes a portion of the primary field of view that is not within the second field of view and the second field of view includes a portion of the primary field of view that is not within the first field of view.

FIG. 37C shows a block diagram of an implementation A110 of apparatus A100. Apparatus A110 includes an interface 110 configured to parse primary video stream PS10 to produce a series of frames of primary video stream PS10 (e.g., as described herein with reference to parsing task T110). Interface 110 may include a buffer arranged to store one or more parsed frames, such as a frame buffer or circular buffer as described herein (e.g., frame buffer FB10, memory buffer 110). FIG. 38A shows a block diagram of an implementation A200 of apparatus A100. Apparatus A200 includes an object tracker 250 configured to track the selected objects (e.g., as described herein with reference to tracking task T250, object tracking and detection module 204, and/or object tracking and detection module 804). For example, object tracker 250 may be configured to detect that, in a frame of a display video stream, at least one among the first and second objects is near an edge of the frame; to determine that, in a first of a plurality of frames of the primary video stream, the first object is closer to a first edge of the frame than the second object; and/or to determine, subsequent to said displaying the first video stream within the first window, that, in at least one of (A) a frame of the primary video stream, (B) a frame of the first video stream, and (C) a frame of the second video stream, the second object overlaps the first object.

FIG. 38B shows a block diagram of an implementation A300 of apparatus A100. Apparatus A300 includes a display signal generator 400 configured to produce a display signal based on at least one of the first and second video streams (e.g., as described herein with reference to display task T400). For example, display signal generator 400 may be configured to produce a display signal (e.g., to a screen) that includes the first video stream within a first window and the second video stream within a second window. Additionally or alternatively, display signal generator 400 may be configured to produce a display signal showing indications of geometry and/or cluster regions (e.g., as described herein with reference to FIGS. 17, 18, and 24). Display signal generator 400 may include a display buffer as described herein (e.g., display buffer DB10). FIG. 39A shows a block diagram of an implementation A400 of apparatus A200 and A300.

Any of the implementations of apparatus A100 as disclosed herein may be implemented within a mobile device, such as a device in any of the following form factors: holdables (e.g., smartphones), drivables (e.g., vehicles or robots), wearables (e.g., clothing or accessories), and flyables (e.g., drones). A mobile device may include one or more screens SC10 (e.g., a touchscreen) configured to display stream DS10 and/or one or more imaging units IU10 (e.g., a camera or other image-capturing device) configured to produce primary video stream PS10. FIGS. 39B and 39C show block diagrams of examples of such applications of apparatus A100, and FIG. 39D shows a block diagram of such an application of apparatus A300.

Figure 26:
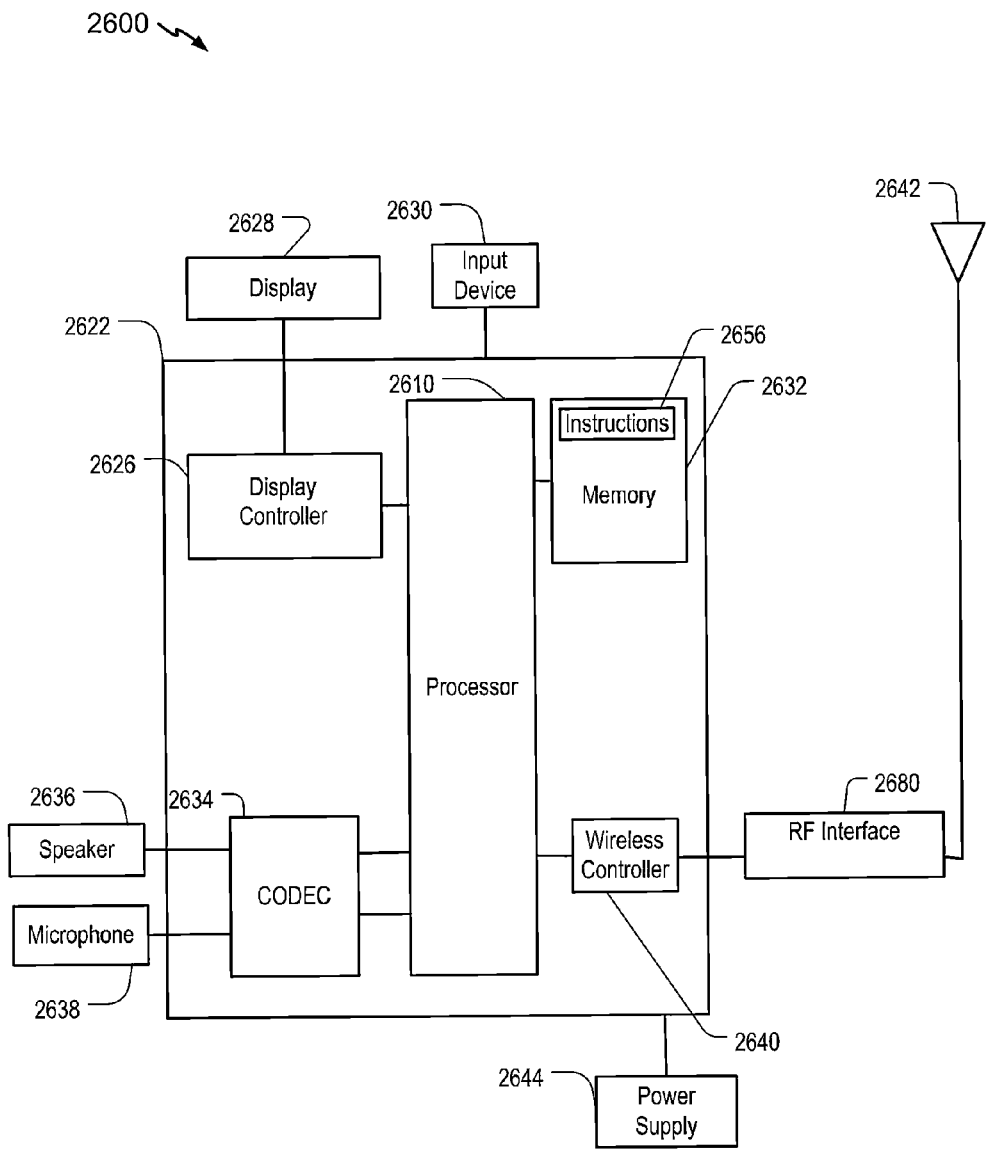
FIG. 26 is a block diagram of a wireless device including components operable to perform video processing techniques.

Referring to FIG. 26, a block diagram of a wireless device 2600 including components operable to perform the video processing techniques described above is shown. The device 2600 includes a processor 2610, such as a digital signal processor (DSP), coupled to a memory 2632. Device 2600 is one example of a mobile device that may be implemented to include the elements of any of the implementations of apparatus A100 as described herein.

FIG. 26 also shows a display controller 2626 (e.g., configured to perform display task T400 as described herein) that is coupled to the processor 2610 and to a display 2628. In a particular embodiment, the display may correspond to the viewfinder or the screens described above. The memory 2632 may be a tangible non-transitory processor-readable storage medium that includes executable instructions 2656. The instructions 2656 may be executed by a processor, such as the processor 2610. A processor, such as the processor 2610 or the display controller 2626, may execute the instructions 2656 to perform at least a portion of the method 300 of FIG. 3, the method 400 of FIG. 4, the method 500 of FIG. 5, the method 600 of FIG. 6, the method 1000 of FIG. 10, the method 1200 of FIG. 12, the method 1400 of FIG. 14, the method 1600 of FIG. 16, the method 1900 of FIG. 19, the method 2000, 2010 of FIG. 20, the method 2200 of FIG. 22, the method 2500 of FIG. 25, method M100, method M110, method M120, method M200, method M300, method M400, or any combination thereof.

A coder/decoder (CODEC) 2634 can also be coupled to the processor 2610. A speaker 2636 and a microphone 2638 can be coupled to the CODEC 2634. FIG. 26 also indicates that a wireless controller 2640 can be coupled to the processor 2610 and to an antenna 2642. In a particular embodiment, a radio frequency (RF) interface 2680 is disposed between the wireless controller 2640 and the antenna 2642.

In a particular embodiment, the processor 2610, the display controller 2626, the memory 2632, the CODEC 2634, and the wireless controller 2640 are included in a system-in-package or system-on-chip device 2622. In a particular embodiment, an input device 2630 (e.g., a camera used to capture the scenes as described above) and a power supply 2644 are coupled to the system-on-chip device 2622. Moreover, in a particular embodiment, as illustrated in FIG. 26, the display 2628, the input device 2630, the speaker 2636, the microphone 2638, the antenna 2642, the power supply 2644, and the RF interface 2680 are external to the system-on-chip device 2622. For example, the RF interface 2680 may be a separate chip. However, each of the display 2628, the input device 2630, the speaker 2636, the microphone 2638, the antenna 2642, the power supply 2644, and the RF interface 2680 can be coupled to a component of the system-on-chip device 2622, such as an interface or a controller.

FIG. 39E shows a block diagram of an apparatus MF100 according to a general configuration. Apparatus MF100 includes means F200 for selecting at least two objects within a primary video stream that has a primary field of view (e.g., as described herein with reference to task T200). Apparatus MF100 also includes means F300 for generating from the primary video stream, in response to said selecting, a first video stream including a first of the selected objects and having a first field of view that is narrower than the primary field of view (e.g., as described herein with reference to task T300). Apparatus MF100 also includes means F350 for generating from the primary video stream, subsequent to said selecting, a second video stream including a second of the selected objects and having a second field of view that is narrower than the primary field of view (e.g., as described herein with reference to task T350). After generating the first video stream and said generating the second video stream begin, the first field of view includes a portion of the primary field of view that is not within the second field of view and the second field of view includes a portion of the primary field of view that is not within the first field of view.

FIG. 40A shows a block diagram of an implementation MF110 of apparatus MF100. Apparatus MF110 includes means F100 for parsing the primary video stream to produce a series of frames of the primary video stream (e.g., as described herein with reference to parsing task T100).

FIG. 40B shows a block diagram of an implementation MF200 of apparatus MF100. Apparatus MF200 includes means F250 for tracking objects (e.g., as described herein with reference to tracking task T250). For example, means F250 may be implemented as means for detecting that, in a frame of a display video stream, at least one among the first and second objects is near an edge of the frame; as means for determining that, in a first of a plurality of frames of the primary video stream, the first object is closer to a first edge of the frame than the second object; and/or as means for determining, subsequent to said displaying the first video stream within the first window, that, in at least one of (A) a frame of the primary video stream, (B) a frame of the first video stream, and (C) a frame of the second video stream, the second object overlaps the first object.

FIG. 40C shows a block diagram of an implementation MF300 of apparatus MF100. Apparatus MF300 includes means F400 for displaying at least one of the first and second video streams (e.g., as described herein with reference to display task T400). For example, means F400 may be implemented as means for displaying, on a screen, the first video stream within a first window and the second video stream within a second window. Additionally or alternatively, means F400 may be implemented as means for producing a display signal showing indications of geometry and/or cluster regions (e.g., as described herein with reference to FIGS. 17, 18, and 24). FIG. 40D shows a block diagram of an implementation MF400 of apparatus MF200 and MF300.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. For example, one or more elements of the various implementations of the apparatus disclosed herein (e.g., any among apparatus MF100, MF110, MF200, MF300, MF400, A100, A110, A200, A300, and A400) may be implemented in whole or in part as one or more sets of instructions arranged to execute on one or more fixed or programmable arrays of logic elements (e.g., processor 2610), such as microprocessors, embedded processors, IP cores, digital signal processors, FPGAs (field-programmable gate arrays), ASSPs (application-specific standard products), and ASICs (application-specific integrated circuits). Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of video processing, the method comprising:
receiving a first selection of a first object represented within a primary video stream that has a primary field of view;
in response to receiving the first selection, generating, from the primary video stream, a first video stream including the first object and having a first field of view that is narrower than the primary field of view;
receiving a second selection of a second object represented within the primary video stream; and
in response to receiving the second selection, generating, from the primary video stream, a second video stream including the second object and having a second field of view that is narrower than the primary field of view,
wherein the first video stream is generated prior to receiving the second selection and video corresponding to the second video stream is displayed on a screen while video corresponding to the first video stream is displayed on the screen, and wherein the first field of view includes a portion of the primary field of view that is not within the second field of view and the second field of view includes a portion of the primary field of view that is not within the first field of view.

2. The method of video processing according to claim 1, further comprising:
detecting, within at least one of a first plurality of frames of the primary video stream or a second plurality of frames of the first video stream, a movement of the first object; and
changing a direction of the first field of view in response to detecting the movement.

3. The method of video processing according to claim 2, wherein changing the direction of the first field of view comprises changing the direction to follow the movement of the first object.

4. The method of video processing according to claim 1, wherein generating the first video stream comprises generating each frame of the first video stream from a portion of at least one corresponding frame of the primary video stream.

5. The method of video processing according to claim 1, wherein, for each frame of the first video stream, a first distance between a first coordinate position of a centroid of a first representation of the first object within the frame and a center coordinate of the frame is less than a second distance between a second coordinate position of a centroid of a second representation of the first object within a corresponding frame of the primary video stream and a center coordinate of the corresponding frame.

6. The method of video processing according to claim 1, wherein generating the first video stream comprises normalizing a size of a representation of the first object within each of a first plurality of frames of the first video stream.

7. The method of video processing according to claim 1, wherein generating the first video stream comprises normalizing at least one of brightness, contrast, or white balance within each of a first plurality of frames of the first video stream.

8. The method of video processing according to claim 1, further comprising:
displaying, on the screen, the first video stream within a first window; and
displaying, on the screen, the second video stream within a second window.

9. The method of video processing according to claim 1, further comprising displaying on the screen an indication of a geometric relationship between the first object and the second object.

10. The method of video processing according to claim 8, further comprising:
determining that, in a first frame of the primary video stream, the first object is closer to a first frame edge of the first frame than the second object is to the first frame edge;
subsequent to determining that the first object is closer to the first frame edge, determining that, in a second frame of the primary video stream, the second object is closer to a second frame edge of the second frame than the first object is to the second frame edge, the second frame edge corresponding to the first frame edge; and
in response to determining that the second object is closer to the second frame edge, displaying the second video stream within the first window and displaying the first video stream within the second window.

11. The method of video processing according to claim 8, further comprising:
subsequent to displaying the first video stream within the first window, determining that the second object overlaps the first object in at least one of a frame of the primary video stream, a frame of the first video stream, or a frame of the second video stream; and
in response to determining that the second object overlaps the first object, displaying the second video stream within the first window and displaying the first video stream within the second window.

12. The method of video processing according to claim 8, further comprising:
generating, from the primary video stream, a display video stream having a secondary field of view that is narrower than the primary field of view;
displaying, within a third window of the screen, the display video stream; and
in response to detecting that at least one of the first object or the second object is near an edge of a frame of the display video stream, changing the display video stream to have a tertiary field of view, wherein the tertiary field of view has a wider angle than the secondary field of view.

13. The method of video processing according to claim 1, wherein the first object is a robotic object, and wherein the method further comprises controlling a movement of the robotic object.

14. A non-transitory computer-readable medium storing instructions that when executed by a processor, cause the processor to:
receive a first selection of a first object represented within a primary video stream that has a primary field of view;
generate from the primary video stream, in response to receiving the first g selection, a first video stream including the first object and having a first field of view that is narrower than the primary field of view;
receive a second selection of a second object represented within the primary video stream; and
generate from the primary video stream, in response to receiving the second selection, a second video stream including the second object and having a second field of view that is narrower than the primary field of view,
wherein the first video stream is generated prior to receiving the second selection and video corresponding to the second video stream is displayed on a screen while video corresponding to the first video stream is displayed on the screen, and wherein the first field of view includes a portion of the primary field of view that is not within the second field of view and the second field of view includes a portion of the primary field of view that is not within the first field of view.

15. The non-transitory computer-readable medium according to claim 14, the medium storing instructions that when executed by the processor, cause the processor to:
    detect a movement of the first object based on at least one of a first plurality of frames of the primary video stream or a second plurality of frames of the first video stream; and
    change a direction of the first field of view, in response to said detecting the movement of the first object, to follow the movement of the first object.

16. The non-transitory computer-readable medium according to claim 14, wherein the instructions to generate the first video stream comprise instructions that, when executed by the processor, cause the processor to normalize a size of a representation of the first object within each of a first plurality of frames of the first video stream.

17. The non-transitory computer-readable medium according to claim 14, the medium storing instructions that, when executed by the processor, cause the processor to:
    display, on the screen, the first video stream within a first window and the second video stream within a second window;
    determine that, in a first frame of the primary video stream, the first object is closer to a first frame edge of the first frame than the second object is to the first frame edge;
    subsequent to determining that the first object is closer to the first frame edge, determine that, in a second frame of the primary video stream, the second object is closer to a second frame edge of the second frame than the first object is to the second frame edge, the second frame edge corresponding to the first frame edge; and
    in response to determining that the second object is closer to the second frame edge, display the second video stream within the first window and display the first video stream within the second window.

18. The non-transitory computer-readable medium according to claim 14, the medium storing instructions that when executed by the processor, cause the processor to:
    display, on the screen, the first video stream within a first window and the second video stream within a second window;
    subsequent to displaying the first video stream within the first window, determine that the second object overlaps the first object in at least one of a frame of the primary video stream, a frame of the first video stream, or a frame of the second video stream; and
    in response to determining that the second object overlaps the first object, display the second video stream within the first window and the first video stream within the second window.

19. The non-transitory computer-readable medium according to claim 14, the medium storing instructions that when executed by the processor, cause the processor to:
    display, on the screen, the first video stream within a first window and the second video stream within a second window;
    generate, from the primary video stream, a display video stream having a secondary field of view that is narrower than the primary field of view;
    display, within a third window of the screen, the display video stream; and
    in response to detecting that at least one of the first object or the second object is near an edge of a frame of the display video stream change the display video stream to have a tertiary field of view, wherein the tertiary field of view has a wider angle than the secondary field of view.

20. An apparatus for video processing, said apparatus comprising:
    means for receiving a first selection of a first object represented within a primary video stream that has a primary field of view;
    means for generating from the primary video stream, in response to receiving the first selection, a first video stream including the first object and having a first field of view that is narrower than the primary field of view;
    means for receiving a second selection of a second object represented within the primary video stream; and
    means for generating from the primary video stream, in response to receiving the second selection, a second video stream including the second object and having a second field of view that is narrower than the primary field of view,
    wherein the first video stream is generated prior to receiving the second selection and video corresponding to the second video stream is displayed on a screen while video corresponding to the first video stream is displayed on the screen, and wherein after generating the first video stream and generating the second video stream, the first field of view includes a portion of the primary field of view that is not within the second field of view and the second field of view includes a portion of the primary field of view that is not within the first field of view.

21. The apparatus according to claim 20, wherein the means for generating the first video stream is configured to normalize a size of a representation of the first object within each of a first plurality of frames of the first video stream.

22. The apparatus according to claim 20, further comprising:
    means for displaying, on the screen, the first video stream within a first window and the second video stream within a second window;
    means for determining that, in a first frame of the primary video stream, the first object is closer to a first frame edge of the first frame than the second object is to the first frame edge;
    means for determining, subsequent to determining that the first object is closer to the first frame edge, that in a second frame of the primary video stream, the second object is closer to a second frame edge of the second frame than the first object is to the second frame edge, the second frame edge corresponding to the first frame edge; and
    means for displaying, in response to determining that the second object is closer to the second frame edge, the second video stream within the first window and the first video stream within the second window.

23. The apparatus according to claim 20, further comprising:
    means for displaying, on the screen, the first video stream within a first window and the second video stream within a second window;
    means for determining, subsequent to displaying the first video stream within the first window, that the second object overlaps the first object in at least one of a frame of the primary video stream, a frame of said first video stream, or a frame of the second video stream; and means for displaying, in response to determining the second object overlaps the first object, the second video stream within the first window and the first video stream within the second window.

24. The apparatus according to claim 20, further comprising:
means for displaying, on the screen, the first video stream within a first window and the second video stream within a second window;
means for generating, from the primary video stream, a display video stream having a secondary field of view that is narrower than the primary field of view;
means for displaying, within a third window of the screen, the display video stream;
means for, in response to detecting that at least one of the first object or the second object is near an edge of a frame of the display video stream, changing the display video stream to have a tertiary field of view, wherein the tertiary field of view has a wider angle than the secondary field of view.

25. An apparatus for video processing, the apparatus comprising:
a discriminator configured receive a first selection of a first object represented within a primary video stream that has a primary field of view and to receive a second selection of a second object represented within the primary video stream; and
a video stream generator configured to generate from the primary video stream, in response to receiving the first selection, a first video stream including the first object and having a first field of view that is narrower than the primary field of view, and to generate from the primary video stream, in response to receiving the second selection, a second video stream including the second object and having a second field of view that is narrower than the primary field of view,
wherein the first video stream is generated prior to receiving the second selection and video corresponding to the second video stream is displayed on a screen while video corresponding to the first video stream is displayed on the screen, and wherein after generating the first video stream and generating the second video stream, the first field of view includes a portion of the primary field of view that is not within the second field of view and the second field of view includes a portion of the primary field of view that is not within the first field of view.

26. The apparatus according to claim 25, further comprising an object tracker configured to detect a movement of the first object based on at least one of a first plurality of frames of the primary video stream or a second plurality of frames of the first video stream, wherein the video stream generator is configured to, in response to detecting the movement of the first object, change a direction of the first field of view to follow the movement of the first object.

27. The apparatus according to claim 25, wherein the video stream generator is configured to normalize a size of a representation of the first object within each of a first plurality of frames of the first video stream.

28. The apparatus according to claim 25, further comprising:
a display signal generator configured to display, on the screen, the first video stream within a first window and the second video stream within a second window; and
an object tracker configured to:
determine that, in a first frame of the primary video stream, the first object is closer to a first frame edge of the first frame than the second object is to the first frame edge, and
determine, subsequent to said determining that the first object is closer to the first frame edge, that in a second frame of the primary video stream, the second object is closer to a second frame edge of the second frame than the first object is to the second frame edge, the second frame edge corresponding to the first frame edge,
wherein the display signal generator is configured to display, subsequent to displaying the first video stream within the first window, and in response to determining that the second object is closer to the second frame edge, the second video stream within the first window and the first video stream within the second window.

29. The apparatus according to claim 25, further comprising:
a display signal generator configured to display, on a screen, the first video stream within a first window and the second video stream within a second window; and
an object tracker configured to determine that the second object overlaps the first object in at least one of a frame of the primary video stream, a frame of the first video stream, or a frame of the second video stream,
wherein the display signal generator is configured to display, subsequent to displaying the first video stream within the first window, and in response to determining that the second object overlaps the first object, the second video stream within the first window and the first video stream within the second window.

30. The apparatus according to claim 25, wherein the video stream generator is configured to generate, from the primary video stream, a display video stream having a secondary field of view that is narrower than the primary field of view, the apparatus further comprising:
a display signal generator configured to display, on a screen, the first video stream within a first window, the second video stream within a second window, and the display video stream within a third window; and
an object tracker configured to detect that, in a frame of the display video stream, at least one of the first object or the second object is near an edge of the frame, wherein the video stream generator is configured to change the display video stream to have a tertiary field of view in response to the object tracker detecting that the first object or the second object is near the edge, and wherein the tertiary field of view has a wider angle than the secondary field of view.

* * * * *